United States Patent
Furuichi

(10) Patent No.: US 12,356,202 B2
(45) Date of Patent: Jul. 8, 2025

(54) INFORMATION PROCESSING DEVICE, INFORMATION PROCESSING METHOD, AND COMMUNICATION DEVICE

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 685 days.

(21) Appl. No.: 17/608,861

(22) PCT Filed: Apr. 30, 2020

(86) PCT No.: PCT/JP2020/018355
§ 371 (c)(1),
(2) Date: Nov. 4, 2021

(87) PCT Pub. No.: WO2020/230659
PCT Pub. Date: Nov. 19, 2020

(65) Prior Publication Data
US 2022/0264312 A1    Aug. 18, 2022

(30) Foreign Application Priority Data

May 15, 2019 (JP) ................................ 2019-092059

(51) Int. Cl.
*H04W 16/14* (2009.01)
*H04W 16/28* (2009.01)
*H04W 72/541* (2023.01)

(52) U.S. Cl.
CPC ........... *H04W 16/14* (2013.01); *H04W 16/28* (2013.01); *H04W 72/541* (2023.01)

(58) Field of Classification Search
CPC ................. H04W 16/14; H04W 16/28; H04W 72/082; H04W 72/14; H04W 72/541; H04W 72/1284
See application file for complete search history.

(56) References Cited

U.S. PATENT DOCUMENTS 10,271,351 B1 * 4/2019 Wang .................... H04L 5/0091
2014/0341150 A1   11/2014 Kimura et al.
(Continued)

FOREIGN PATENT DOCUMENTS

| CA | 3071365 A1 | 2/2019 |
|---|---|---|
| CN | 104054367 A | 9/2014 |

(Continued)

OTHER PUBLICATIONS

Requirements for Commercial Operation in the U.S. 3550-3700 MHz Citizens Broadband Radio Service Band, May 6, 2019, Wireless Innovation Forum (Year: 2019).*

(Continued)

*Primary Examiner* — Michael Thier
*Assistant Examiner* — Prince A Mensah
(74) *Attorney, Agent, or Firm* — CHIP LAW GROUP

(57) ABSTRACT

An information processing device includes: an acquisition unit that acquires capability information regarding beamforming of a second radio system that wishes to use one or more spectrum resources included in part or all of a frequency band used by a first radio system; a first specifying unit that specifies a plurality of interference calculation points for interference calculation regarding the first radio system; a second specifying unit that specifies one or a plurality of interference calculation points to be subjected to the interference calculation from among the plurality of interference calculation points based on the capability information; and a calculation unit that performs the interference (Continued)

calculation based on the specified one or the plurality of interference calculation points.

17 Claims, 32 Drawing Sheets

(56) References Cited

U.S. PATENT DOCUMENTS

2015/0373554 A1   12/2015  Freda et al.
2022/0038246 A1*   2/2022  Sakamoto ........... H04W 72/541

FOREIGN PATENT DOCUMENTS

| EP | 2809096 A1 | 12/2014 |
|---|---|---|
| JP | 2016-508694 A | 3/2016 |
| JP | 6277893 B2 | 2/2018 |
| WO | 2013/111442 A1 | 8/2013 |
| WO | 2014/117135 A2 | 7/2014 |
| WO | WO-2019026375 A1 | 2/2019 |

OTHER PUBLICATIONS

International Search Report and Written Opinion of PCT Application No. PCT/JP2020/018355, issued on Jun. 23, 2020, 08 pages of ISRWO.
"CBRS Certified Professional Installer Accreditation Technical Specification", Wireless Innovation Forum, WINNF-TS-0247, V1.5.0, Oct. 27, 2020, 19 pages.
"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, WINNF-TS-0016, V1.2.6, Nov. 25, 2020, 60 pages.
"Technical and operational requirements for the operation of white space devices under geo-location approach", ECC Report 186, CEPT Electronic Communication Committee, Jan. 2013, 181 pages.
"White Space Database Provider (WSDB) Contract", The office of communications and operator, URL: https://www.ofcom.org.uk/_data/assets/pdf_file/0026/84077/white_space_database_contract_for_operational_use_of_wsds.pdf, 2015, 125 pages.
"Signaling Protocols and Procedures for Citizens Broadband Radio Service (CBRS): Spectrum Access System (SAS)—SAS Interface Technical Specification", Wireless Innovation Forum, WINNF-TS-0096-V1.3.0, Mar. 11, 2020, 44 pages.
"Requirements for Commercial Operation in the U.S. 3550-3700 MHz Citizens Broadband Radio Service Band", Wireless Innovation Forum, WINNF-TS-0112, V1.9.1, Mar. 11, 2020, 81 pages.
"IEEE Standard for Information technology—Telecommunications and information exchange between systems—Local and metropolitan area networks—Specific requirements—Part 19: TV White Space Coexistence Methods—Amendment 1: Coexistence Methods for Geo-location Capable Devices Operating under General Authorization", IEEE 802.19.1a-2017, IEEE, Dec. 11, 2017.
"Part 96 Citizens Broadband Radio Service", Federal Communications Commission, Jun. 23, 2015, pp. 596-613.
"Operations for Citizens Broadband Radio Service (CBRS): Priority Access License (PAL) Database Technical Specification", Wireless Innovation Forum, WINNF-TS-0245, V1.2.0, Mar. 3, 2021, 11 pages.
"Prediction procedure for the evaluation of microwave interference between stations on the surface of the Earth at frequencies above about 0.7 Ghz", ITU-R P.452-11, International Telecommunication Union, Oct. 20, 1995, 37 pages.
Office Action for EP Patent Application No. 20806205.9, issued on Jun. 10, 2022, 09 pages of Office Action.
Marino, et al., "A Broker Based Scheme for Spectrum Sharing", IEEE, International Geoscience and Remote Sensing Symposium (IGARSS), XP033275208, Jul. 23, 2017, pp. 3455-3458.

* cited by examiner

INFORMATION PROCESSING DEVICE, INFORMATION PROCESSING METHOD, AND COMMUNICATION DEVICE

CROSS REFERENCE TO RELATED APPLICATIONS

This application is a U.S. National Phase of International Patent Application No. PCT/JP2020/018355 filed on Apr. 30, 2020, which claims priority benefit of Japanese Patent Application No. JP 2019-092059 filed in the Japan Patent Office on May 15, 2019. Each of the above-referenced applications is hereby incorporated herein by reference in its entirety.

FIELD

The present disclosure relates to an information processing device, an information processing method, and a communication device.

BACKGROUND

There is an emerging problem of exhaustion of radio resources available for allocation to radio systems (radio devices). Individual radio bands are already used by incumbent radio systems (radio devices), making it difficult to newly allocate radio resources to the radio systems. In view of this, in recent years, more effective use of radio resources by utilization of cognitive radio technology has started to attract attention. In the cognitive radio technology, radio resources are worked out by using temporally and spatially unused radio spectrum (white space) of an incumbent radio system.

CITATION LIST

Patent Literature

Patent Literature 1: JP 6277893 B2

Non Patent Literature

Non Patent Literature 1: WINNF-TS-0247-V1.0.0 CBRS Certified Professional Installer Accreditation Technical Specification.
Non Patent Literature 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V1.3.0 Signaling Protocols and Procedures for Citizens Broadband Radio Service (CBRS): Spectrum Access System (SAS)—SAS Interface Technical Specification
Non Patent Literature 6: WINNF-TS-0112-V1.5.0 Requirements for Commercial Operation in the U.S. 3550-3700 MHz Citizens Broadband Radio Service Band
Non Patent Literature 7: IEEE Std 802.19.1aTM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96#se47.5.96
Non Patent Literature 9: WINNF-TS-0245-V1.0.0 Operations for Citizens Broadband Radio Service (CBRS): Priority Access License (PAL) Database Technical Specification
Non Patent Literature 10: ITU-R P.452-11, "Prediction procedure for the evaluation of microwave interference between stations on the surface of the Earth at frequencies above about 0.7 GHz", https://www.itu.int/dms_pubrec/itu-r/rec/p/R-REC-P.452-11-200304-S!!PDF-E.pdf

SUMMARY

Technical Problem

However, effective use of radio resources cannot always be achieved simply by using an unused radio spectrum. For example, there has been an increase, in recent years, in the number of radio systems (radio communication devices) having a beam management function. In order to realize effective use of radio resources, for example, it is desirable to efficiently allocate unused radio spectrum to radio systems (radio communication devices) while taking into account the use of beam functions by the radio systems. However, it is not easy to efficiently allocate unused radio spectrum in the presence of various radio systems (radio communication devices).

In view of this circumstance, the present disclosure proposes an information processing device, an information processing method, and a communication device capable of implementing efficient use of radio resources.

Solution to Problem

To solve the above problem, an information processing device according to the present disclosure includes: an acquisition unit that acquires capability information regarding beamforming of a second radio system that wishes to use one or more spectrum resources included in part or all of a frequency band used by a first radio system; a first specifying unit that specifies a plurality of interference calculation points for interference calculation regarding the first radio system; a second specifying unit that specifies one or a plurality of interference calculation points to be subjected to the interference calculation from among the plurality of interference calculation points based on the capability information; and a calculation unit that performs the interference calculation based on the specified one or the plurality of interference calculation points.

DESCRIPTION OF EMBODIMENTS

Figure 1:
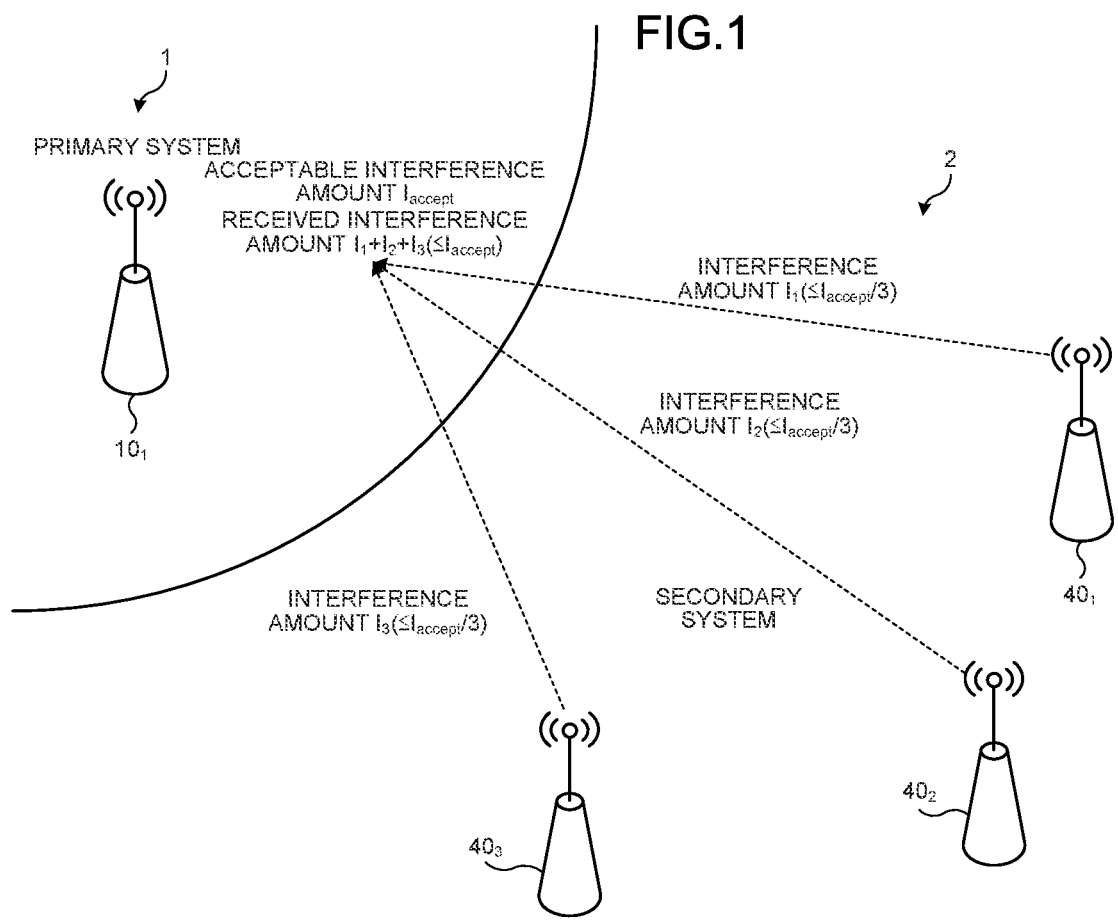
FIG. 1 is a diagram illustrating an example of allocation of an interference margin to each of communication devices constituting a secondary system.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers or alphabets after the same reference numerals. For example, a plurality of configurations having substantially the same functional configuration are distinguished as necessary, such as communication control devices $60_1$ and $60_2$. Moreover, a plurality of configurations having substantially the same functional configuration are distinguished as necessary, such as communication systems 2A and 2B. However, when it is not particularly necessary to distinguish between the plurality of components having substantially the same functional configuration, only the same reference numeral is given. For example, when there is no need to distinguish between the communication control devices $60_1$ and $60_2$ in particular, they are simply referred to as the communication control device 60. Furthermore, when there is no need to distinguish between the communication systems 2A and 2B in particular, they are simply referred to as the communication system 2.

The present disclosure will be described in the following order.
1. Introduction
   1-1. Control of radio system for achieving spectrum sharing
   1-2. Outline of present embodiment
   1-3. Terms related to spectrum and sharing
2. Configuration of communication system
   2-1. Overall configuration of communication system
   2-2. Configuration of radio wave utilization device
   2-3. Configuration of management device
   2-4. Configuration of terminal device
   2-5. Configuration of base station device
   2-6. Configuration of proxy device
   2-7. Configuration of communication control device
3. Interference model
4. Primary system protection method
   4-1. Interference margin simultaneous allocation type
   4-2. Interference margin sequential allocation type
5. Description of various procedures
   5-1. Registration procedure
   5-2. Available spectrum query procedure
   5-3. Spectrum grant procedure
   5-4. Spectrum use notification/heartbeat
   5-5. Supplement to various procedures
   5-6. Various procedures related to terminal device 5-7. Procedure occurring between communication control devices
5-8. Representative operation flow
6. Operation related to interference calculation (first exemplary embodiment)
   6-1. Assumed model of interference calculation
   6-2. Spatial protection point setting method
   6-3. Interference calculation method at set spatial protection point
7. Operation related to interference calculation (second exemplary embodiment)
   7-1. Specifying potential interferers
   7-2. Allocation of interference margin
8. Modifications
   8-1. Modification related to interference calculation
   8-2. Modification regarding system configuration
   8-3. Other modifications
9. Conclusion

1. INTRODUCTION

With recent increase and diversification of radio environments having a mixture of various radio systems and the volume of content transferred via radio communications, there has been an emerging problem of exhaustion of radio resources (for example, frequency/spectrum) available for allocation to the radio systems. However, many radio bands are already used by incumbent radio systems, making it difficult to allocate new radio resources. In view of this, in recent years, more effective use of radio resources by utilization of cognitive radio technology has started to attract attention.

In the cognitive radio technology, radio resources are worked out by utilizing temporally and spatially unused radio spectrum (white space) of the incumbent radio system (for example, by using dynamic spectrum sharing referred to as Dynamic Spectrum Access (DSA)). In the recent United States, for example, with the aim of opening a Federal use band (3.55-3.70 GHz), which overlaps with a frequency band that is worldwide 3GPP bands 42 and 43, to the general public, legislation and standardization of a Citizens Broadband Radio Service (CBRS) utilizing a spectrum sharing technology are accelerating.

Note that the cognitive radio technology contributes not merely to dynamic spectrum sharing but also to improvement of spectrum use efficiency by a radio system. For example, ETSI EN 303 387 and IEEE 802.19.1-2014 define a technology of inter-radio system coexistence technology using unused radio spectrum.

1-1. Control of Radio System for Achieving Spectrum Sharing

In general case of spectrum sharing, it is required, by the National Regulatory Authority (NRA) of each country/region, to protect the radio system (primary system) of the primary user licensed or authorized for the use of a frequency band. Typically, an acceptable interference reference value regarding the primary system is defined by the NRA, and the radio system (secondary system) of the secondary user is required to suppress the interference occurring by sharing to a value below the acceptable interference reference value.

In the following description, a "system" represents a set of a plurality of components (devices, modules (components), and the like). At this time, it would not matter whether or not all the components are in the same housing. Therefore, each of a plurality of devices housed in separate housings and connected via a network or the like, and one device in which a plurality of modules is housed in one housing, is a "system" in each case. That is, a radio system such as a primary system and a secondary system may each be configured by a plurality of devices or may be configured by one device.

In order to achieve spectrum sharing, for example, a communication control device (for example, the spectrum management database) controls communication of the secondary system so as not to give fatal interference to the primary system. The communication control device is a device that manages communication and the like of the communication device. For example, the communication control device is a system for managing radio resources (for example, spectrum), such as a geo-location database (GLDB) and a spectrum access system (SAS). In the present embodiment, the communication control device corresponds to the communication control device 60 described below. The communication control device 60 will be described in detail below.

Here, the primary system is, for example, a system (for example, incumbent systems) that preferentially uses a predetermined frequency band over other systems including the secondary system. In addition, the secondary system is, for example, a system that performs secondary use (for example, dynamic spectrum sharing) of a frequency band used by the primary system. Each of the primary system and the secondary system may include a plurality of communication devices or may include one communication device. The communication control device allocates an interference tolerance to one or a plurality of communication devices constituting the secondary system such that interference aggregation of the one or a plurality of communication devices toward the primary system would not exceed an interference tolerance (also referred to as an interference margin) of the primary system. At this time, the interference tolerance may be an interference amount preliminarily determined by an operator of the primary system, a public organization that manages radio waves, or the like. In the following description, the interference margin refers to the interference tolerance. In addition, interference aggregation may be referred to as aggregated interfering power.

FIG. 1 is a diagram illustrating an example of allocation of an interference margin to each of communication devices constituting a secondary system. In the example of FIG. 1, a communication system 1 is the primary system, while a communication system 2 is the secondary system. The communication system 1 includes a radio wave utilization device $10_1$ and the like. Furthermore, the communication system 2 includes base station devices $40_1$, $40_2$, $40_3$, and the like. Although the example of FIG. 1 is a case where the communication system 1 includes only one radio wave utilization device 10, the communication system 1 may include a plurality of radio wave utilization devices 10. Furthermore, although the example of FIG. 1 is a case where the communication system 2 includes three base station devices 40, the number of base station devices 40 included in the communication system 2 may be less than or more than three. In addition, the radio communication device included in the communication system 2 does not necessarily have to be a base station device. Although the example of FIG. 1 illustrates only one primary system (the communication system 1 in the example of FIG. 1) and only one secondary system (the communication system 2 in the example of FIG. 1), the primary system and the secondary system may each be provided in plurality.

Each of the radio wave utilization device $10_1$ and the base station devices $40_1$, $40_2$, and $40_3$ can transmit and receive radio waves. The interference amount acceptable by the radio wave utilization device $10_1$ is $I_{accept}$. In addition, interference amounts given to predetermined protection points of the communication system 1 (primary system) by the base station devices $40_1$, $40_2$, and $40_3$ are interference amounts $I_1$, $I_2$, and $I_3$, respectively. Here, the protection point is a point of reference regarding interference calculation for protection of the communication system 1.

The communication control device allocates the interference margin $I_{accept}$ to the plurality of base station devices 40 such that interference aggregation to a predetermined protection point of the communication system 1 (received interference amount $I_1+I_2+I_3$ illustrated in FIG. 1) would not exceed the interference margin $I_{accept}$. For example, the communication control device allocates the interference margin $I_{accept}$ to each of the base station devices 40 such that the interference amounts $I_1$, $I_2$, and $I_3$ become $I_{accept}/3$, individually. Alternatively, the communication control device allocates the interference margin $I_{accept}$ to each base station device 40 such that the interference amounts $I_1$, $I_2$, and $I_3$ become $I_{accept}/3$ or less, individually. Note that the method of allocating the interference margin is not limited to this example.

The communication control device calculates the maximum transmission power acceptable for each of the base station devices 40 (hereinafter, referred to as maximum allowable transmission power) based on the interference amount that is allocated (hereinafter, referred to as an allocated interference amount). For example, the communication control device calculates the maximum allowable transmission power of each of the base station devices 40 by calculating back from the allocated interference amount based on the propagation loss, the antenna gain, and the like. Subsequently, the communication control device notifies each of the base station devices 40 of information of the calculated maximum allowable transmission power.

1-2. Outline of Present Embodiment

Non Patent Literature 6 discloses a method for calculating a received power value of aggregate interference in protection of systems having a high spectrum access priority (for example, a system of an Incumbent Tier or a Priority Access Tier to be described below). Here, the calculation is performed in consideration of the distance between the transceivers, the EIRP (or the conducted power+ the transmission antenna gain), the reception antenna gain, and the like.

In addition, Non Patent Literature 2 includes a description that a spectrum access system (SAS) is provided with the following information regarding an antenna as registration information of a Citizens Broadband Radio Service Device (CBSD). An example of CBSD is a base station device that performs secondary use of radio resources.

Antenna Azimuth: boresight direction on a horizontal plane. 0 [deg] indicates true north.
  Antenna Downtilt: downtilt angle
  Antenna Gain: peak antenna gain
  Antenna beamwidth: beamwidth on horizontal plane (half width)

Furthermore, Non Patent Literature 6 further defines, in the case of area protection, that an area to be protected is divided every two arc seconds and grid points are set as protection points. Here, the protection point is a point of reference for interference calculation. In the following description, the protection point will be sometimes referred to as an interference calculation point.

In the future, many radio communication devices are expected to be equipped with a beam management function. Therefore, in order to achieve efficient use of radio resources, it is desirable to provide a mechanism for secondary use of radio waves suitable for beamforming of a radio communication device defined as a secondary system. Although conventional communication control devices (for example, SAS) can calculate aggregate interference power by using the above information (hereinafter, also referred to as interference calculation), there is room for achieving further efficient use of radio resources in consideration of beamforming.

For example, in the interference calculation, although the conventional communication control device considers the spread and emitting direction of the beam of the radio communication device that performs secondary use of the radio wave only in the horizontal direction, the spread and emitting direction of the beam have components not only in the horizontal direction but also in the vertical direction. The communication control device achieves further efficient use of radio resources by considering, in the interference calculation, spatial beam patterns of the radio communication device including the component in the vertical direction.

In addition, in a case where interference calculation is performed in consideration of a spatial beam pattern, it is assumed that a problem occurs in the setting of the protection point. For example, arranging the protection points not only in the horizontal direction but also in the vertical direction will enormously increase the number of protection points, leading to a possibility that interference calculation cannot be performed at a level at which the communication control device can be practically operated. In this case, a failure of interference calculation will result in a failure in efficient use of radio resources.

In view of this, the communication control device of the present embodiment acquires capability information regarding beamforming of the secondary system. In addition, the communication control device specifies a plurality of interference calculation points (protection points) for interference calculation, and specifies one or a plurality of interference calculation points to be subjected to interference calculation from among the plurality of interference calculation points based on the capability information. The communication control device performs interference calculation based on the specified one or the plurality of interference calculation points.

This makes it possible to perform efficient interference calculation at a practically operable level, leading to achievement of efficient use of radio resources.

Meanwhile, it is expected that, the more the number of radio communication devices having a beam management function, the more the necessity of improvement of the efficiency of interference calculation. For example, in Non Patent Literature 6, a conventional radio communication device is required to extract a potential interferer based on an interference calculation reference point or a separation distance from an end of a protection zone and required to suppress a power value of aggregate interference occurring from the interferer to be a predetermined threshold or less. It is obvious that this requirement is based on the premise that the radio device uses an omni directional antenna, and thus, an increase in the number of radio devices having a beam management function would lead to much waste occurring in interference calculation.

To handle this, the communication control device of the present embodiment specifies one or a plurality of secondary systems to be subjected to interference calculation from among the plurality of secondary systems based on the capability information. Subsequently, the communication control device performs interference calculation based on the one or a plurality of secondary systems specified from among the plurality of secondary systems and based on one or a plurality of interference calculation points specified from among the plurality of interference calculation points.

This makes it possible to perform further efficient interference calculation, leading to achievement of efficient use of radio resources.

1-3. Terms Related to Spectrum and Sharing

Following the outline of the present embodiment described above, details of the present embodiment will be described below. Before describing the present embodiment in detail, terms related to spectrum and sharing used in the present embodiment will be clearly defined in order to facilitate understanding of the present embodiment.

The present embodiment assumes that the primary system (for example, the communication system 1) and the secondary system (for example, the communication system 2) are in a dynamic spectrum sharing environment. Hereinafter, terms related to spectrum and sharing will be described by using a Citizens Broadband Radio Service (CBRS) developed by the United States Federal Communications Commission (FCC), as an example. Note that the communication system 1 and the communication system 2 of the present embodiment are not limited to systems in the CBRS.

Figure 2:
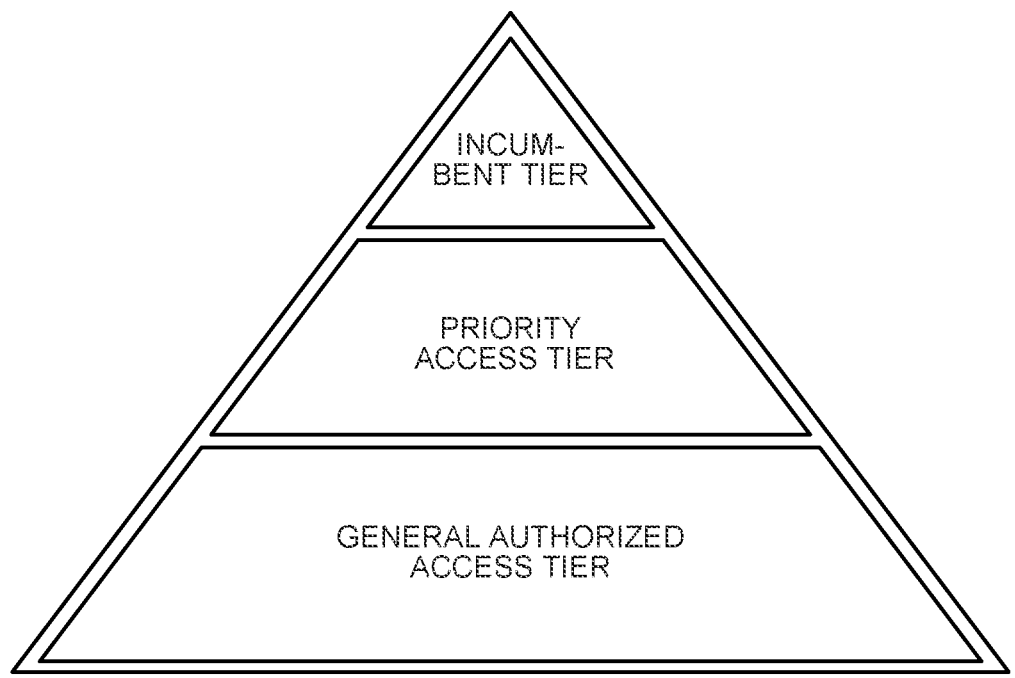
FIG. 2 is a diagram illustrating a hierarchical structure in CBRS.

FIG. 2 is a diagram illustrating a hierarchical structure in the CBRS. As illustrated in FIG. 2, each of users in a frequency band is classified into one of three groups. This group is referred to as a "tier". The three groups are defined as a hierarchical structure constituted with an Incumbent Tier, a Priority Access Tier, and a General Authorized Access Tier. In this hierarchical structure, the Priority Access Tier is located above the General Authorized Access Tier, and the Incumbent Tier is located above the Priority Access Tier. Using the CBRS as an example, for example, a system (incumbent system) located in the Incumbent Tier is a primary system, and systems located in the General Authorized Access Tier and the Priority Access Tier are secondary systems.

The Incumbent Tier is a group of incumbent users of a shared frequency band. The incumbent users defined in the CBRS include: the Department of Defense (DOD), fixed satellite service operators, and Grandfathered Wireless Broadband Licensees (GWBL). The Incumbent Tier is not required to avoid or suppress interference to lower priority tiers, namely, the Priority Access Tier and the General Authorized Access Tier (GAA Tier). In addition, the Incumbent Tier is protected against the interference from the Priority Access Tier and the General Authorized Access Tier (GAA Tier). That is, the user of the "Incumbent Tier" can use the frequency band without considering the presence of other groups.

The Priority Access Tier is a group of users having a license referred to as a Priority Access License (PAL). The Priority Access Tier is required to avoid or suppress interference to a higher priority tier, namely, the Incumbent Tier, but is not required to avoid or suppress interference to the lower priority tier, namely, the General Authorized Access Tier (GAA Tier). In addition, the Priority Access Tier is not protected against the interference from the higher priority tier, namely, the Incumbent Tier, but is protected against the interference from the lower priority tier, namely, the General Authorized Access Tier (GAA Tier).

The General Authorized Access Tier (GAA Tier) is a group of all the other users, that is, users not belonging to any of the Incumbent Tier or the Priority Access Tier. The General Authorized Access Tier is required to avoid or suppress interference to the higher priority tiers, namely, the Incumbent Tier and the Priority Access Tier. In addition, the General Authorized Access Tier (GAA Tier) is not protected against the interference from the higher priority tiers, namely, the Incumbent Tier and the Priority Access Tier. That is, the General Authorized Access Tier (GAA Tier) corresponds to a "tier" that is legislatively required to allow opportunistic spectrum use.

The hierarchical structure is not limited to these definitions. The CBRS typically is supposed to have a three-tier structure, but may have a two-tier structure. Typical examples of this include two-tier structures such as Licensed Shared Access (LSA) and TV band White Space (TVWS). The LSA has employed a structure equivalent to the above-described combination of the Incumbent Tier and the Priority Access Tier. In addition, the TVWS has employed a structure equivalent to the combination of the Incumbent Tier and the General Authorized Access Tier (GAA Tier). In addition, there may be four or more tiers. Specifically, for example, an intermediate tier corresponding to the Priority Access Tier may be further prioritized. In addition, for example, the General Authorized Access Tier (GAA Tier) may be similarly prioritized.

Figure 3:
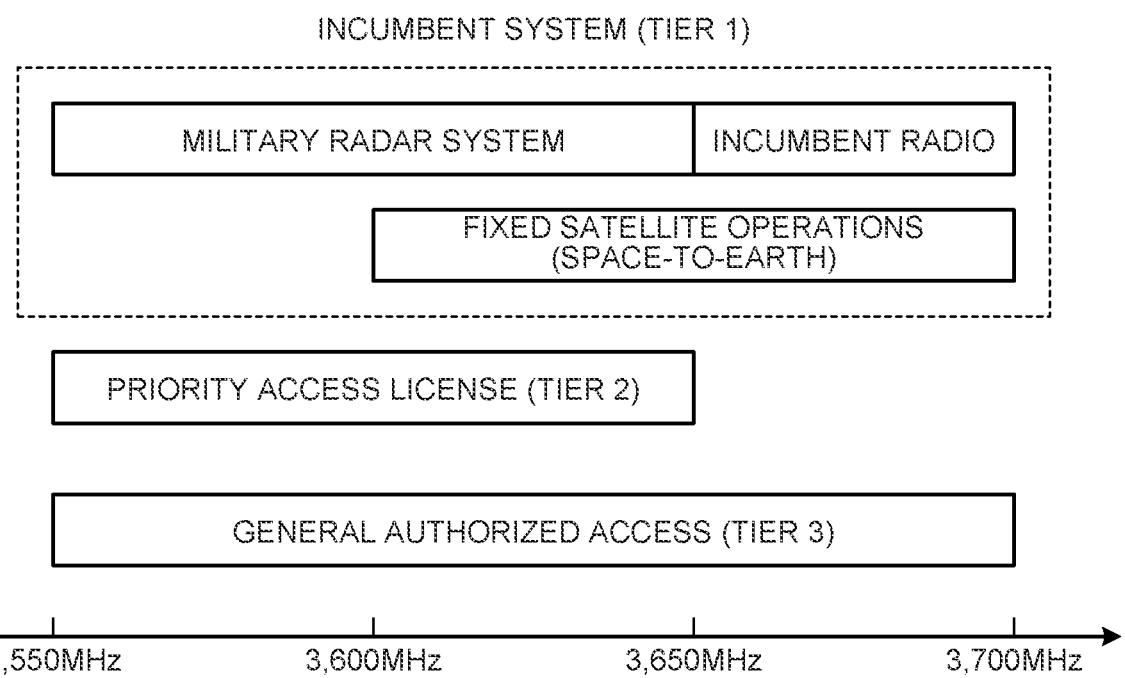
FIG. 3 is a diagram illustrating CBRS bands.

FIG. 3 is a diagram illustrating CBRS bands. In the CBRS described above as an example, the primary system is a military radar system, a grandfathered wireless system, or a fixed satellite service (space-to-earth). Here, the military radar system is typically an in-ship radar. In addition, the secondary system is a radio network system including base stations and terminals referred to as a Citizens Broadband Radio Service Device (CBSD) and an End User Device (EUD). The secondary system is further prioritized into levels, namely, as a Priority Access License (PAL) for which a shared band can be licensed and a General Authorized Access (GAA) equivalent to unlicensed access. The Tier 1 illustrated in FIG. 3 corresponds to the Incumbent Tier illustrated in FIG. 2. The Tier 2 illustrated in FIG. 3 corresponds to the Priority Access Tier illustrated in FIG. 2. The Tier 3 illustrated in FIG. 3 corresponds to the General Authorized Access Tier illustrated in FIG. 2.

Note that the primary system and the secondary system are not limited to the above examples. For example, a radio system included in the Priority Access Tier may be regarded as a primary system, and a system included in a General Authorized Access Tier (GAA Tier) may be regarded as a secondary system.

In addition, the primary system (communication system 1) of the present embodiment is not limited to the example illustrated in FIG. 3. Other types of radio system may be used as the primary system (communication system 1). For example, other radio systems may be set as the primary system according to the country, region, and frequency band to be applied. For example, the primary system may be a television broadcasting system such as a Digital Video Broadcasting-Terrestrial (DVB-T) system. In addition, the primary system may be a radio system called a Fixed System (FS). In addition, spectrum sharing in other frequency bands may be used. Typical examples of this include LSA and TV band white space (TVWS). Furthermore, the primary system may be a cellular communication system such as Long Term Evolution (LTE) or New Radio (NR). The primary system may also be an aeronautical radio system such as an Aeronautical Radio Navigation Service (ARNS). Note that the primary system is not limited to the above radio system, and may be other types of radio system.

Furthermore, an unused radio spectrum (white space) used by the communication system 2 is not limited to the radio wave of the Federal use band (3.55-3.70 GHz). The communication system 2 may use a radio wave in a frequency band different from the Federal use band (3.55-3.70 GHz) as an unused radio spectrum. For example, when the primary system (communication system 1) is a television broadcasting system, the communication system 2 may be a system that uses a TV white space as an unused radio spectrum. Here, the TV white space refers to a frequency band that is not currently used by the television broadcasting system among frequency channels allocated to the television broadcasting system (primary system). At this time, the TV white space may be a channel that is not currently used according to the area.

The relationship between the communication system 1 and the communication system 2 is not limited to the spectrum sharing relationship in which the communication system 1 is a primary system and the communication system 2 is a secondary system. The relationship between the communication system 1 and the communication system 2 may be a network coexistence relationship between the same or different radio systems using the same spectrum.

As terms used in general regarding spectrum sharing, an incumbent system using a target band is referred to as a primary system, and a system of a secondary user is referred to as a secondary system. However, in a case where the present embodiment is applied to an environment other than the spectrum sharing environment, these systems (primary system and secondary system) may be replaced with a system with different terms. For example, a macro cell in HetNet may be defined as a primary system, and a small cell or a relay station may be defined as a secondary system. In addition, the base station may be defined as a primary system, and a relay UE or a vehicle UE implementing D2D or V2X present in its coverage may be defined as a secondary system. The base station is not limited to a fixed type, and may be a portable/mobile type. In such a case, for example, the communication control device provided by the present invention may be included in a base station, a relay station, a relay UE, or the like.

In the present disclosure, the term "frequency" or "spectrum" may be replaced with other terms. For example, the term "frequency" or "spectrum" may be replaced with terms such as "resource", "resource block", "resource element", "channel", "component carrier", "Bandwidth Part (BWP)", "carrier", "subcarrier", and "beam" or terms having similar meanings.

2. CONFIGURATION OF COMMUNICATION SYSTEM

Hereinafter, a communication system 1000 according to an embodiment of the present disclosure will be described. The communication system 1000 includes a communication system 1 and a communication system 2. The communication system 1 (first radio system) is a radio communication system that conducts radio communication using a predetermined frequency band (primary use). The communication system 2 (second radio system) is a radio communication system that conducts radio communication by performing secondary use of a frequency band used by the communication system 1. For example, the communication system 2 is a radio communication system that performs dynamic spectrum sharing of an unused radio spectrum of the communication system 1. The communication system 2 provides a radio service to a user or a device owned by the user by utilizing a predetermined radio access technology.

The communication systems 1 and 2 may be cellular communication systems such as wideband code division multiple access (W-CDMA), code division multiple access 2000 (cdma 2000), LTE, NR, and the like. In the following, "LTE" shall include LTE-advanced (LTE-A), LTE-advanced pro (LTE-A Pro), and evolved universal terrestrial radio access (EUTRA). In addition, "NR" shall include new radio access technology (NRAT) and further EUTRA (FEUTRA).

NR is a radio access technology (RAT) as next generation (fifth generation) following LTE. The NR is a radio access technology that can support various use cases including enhanced mobile broadband (eMBB), massive machine type communications (mMTC), and Ultra-Reliable and Low Latency Communications (URLLC).

Note that the communication systems 1 and 2 are not limited to the cellular communication systems. For example, the communication system 2 may be other radio communication systems such as a wireless local area network (wireless LAN) system, a television broadcasting system, an aeronautical radio system, or a space radio communication system.

In the present embodiment, it is defined that the communication system 1 is a primary system, and the communication system 2 is a secondary system. As described above, the communication system 1 and the communication system 2 may each be provided in plurality. Although the example of FIG. 1 is a case where the communication system 1 includes one radio wave utilization device 10 (radio wave utilization device $10_1$ illustrated in FIG. 1), the communication system 1 may include a plurality of radio wave utilization devices 10 as described above. The configuration of the radio wave utilization device 10 may be the same as or different from the configuration of a base station device 40 or a terminal device 30 described below.

2-1. Overall Configuration of Communication System

The communication system 1000 typically includes the following entities.

Communication device (for example, a base station device or a proxy device)
Terminal device
Management device (for example, communication control device)

The following description is a case where the entities working as the communication devices are assumed to be the radio wave utilization device 10, the base station device 40, and a proxy device 50. However, the entities working as the communication devices are not limited to these devices, and may be other communication devices (for example, a management device 20, the terminal device 30, and the communication control device 60).

Figure 4:
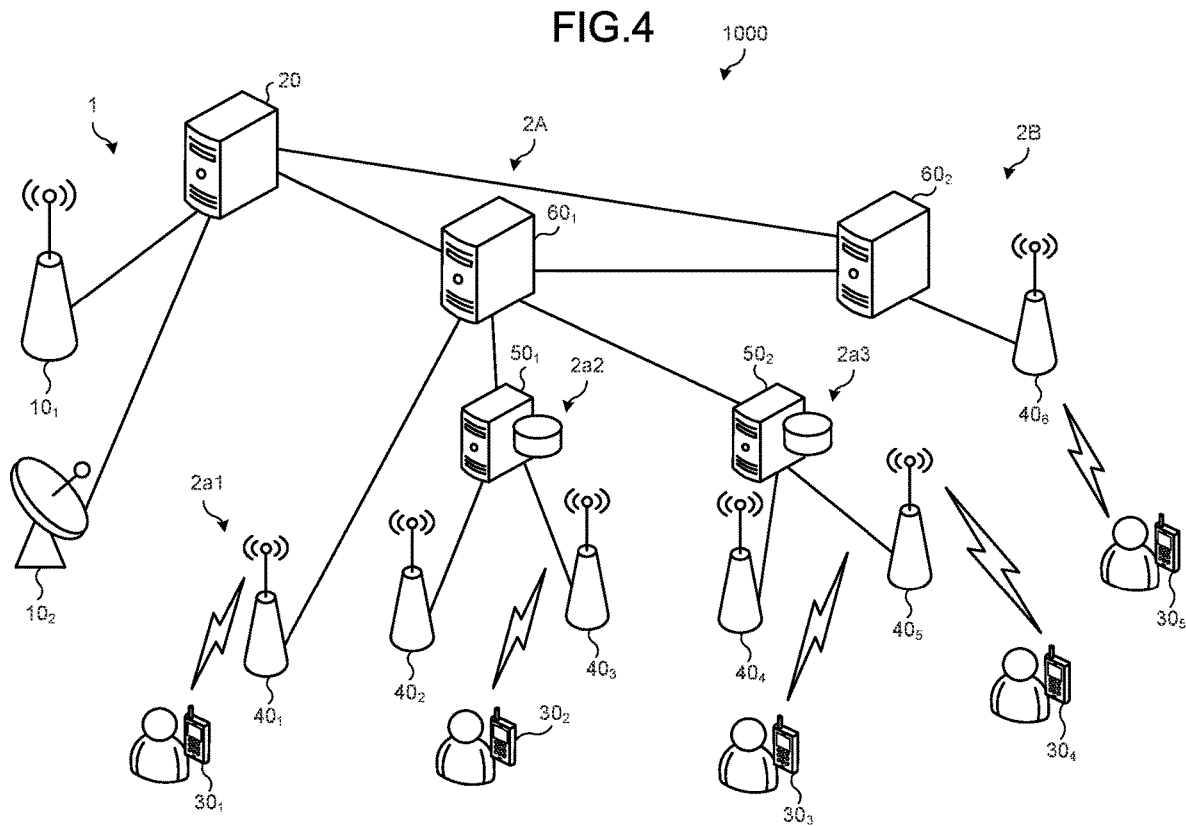
FIG. 4 is a diagram illustrating a configuration example of a communication system according to an embodiment of the present disclosure.

FIG. 4 is a diagram illustrating a configuration example of a communication system 1000 according to an embodiment of the present disclosure. As described above, the communication system 1000 includes the communication system 1 and the communication system 2. Note that the device in the figure can also be considered as a device in a logical sense. That is, parts of the device in the drawing may be partially actualized by a virtual machine (VM), a container, a docker or the like, and they may be implemented on physically the same hardware.

The communication system 1 includes the radio wave utilization device 10 and the management device 20. In the example of FIG. 4, the communication system 1 includes the radio wave utilization devices $10_1$ and $10_2$ and the management device 20 that manages the radio wave utilization devices $10_1$ and $10_2$. Note that the communication system 1 does not necessarily have to include the management device 20. Furthermore, the communication system 1 may include a plurality of radio wave utilization devices 10 or may include only one radio wave utilization device. In the example of FIG. 4, each of the radio wave utilization devices $10_1$ and $10_2$ can be regarded as one communication system 1.

The communication system 2 includes the terminal device 30, the base station device 40, the proxy device 50, and the communication control device 60. In the example of FIG. 4, the communication system 2 is described as a communication system 2A and a communication system 2B. The communication system 2A includes a communication system 2a1, a communication system 2a2, and a communication system 2a3. The communication system 2a1 includes a terminal device $30_1$ and a base station device $40_1$; the communication system 2a2 includes a terminal device $30_2$, base station device $40_2$ to $40_3$, and a proxy device $50_1$; and the communication system 2a3 includes terminal devices $30_2$ to $30_4$, base station devices $40_4$ to $40_5$, and a proxy device $50_2$. The communication system 2B includes a terminal device $30_5$ and a base station device $40_6$.

Note that the communication system 2 does not necessarily have to include the communication control device 60. To describe by using the example of FIG. 4, each of the communication system 2a2 and the communication system 2a3 having an external communication control device 60 may be regarded as one communication system 2. Furthermore, the communication system 2 does not necessarily have to include the proxy device 50. In the example of FIG. 4, the communication system 2a1 without the proxy device 50 may be regarded as one communication system 2.

With cooperative operations of the devices (for example, communication devices such as radio communication devices) constituting the communication systems 1 and 2, the communication systems 1 and 2 provide radio services to a user or a device possessed by the user. The radio communication device is a device having a function of radio communication. In the example of FIG. 4, the radio communication device corresponds to the radio wave utilization device 10, the base station device 40, and the terminal device 30.

Note that the proxy device 50 and the communication control device 60 may have a wireless communication function. In this case, the proxy device 50 and the communication control device 60 can also be regarded as radio communication devices. In the following description, a radio communication device may be simply referred to as a communication device. The communication device is not limited to a radio communication device, and for example, a device capable of wired communication alone and not equipped with a wireless communication function can also be regarded as a communication device.

In the present embodiment, the concept of the "communication device" includes not only a portable mobile device (for example, a terminal device) such as a mobile terminal but also a device installed in a structure or a mobile body. The structure or a mobile body itself may be regarded as a communication device. In addition, the concept of the communication device includes not only a terminal device but also a base station device and a relay device. The communication device is a type of processing device and information processing device. The description of the "communication device" in the following description can be appropriately rephrased as a "transmission device" or a "reception device". In the present embodiment, the concept of "communication" shall include "broadcasting". In this case, the description of the "communication device" can be appropriately rephrased as a "broadcasting device". Accordingly, the description of the "communication device" may be appropriately rephrased as a "transmission device" or a "reception device".

The communication system 2 may include a plurality of the terminal devices 30, a plurality of the base station devices 40, a plurality of the communication control devices 60, and a plurality of the proxy devices 50. In the example of FIG. 4, the communication system 2 includes terminal devices $30_1$, $30_2$, $30_3$, $30_4$, $30_5$, and the like, as the terminal device 30. The communication system 2 includes base station devices $40_1$, $40_2$, $40_3$, $40_4$, $40_5$, $40_6$, and the like as the base station device 40. The communication system 2 includes communication control devices $60_1$, $60_2$, and the like as the communication control device 60.

In the following description, a radio communication device may be referred to as a radio system. For example, each of the terminal devices $30_1$ to $30_5$ is one radio system. In addition, each of the radio wave utilization device 10 and the base station devices $40_1$ to $40_6$ is one radio system. In the following description, the communication system 1 is referred to as a first radio system. However, each of one or a plurality of radio wave utilization devices 10 included in the communication system 1 may be regarded as the first radio system. In the following description, each of one or a plurality of base station devices 40 included in the communication system 2 is referred to as a second radio system. However, the communication system 2 itself may be regarded as a second radio system, or each of one or the plurality of terminal devices 30 included in the communication system 2 may be regarded as a second radio system. When the proxy device 50 and the communication control device 60 have a wireless communication function, each of the proxy devices 50 or each of the communication control devices 60 may be regarded as the second radio system.

Note that the radio system may be one system including a plurality of communication devices including at least one radio communication device. For example, a system including one or a plurality of base station devices 40 and one or a plurality of terminal devices 30 under the base station devices 40 may be regarded as one radio system. Furthermore, the communication system 1 and the communication system 2 can each be regarded as one radio system. In the following description, a communication system including a plurality of communication devices including at least one radio communication device may be referred to as a radio communication system or simply as a communication system. Note that one system including a plurality of communication devices including one radio communication device may be regarded as the first radio system or the second radio system.

In the present embodiment, a "system" represents a set of a plurality of components (devices, modules (components), or the like). At this time, all the components constituting the system may be or need not be in the same housing. For example, a plurality of devices housed in separate housings and connected by wired and/or wireless connection is defined as one system. In addition, one device having a plurality of modules housed in one housing is also one system.

Radio Wave Utilization Device

The radio wave utilization device 10 is a radio communication device constituting the communication system 1 (primary system). The radio wave utilization device 10 may be a radio wave emission device such as a radar or a reflected wave reception device. As described above, the primary system is, for example, a military radar system, an incumbent system (for example, a television broadcasting system or an incumbent cellular communication system), or a fixed satellite service system.

When the communication system 1 is a military radar system, the radio wave utilization device 10 is an in-ship radar, for example. When the communication system 1 is a television broadcasting system, the radio wave utilization device 10 is a broadcasting station (broadcasting station as a facility) such as a broadcasting relay station, for example. When the communication system 1 is a fixed satellite service system, the radio wave utilization device 10 is a parabolic antenna that receives radio waves from an artificial satellite, for example. The radio wave utilization device 10 is not limited to these devices. For example, when the communication system 1 is an incumbent cellular communication system, the radio wave utilization device 10 may be a base station device.

Management Device

The management device 20 is a device that manages the radio wave utilization device 10. For example, the management device 20 is a server or a database owned by an operator or an administrator of the communication system 1.

The management device 20 may be a server or a database owned by a public organization. For example, the management device 20 may be a database (for example, a regulatory database) managed and operated by a national or regional radio administration agency. Examples of the regulatory database include Universal Licensing System (ULS) operated by Federal Communications Commissions (FCC).

In addition, when the communication system 1 is an incumbent cellular communication system, the management device 20 may be a device that manages a radio network. For example, the management device 20 may be a device that functions as a Mobility Management Entity (MME) or an Access and Mobility Management Function (AMF).

When the communication system 2 constitutes a network including the radio wave utilization device 10 as one of nodes, the management device 20 may be a network manager that integrally controls the radio wave utilization device 10 in the network, for example.

Note that the management device 20 is not limited to these examples. The radio wave utilization device 10 may have the function of the management device 20. In this case, the radio wave utilization device 10 can be regarded as the management device 20.

In addition, the management device 20 may have a function of a communication control device. In this case, the management device 20 can be regarded as the communication control device 60.

Terminal Device

The terminal device 30 is a communication device having a communication function. The terminal device 30 is typically a communication device such as a smartphone. The terminal device 30 may be a user terminal such as a mobile phone, a smart device (smartphone or tablet), a wearable terminal, an Internet of Things (IoT) device, a personal digital assistant (PDA), or a personal computer. Furthermore, the terminal device 30 may be a professional-use camera equipped with a communication function. The terminal device may also be referred to as User Equipment, User Terminal, User Station, Mobile Terminal, Mobile Station, or the like.

Furthermore, the terminal device 30 may be capable of sidelink communication with another terminal device 30. When performing sidelink communication, the terminal device 30 may be able to use an automatic retransmission technology such as hybrid automatic repeat request (Hybrid ARQ (HARQ)). The radio communication (including sidelink communication) used by the terminal device 30 may be wireless communication using radio waves or wireless communication (optical wireless communication) using infrared rays or visible light.

Furthermore, the terminal device 30 may be a mobile device. Here, the mobile device is a movable radio communication device. At this time, the terminal device 30 may be a radio communication device installed on a mobile body, or may be the mobile body itself. For example, the terminal device 30 may be a vehicle that moves on a road, such as an automobile, a bus, a truck, or a motorbike, or may be a radio communication device mounted on the vehicle. The mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 30 may perform communication while being simultaneously connected to a plurality of base station devices or a plurality of cells. For example, when one base station device supports a communication area via a plurality of cells (for example, pCell and sCell), it is possible to bundle the plurality of cells and communicate between the base station device 40 and the terminal device 30 by using a carrier aggregation (CA) technology, a dual connectivity (DC) technology, or a multi-connectivity (MC) technology. Alternatively, the terminal device 30 and the plurality of base station devices 40 can communicate with each other by a Coordinated Multi-Point Transmission and Reception (CoMP) technology via cells of different base station devices 40.

Note that the terminal device 30 does not need to be used by a person. The terminal device 30 may be a sensor installed in a machine or a building of a factory, such as a sensor used for communication referred to as machine type communication (MTC). The terminal device 30 may be a machine to machine (M2M) device or an internet of things (IoT) device. Furthermore, the terminal device 30 may be a device having a relay communication function as represented by Device-to-Device (D2D) and Vehicle-to-everything (V2X). Furthermore, the terminal device 30 may be a device referred to as Client Premises Equipment (CPE) used in a radio backhaul or the like. Furthermore, the terminal device 30 may be a radio communication device installed on a mobile body, or may be the mobile body itself.

Base Station Device

The base station device 40 (second radio system) is a radio communication device that performs radio communication with the terminal device 30 or other communication devices (other base station devices 40 or other proxy devices 50). The base station device 40 is a type of communication device. The base station device 40 is, for example, a device corresponding to a radio base station (also referred to as Base Station, Node B, eNB, gNB, etc.) or a radio access point. The base station device 40 may be a radio relay station. Furthermore, the base station device 40 may be an on-road base station device such as a Road Side Unit (RSU). Furthermore, the base station device 40 may be an optical link device referred to as a Remote Radio Head (RRH). The base station device 40 may be an Integrated Access and Backhaul (IAB) donor node or an IAB relay node that provides a radio access channel and a radio backhaul channel by using time division multiplexing, frequency division multiplexing, or space division multiplexing.

In the present embodiment, a base station of a radio communication system may be referred to as a base station device. Note that the radio access technology used by the base station device 40 may be a cellular communication technology or a wireless LAN technology. Note that the radio access technology used by the base station device 40 is not limited thereto, and may be other radio access technologies. Furthermore, the radio communication used by the base station device 40 may be wireless communication using radio waves or wireless communication (optical wireless communication) using infrared rays or visible light.

The base station device 40 is not necessarily to be fixed, and may be installed in a moving object such as an automobile. Furthermore, the base station device 40 does not necessarily need to exist on the ground. The communication device function may be provided on an object existing in the air or space, such as an aircraft, a drone, a helicopter, or a satellite, or on an object existing on the sea or under the sea, such as a ship or a submarine. In such a case, the base station device 40 can perform radio communication with another fixedly installed communication device.

The concept of the base station device (also referred to as a base station) includes not only a donor base station but also a relay base station (also referred to as a relay station or a relay station device). The concept of a base station also includes an access point. Furthermore, a base station conceptually includes not only a structure having a function of a base station but also a device installed in the structure.

Examples of the structure include a building such as an office building, a house, a steel tower, a station facility, an airport facility, a port facility, or a stadium. A structure conceptually includes not only buildings but also non-building structures such as tunnels, bridges, dams, fences, and steel columns, as well as facilities such as cranes, gates, and windmills. In addition, a structure conceptually includes not only land-based (ground-based, in a narrow sense) structures or underground structures but also structures on the water, such as a jetty and a mega-float, and underwater structures such as an ocean observation facility.

The base station device 40 may be a donor station or a relay station. The base station device 40 may be a fixed station or a mobile station. The mobile station is a radio communication device (for example, a base station device) configured to be movable. At this time, the base station device 40 may be a device installed on a mobile body, or may be the mobile body itself. For example, a relay station device having mobility can be regarded as the base station device 40 as a mobile station. In addition, a device designed to have mobility, such as a vehicle, a drone, or a smartphone, and having a function of a base station device (at least a part of the function of a base station device) also corresponds to the base station device 40 as a mobile station.

Here, the mobile body may be a mobile terminal such as a smartphone or a mobile phone. The mobile body may be a mobile body that moves on the land (ground in a narrow sense) (for example, a vehicle such as an automobile, a motorcycle, a bus, a truck, a motorbike, a train, or a linear motor car), or a mobile body (for example, subway) that moves under the ground (for example, through a tunnel).

The mobile body may be a mobile body that moves on the water (for example, a ship such as a passenger ship, a cargo ship, and a hovercraft), or a mobile body that moves underwater (for example, a submersible ship such as a submersible boat, a submarine, or an unmanned submarine).

Furthermore, the mobile body may be a mobile body that moves in the atmosphere (for example, an aircraft such as an airplane, an airship, or a drone), or may be a mobile body that moves outside the atmosphere (for example, an artificial astronomical object such as an artificial satellite, a spaceship, a space station, or a spacecraft). A mobile body moving outside the atmosphere can be rephrased as a space mobile body.

Furthermore, the base station device 40 may be a terrestrial base station device (ground station device) installed on the ground. For example, the base station device 40 may be a base station device arranged in a structure on the ground, or may be a base station device installed in a mobile body moving on the ground. More specifically, the base station device 40 may be an antenna installed in a structure such as a building and a signal processing device connected to the antenna. Note that the base station device 40 may be a structure or a mobile body itself. The "ground" represents not only a land (ground in a narrow sense) but also a ground or terrestrial in a broad sense including underground, abovewater, and underwater.

Note that the base station device 40 is not limited to the terrestrial base station device. The base station device 40 may be a non-terrestrial base station device (non-ground station device) capable of floating in the air or space. For example, the base station device 40 may be an aircraft station device or a satellite station device.

The aircraft station device is a radio communication device capable of floating in the atmosphere, such as an aircraft. The aircraft station device may be a device mounted on an aircraft or the like, or may be an aircraft itself. The concept of the aircraft includes not only heavy aircraft such as an airplane and a glider but also light aircraft such as a hot-air balloon and an airship. In addition, the concept of an aircraft includes not only a heavy aircraft and a light aircraft but also a rotorcraft such as a helicopter and an auto-gyro. Note that the aircraft station device (or an aircraft on which an aircraft station device is mounted) may be an unmanned aerial vehicle such as a drone.

Note that the concept of the unmanned aerial vehicle also includes an unmanned aircraft system (UAS) and a tethered UAS. The concept of unmanned aerial vehicles also includes a Lighter-than-Air (LTA) unmanned aircraft system (UAS) and a Heavier-than-Air (HTA) unmanned aircraft system (UAS). Other concepts of unmanned aerial vehicles also include High Altitude Platforms (HAPs) unmanned aircraft system (UAS).

The satellite station device is a radio communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, or a highly elliptical orbiting (HEO) satellite. Accordingly, the satellite station device may be a device mounted on a low earth orbiting satellite, a medium earth orbiting satellite, a geostationary earth orbiting satellite, or a highly elliptical orbiting satellite.

As described above, the base station device 40 may be a relay station device. The relay station device is an aeronautical station or an earth station, for example. The relay station device can be regarded as a type of the above-described relay device. The aeronautical station is a radio station installed on the ground or a mobile body moving on the ground in order to communicate with an aircraft station device. Furthermore, the earth station is a radio station located on the earth (including air) in order to communicate with the satellite station device. The earth station may be a large earth station or a small earth station such as a very small aperture terminal (VSAT).

Note that the earth station may be a VSAT control earth station (also referred to as a master station or a HUB station) or may be a VSAT earth station (also referred to as a slave station). Furthermore, the earth station may be a radio station installed in a mobile body moving on the ground. Examples of an earth station mounted on a ship include an Earth Stations on board Vessels (ESV). Furthermore, the earth station may include an aircraft earth station that is installed in an aircraft (including a helicopter) and that communicates with a satellite station. Furthermore, the earth station may include an aeronautical earth station that is installed on a mobile body moving on the ground and that communicates with the aircraft earth station via a satellite station. Note that the relay station device may be a mobile radio station that communicates with a satellite station or an aircraft station.

The coverage of the base station device 40 may be large such as a macro cell or small such as a pico cell. Needless to say, the coverage of the base station device 40 may be extremely small such as a femto cell. Furthermore, the base station device 40 may have a beamforming capability. In this case, the base station device 40 may form a cell or a service area for each beam.

The base station device 40 can be utilized, operated, and/or managed by various entities. Assumable examples of the base station device 40 include: a mobile network operator (MNO), a mobile virtual network operator (MVNO), a mobile virtual network enabler (MVNE), a neutral host network (NHN) operator, an enterprise, an educational institution (incorporated educational institutions, boards of education of local governments, and the like), a real estate (building, apartment, etc.) administrator, or an individual. Note that the subject of use, operation, and/or management of the base station device 40 is not limited thereto.

The base station device 40 may be installed and/or operated by one business operator, or may be installed and/or operated by one individual. Note that the installation/operation subject of the base station device 40 is not limited thereto. For example, the base station device 40 may be installed and operated by a plurality of business operators or a plurality of individuals in cooperation. Furthermore, the base station device 40 may be a shared facility used by a plurality of business operators or a plurality of individuals. In this case, installation and/or operation of the facility may be performed by a third party different from the user.

The base station device 40 operated by business operators is typically connected to the Internet via a core network. Furthermore, operation management and maintenance of the base station device 40 is performed by a function referred to as Operation, Administration & Maintenance (OA & M). Incidentally, the communication system 2 can include a network manager that integrally controls the base station device 40 in the network, for example.

Proxy Device

The proxy device 50 (proxy system) is a device that communicates with the communication control device 60 substituting (representing) one or a plurality of communication devices (for example, the base station device 40). The proxy device 50 is also a type of communication device.

The proxy device 50 may be a domain proxy (DP) defined in Non Patent Literature 2 or the like. Here, the DP refers to an entity that communicates with a communication control device such as SAS instead of each of a plurality of CBSDs, or an entity that communicates with a communication control device such as SAS instead of a network including a plurality of CBSDs. The proxy device 50 is not limited to the DP defined in Non Patent Literature 2 as long as it has a function of communicating with the communication control device 60 substituting (representing) one or a plurality of communication devices. A network manager that integrally controls the base station device 40 in the network may be regarded as the proxy device 50.

Note that the proxy system may include one device or a plurality of devices. Communication between the proxy device 50 and the base station device 40 may be wired communication or wireless communication. Similarly, the communication between the proxy device 50 and the communication control device 60 may be wired communication or wireless communication.

The communication device substituted (or represented) by the proxy device 50 is not limited to the base station device 40, and may be the terminal device 30, for example. In the following description, one or a plurality of communication devices (for example, one or a plurality of base station devices 40) substituted (or represented) by the proxy device 50 will sometimes be referred to as subordinate communication devices (for example, the subordinate base station device 40).

Communication Control Device

The communication control device 60 is a device that manages the base station device 40. For example, the communication control device 60 is a device that controls radio communication of the base station device 40. For example, the communication control device 60 is a device that determines communication parameters (also referred to as operational parameters) to be used by the base station device 40 and gives permission or an instruction to the base station device 40.

At this time, the communication control device 60 may be a network manager that integrally controls radio devices within the network. In an example of definition of ETSI EN 303 387 or IEEE 802.19.1-2014, the communication control device 60 may be a control device such as a Spectrum Manager/Coexistence Manager that performs radio wave interference control between radio devices. Furthermore, for example, a registered location secure server (RLSS) defined in IEEE 802.11-2016 can also work as the communication control device 60. In addition, under the spectrum shared environment, a database (database server, device, and system) such as a geo-location database (GLDB) or a spectrum access system (SAS) can also work as the communication control device 60.

When the communication system 2 is a cellular communication system, the communication control device 60 may be a device constituting a core network. The core network CN is, for example, an evolved packet core (EPC) or a 5G core network (5GC). When the core network is the EPC, the communication control device 60 may be a device having a function as a mobility management entity (MME), for example. When the core network is a 5GC, the communication control device 60 may be a device having a function as an access and mobility management function (AMF) or a session management function (SMF), for example. Note that even when the communication system 2 is a cellular communication system, the communication control device 60 does not necessarily have to be a device constituting a core network. For example, the communication control device 60 may be a device having a function as a radio network controller (RNC).

Note that the communication control device 60 may have a function of a gateway. For example, when the core network is an EPC, the communication control device 60 may be a device having a function as a serving gateway (S-GW) or a packet data network gateway (P-GW). When the core network is a 5GC, the communication control device 60 may be a device having a function as a user plane function (UPF). Note that the communication control device 60 does not necessarily have to be a device constituting the core network. For example, it is assumed that the core network is a core network of W-CDMA or cdma 2000. At this time, the communication control device 60 may be a device that functions as a radio network controller (RNC).

Basically, the communication control device 60 has the base station device 40 as a control target, but the communication control device 60 may also control the terminal device 30 under the base station device 40. Furthermore, the communication control device 60 may control a plurality of secondary systems. In this case, the communication system 2 can be regarded as a system including a plurality of secondary systems.

Figure 5:
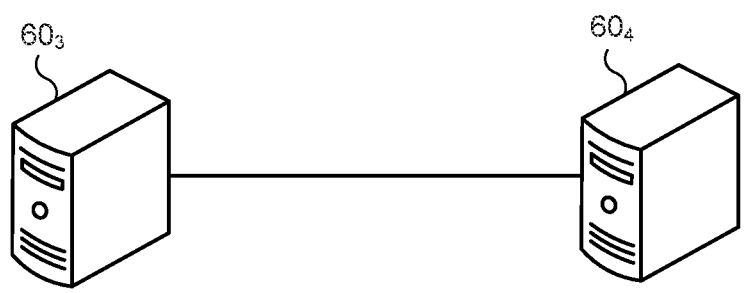
FIG. 5 is a diagram illustrating a model in which communication control devices are arranged in a distributed manner.

Furthermore, a plurality of communication control devices 60 may be present in one communication system 2. FIG. 5 is a diagram illustrating a model in which the communication control device 60 is arranged in a distributed manner. In this case, the plurality of communication control devices 60 (the communication control device 60₃ and the communication control device 60₄ in the case of the example of FIG. 5) exchange information of their managed base station devices 40 with each other, and perform allocation of necessary spectrum and calculation of interference control.

Figure 6:
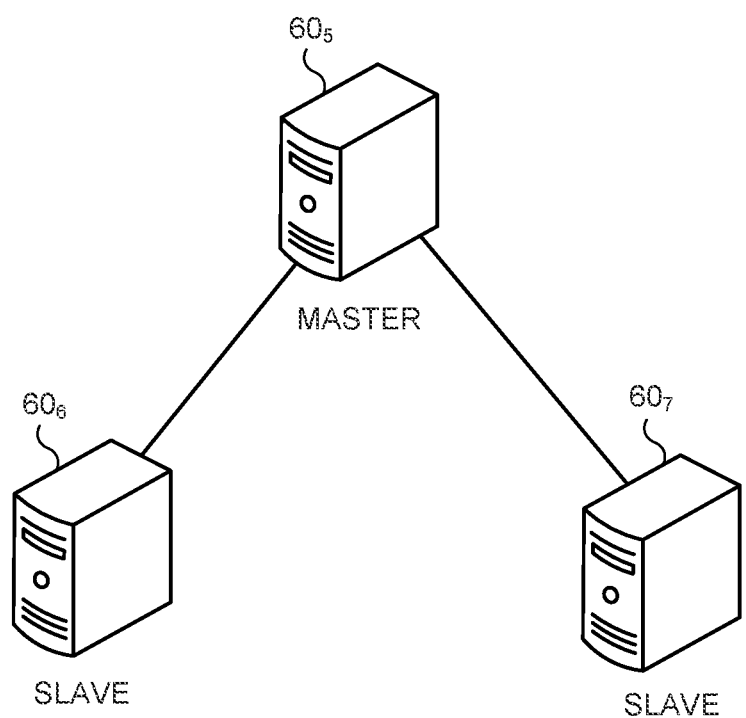
FIG. 6 is a diagram illustrating a model in which one communication control device centrally controls a plurality of communication control devices.

Furthermore, the communication control devices 60 may be master-slave devices. FIG. 6 is a diagram illustrating a model (referred to as a master-slave model) in which one communication control device centrally controls a plurality of communication control devices. In the example of FIG. 6, the communication control device 60₅ is a master communication control device, while the communication control devices 60₆ and 60₇ are slave communication control devices. In such a system, the master communication control device can control the plurality of slave communication control devices to collectively make a decision. In addition, the master communication control device can also perform delegation, discarding, and the like of the decision-making authority to each slave communication control device for the purpose of load balancing and the like.

Note that the communication control device 60 can also acquire necessary information from entities other than the base station device 40, the terminal device 30, and the proxy device 50 for achieving its functions. Specifically, the communication control device 60 can acquire information necessary for protection, such as location information of the primary system, from a database (regulatory database) managed and operated by a national or regional radio administration agency, for example. An example of the regulatory database is a Universal Licensing System (ULS) operated by the United States Federal Communications Commission. Other examples of information necessary for protection can include information such as Out-of-Band Emission (OOBE) limit, Adjacent Channel Leakage Ratio (ACLR), Adjacent Channel Selectivity, fading margin, and/or protection ratio (PR), for example. For these examples, in a case where numerical values are fixedly given by law, it is desirable to use the given numerical values.

Furthermore, as another example, it is also conceivable that the communication control device 60 acquires radio wave sensing information from a radio wave sensing system installed and operated for the purpose of radio wave detection in the primary system. As a specific example, the communication control device 60 can acquire radio wave detection information of the primary system from a radio wave sensing system such as an Environmental Sensing Capability (ESC) in CBRS of the United States. Furthermore, in a case where the communication device or the terminal has a sensing function, the communication control device 60 may acquire radio wave detection information of the primary system from the communication device or the terminal.

Hereinafter, configurations of individual devices included in the communication system 1000 will be specifically described.

2-2. Configuration of Radio Wave Utilization Device

Figure 7:
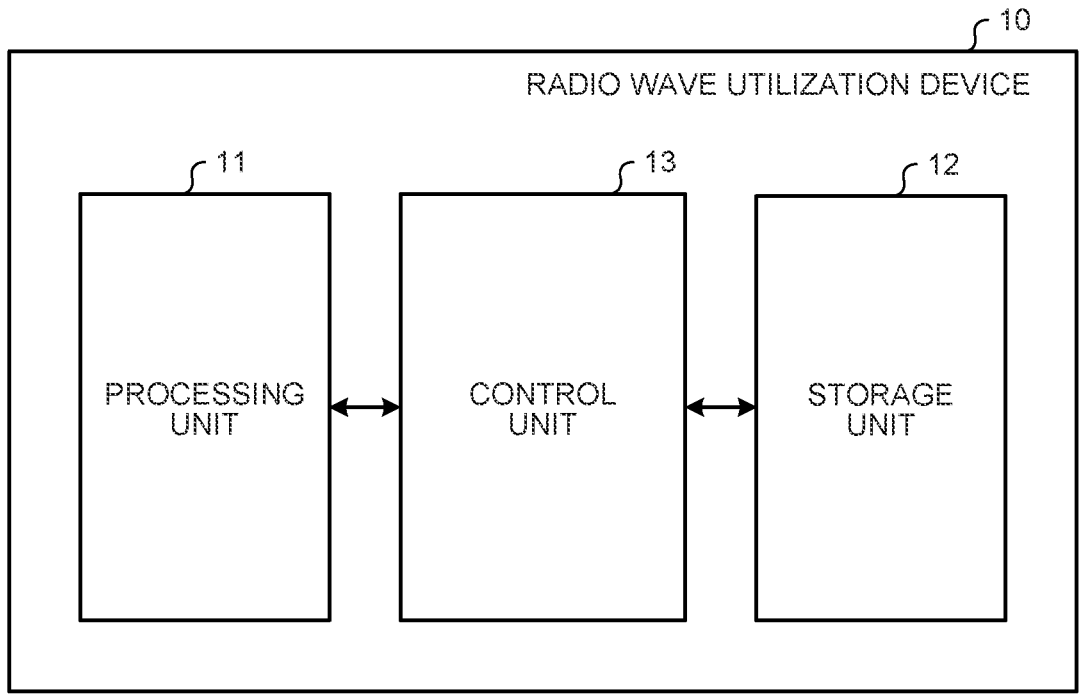
FIG. 7 is a diagram illustrating a configuration example of a radio wave utilization device according to an embodiment of the present disclosure.

First, the configuration of the radio wave utilization device 10 will be described. FIG. 7 is a diagram illustrating a configuration example of the radio wave utilization device 10 according to an embodiment of the present disclosure. The radio wave utilization device 10 performs primary use of a predetermined frequency band. For example, the radio wave utilization device 10 is a communication device (radio system) that performs radio communication with other radio communication device(s). In this case, the radio wave utilization device 10 can be regarded as a type of communication device. Note that the radio wave utilization device 10 may be a radio wave emission device or a reflected wave reception device. The radio wave utilization device 10 is a type of information processing device.

The radio wave utilization device 10 includes a processing unit 11, a storage unit 12, and a control unit 13. Note that the configuration illustrated in FIG. 7 is a functional configuration, and the hardware configuration may be different from this. Furthermore, the functions of the radio wave utilization device 10 may be implemented in a distributed manner in a plurality of physically separated configurations.

The processing unit 11 is a processing unit for utilizing a radio wave in a predetermined frequency band. For example, the processing unit 11 is a signal processing unit that performs various processes for outputting and receiving a radio wave in a predetermined frequency band. When the radio wave utilization device 10 works as a radio communication device, the processing unit 11 may be a radio communication interface that performs radio communication with other communication device(s). Here, the other communication devices include not only communication devices that perform cellular communication and the like but also transmission devices that transmit broadcast waves, such as television broadcasting, and reception devices that receive broadcast waves.

The storage unit 12 is a data readable/writable storage device such as dynamic random access memory (DRAM), static random access memory (SRAM), a flash drive, or a hard disk. The storage unit 12 functions as a storage means in the radio wave utilization device 10.

The control unit 13 is a controller that controls individual components of the radio wave utilization device 10. The control unit 13 is actualized by a processor such as a central processing unit (CPU) or a micro processing unit (MPU). For example, the control unit 13 is actualized by execution of various programs stored in the storage device inside the radio wave utilization device 10 by the processor using random access memory (RAM) or the like as a work area. Note that the control unit 13 may be actualized by an integrated circuit such as an application specific integrated circuit (ASIC) or a field programmable gate array (FPGA). The CPU, MPU, ASIC, and FPGA can all be regarded as controllers.

Note that the radio wave utilization device 10 may have a function as the management device 20. In this case, the control unit 13 may have individual functional blocks included in the control unit of the management device 20.

2-3. Configuration of Management Device

Figure 8:
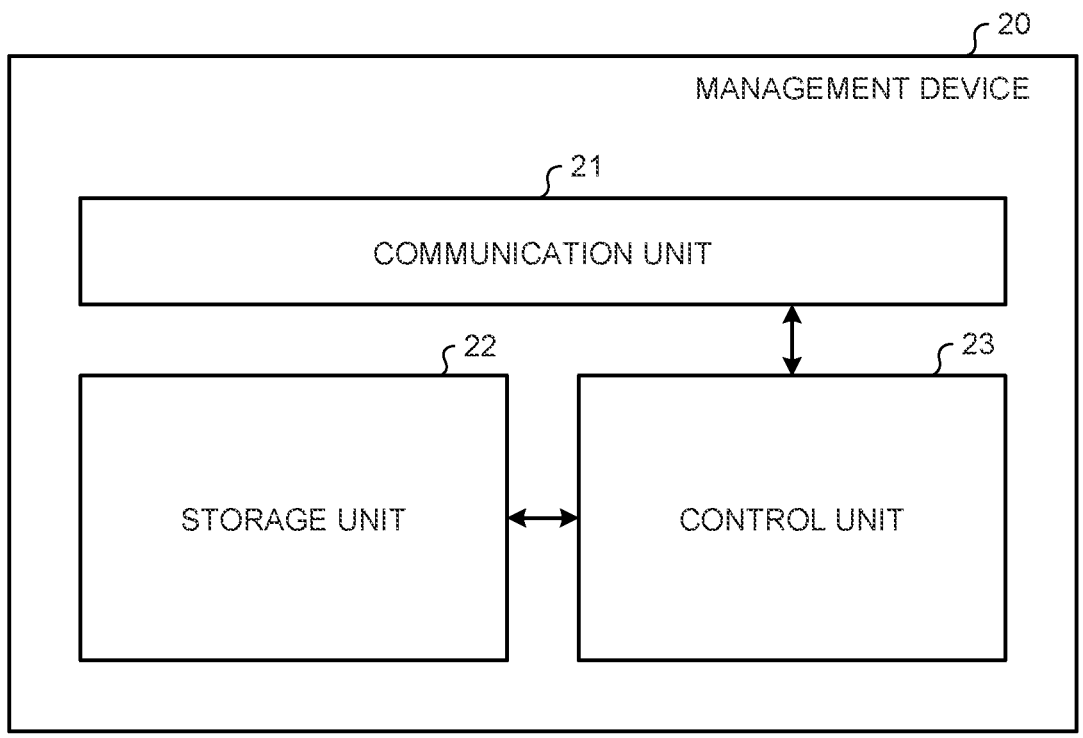
FIG. 8 is a diagram illustrating a configuration example of a management device according to an embodiment of the present disclosure.

Next, a configuration of the management device 20 will be described. FIG. 8 is a diagram illustrating a configuration example of the management device 20 according to an embodiment of the present disclosure. The management device 20 is a device that manages the radio wave utilization device 10. The management device 20 may be a device that manages radio wave output of the radio wave utilization device 10, or may be a device that manages information such as an installation mode and a management subject of the radio wave utilization device 10. The management device 20 is a type of information processing device.

The management device 20 includes a communication unit 21, a storage unit 22, and a control unit 23. Note that the configuration illustrated in FIG. 7 is a functional configuration, and the hardware configuration may be different from this. Furthermore, the functions of the management device 20 may be implemented in a distributed manner in a plurality of physically separated configurations.

The communication unit 21 is a communication interface for communicating with other devices. The communication unit 21 may be a network interface or a device connection interface. For example, the communication unit 21 may be a local area network (LAN) interface such as a network interface card (NIC), or may be a universal serial bus (USB) interface including a USB host controller, a USB port, and the like. Furthermore, the communication unit 21 may be a wired interface or a wireless interface. The communication unit 21 functions as a communication means of the management device 20. The communication unit 21 communicates with the radio wave utilization device 10 under the control of the control unit 23.

The storage unit 22 is a data readable/writable storage device such as DRAM, SRAM, a flash drive, and a hard disk. The storage unit 22 functions as a storage means in the management device 20. The storage unit 22 stores the first identifier and the like. The first identifier will be described below.

The control unit 23 is a controller that controls individual parts of the management device 20. The control unit 23 is actualized by a processor such as a CPU or an MPU, for example. For example, the control unit 23 is actualized by the processor executing various programs stored in the storage device inside the management device 20 using RAM or the like as a work area. Note that the control unit 23 may be actualized by an integrated circuit such as an ASIC or an FPGA. The CPU, MPU, ASIC, and FPGA can all be regarded as controllers.

As described above, the radio wave utilization device 10 can be regarded as the management device 20. In this case, the description of "management device 20" in the following description can be appropriately replaced with "radio wave utilization device 10".

2-4. Configuration of Terminal Device

Figure 9:
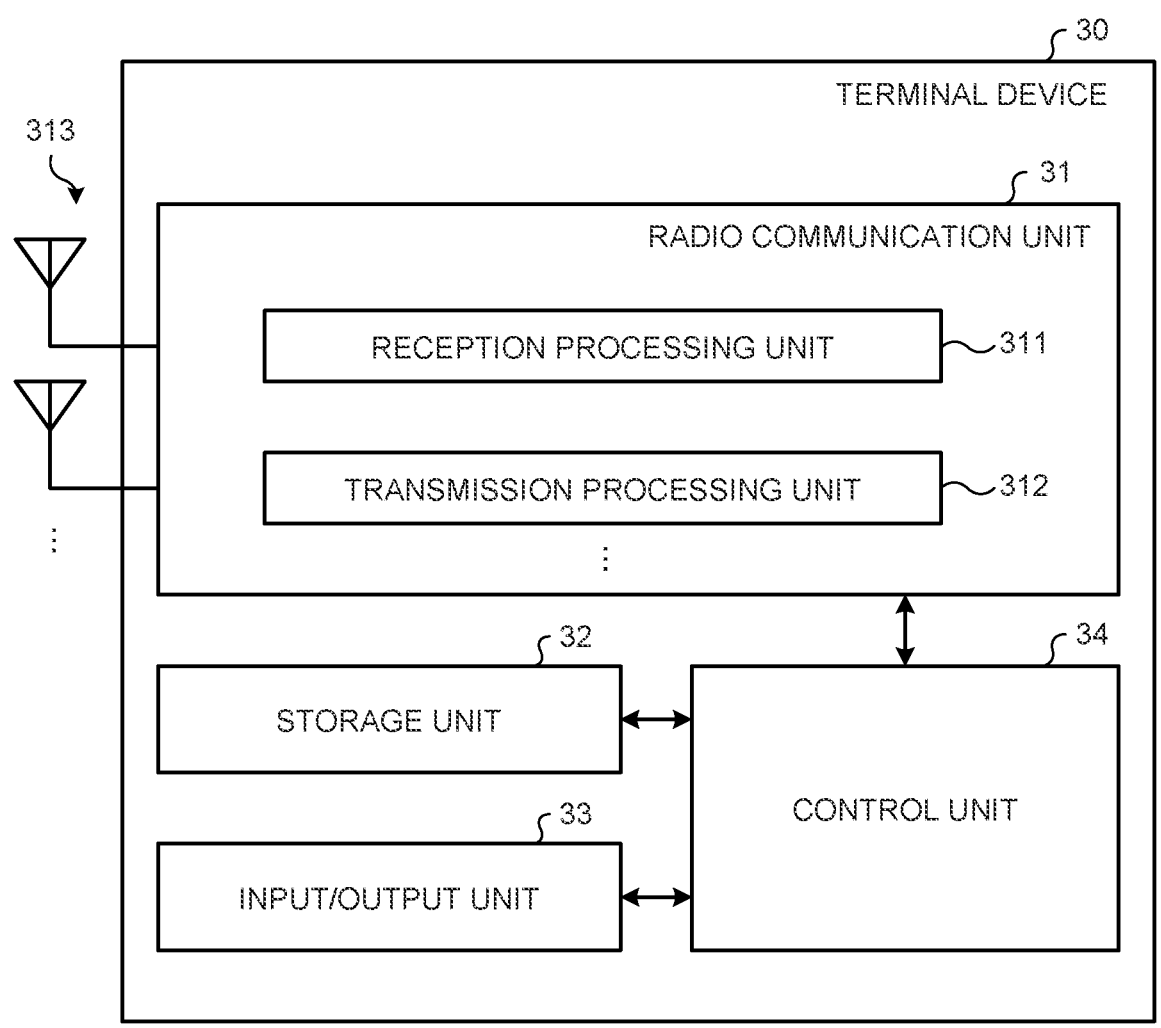
FIG. 9 is a diagram illustrating a configuration example of a terminal device according to an embodiment of the present disclosure.

Next, a configuration of the terminal device 30 will be described. FIG. 9 is a diagram illustrating a configuration example of the terminal device 30 according to an embodiment of the present disclosure. The terminal device 30 is a communication device (radio system) that performs radio communication with the base station device 40 and/or the communication control device 60. The terminal device 30 is a type of information processing device.

The terminal device 30 includes a radio communication unit 31, a storage unit 32, an input/output unit 33, and a control unit 34. Note that the configuration illustrated in FIG. 9 is a functional configuration, and the hardware configuration may be different from this. Furthermore, the functions of the terminal device 30 may be implemented in a distributed manner in a plurality of physically separated configurations.

The radio communication unit 31 is a radio communication interface that performs radio communication with other communication devices (for example, the base station device 40 and other terminal device (s) 30). The radio communication unit 31 operates under the control of the control unit 34. The radio communication unit 31 may support one or a plurality of radio access methods. For example, the radio communication unit 31 supports both NR and LTE. The radio communication unit 31 may support other radio access methods such as W-CDMA and cdma 2000.

The radio communication unit 31 includes a reception processing unit 311, a transmission processing unit 312, and an antenna 313. The radio communication unit 31 may include a plurality of the reception processing units 311, a plurality of the transmission processing units 312, and a plurality of the antennas 313. In a case where the radio communication unit 31 supports a plurality of radio access methods, individual portions of the radio communication unit 31 can be configured separately for each of the radio access methods. For example, the reception processing unit 311 and the transmission processing unit 312 may be individually configured depending on LTE and NR. The configurations of the reception processing unit 311 and the transmission processing unit 312 are similar to those of the reception processing unit 411 and the transmission processing unit 412 of the base station device 40.

The storage unit 32 is a data readable/writable storage device such as DRAM, SRAM, a flash drive, and a hard disk. The storage unit 32 functions as a storage means in the terminal device 30.

The input/output unit 33 is a user interface for exchanging information with the user. For example, the input/output unit 33 is an operation device such as a keyboard, a mouse, operation keys, and a touch panel, used by a user to perform various operations. Alternatively, the input/output unit 33 is a display device such as a liquid crystal display, or an organic electroluminescence (EL) display. The input/output unit 33 may be an acoustic device such as a speaker or a buzzer. Furthermore, the input/output unit 33 may be a lighting device such as a light emitting diode (LED) lamp. The input/output unit 33 functions as an input/output means (input means, output means, operation means, or notification means) provided on the terminal device 30.

The control unit 34 is a controller that controls individual parts of the terminal device 30. The control unit 34 is actualized by a processor such as a CPU or an MPU, for example. For example, the control unit 34 is actualized by a processor executing various programs stored in a storage device inside the terminal device 30 using RAM or the like as a work area. Note that the control unit 34 may be actualized by an integrated circuit such as an ASIC or an FPGA. The CPU, MPU, ASIC, and FPGA can all be regarded as controllers. Note that the control unit 34 may include individual functional blocks included in the control unit of the base station device 40.

2-5. Configuration of Base Station Device

Figure 10:
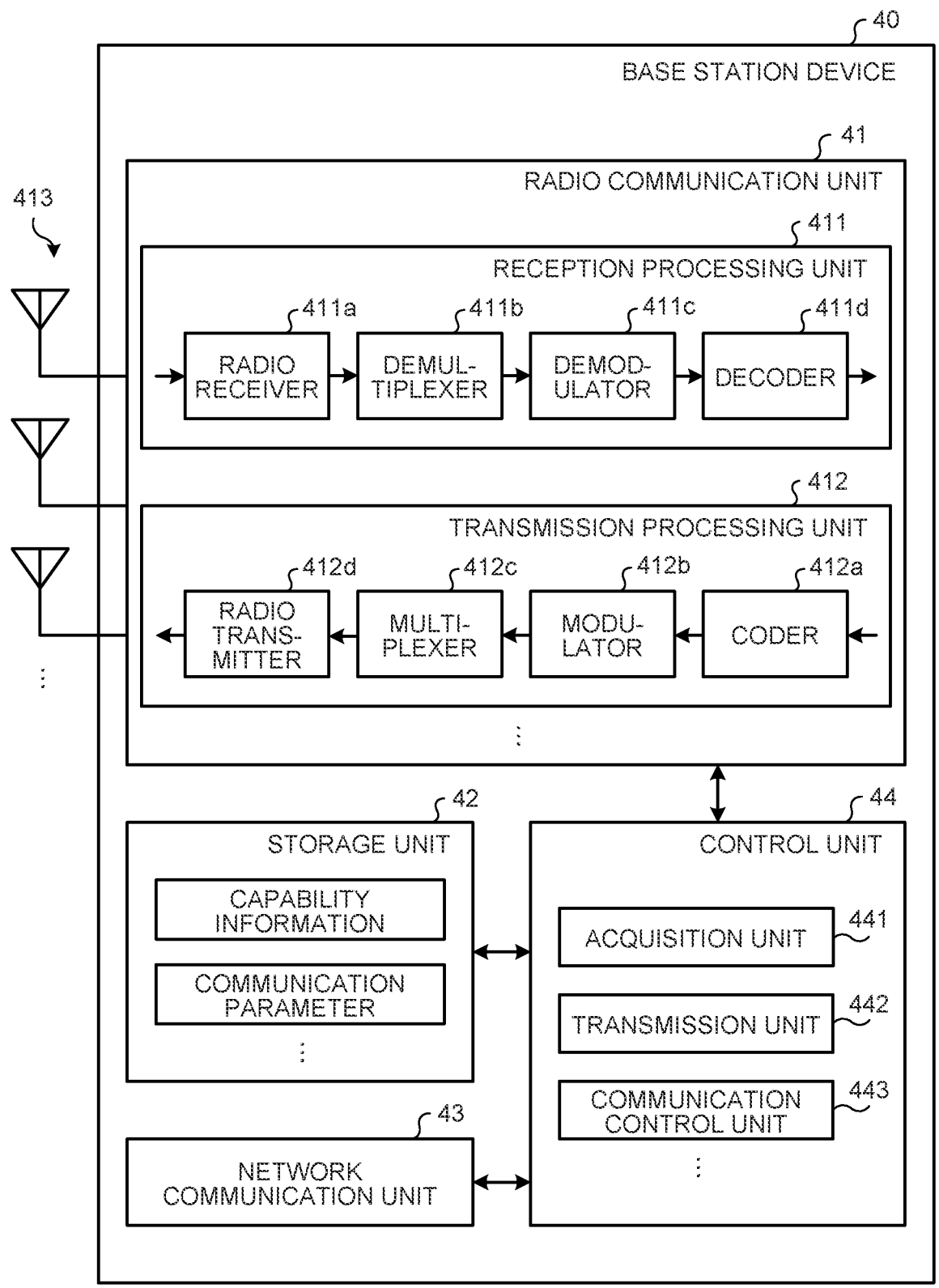
FIG. 10 is a diagram illustrating a configuration example of a base station device according to an embodiment of the present disclosure.

Next, a configuration of the base station device 40 will be described. FIG. 10 is a diagram illustrating a configuration example of the base station device 40 according to an embodiment of the present disclosure. The base station device 40 is a communication device (radio system) that performs radio communication with the terminal device 30 under the control of the communication control device 60. The base station device 40 is a type of information processing device.

The base station device 40 includes a radio communication unit 41, a storage unit 42, a network communication unit 43, and a control unit 44. Note that the configuration illustrated in FIG. 10 is a functional configuration, and the hardware configuration may be different from this. Furthermore, the functions of the base station device 40 may be implemented in a distributed manner in a plurality of physically separated devices.

The radio communication unit 41 is a radio communication interface that performs radio communication with other communication devices (for example, the terminal device 30, the communication control device 60, the proxy device 50, and another base station device 40). The radio communication unit 41 operates under the control of the control unit 44. The radio communication unit 41 may support a plurality of radio access methods. For example, the radio communication unit 41 may support both NR and LTE. The radio communication unit 41 may support other cellular communication methods such as W-CDMA and cdma 2000. For example, the radio communication unit 41 may support the wireless LAN communication method in addition to the cellular communication method. Needless to say, the radio communication unit 41 may be configured to support a single radio access method.

The radio communication unit 41 includes a reception processing unit 411, a transmission processing unit 412, and an antenna 413. The radio communication unit 41 may include a plurality of the reception processing units 411, a plurality of the transmission processing units 412, and a plurality of the antennas 413. In a case where the radio communication unit 41 supports a plurality of radio access methods, individual portions of the radio communication unit 41 can be configured separately for each of the radio access methods. For example, if the base station device 40 is compatible with NR and LTE, the reception processing unit 411 and the transmission processing unit 412 may be configured separately for NR and LTE.

The reception processing unit 411 processes an uplink signal received via the antenna 413. The reception processing unit 411 includes a radio receiver 411*a*, a demultiplexer 411*b*, a demodulator 411*c*, and a decoder 411*d*.

The radio receiver 411*a* performs processes on the uplink signal, such as down-conversion, removal of unnecessary frequency components, amplification level control, orthogonal demodulation, conversion to digital signal, removal of guard interval, and frequency domain signal extraction using fast Fourier transform. For example, it is assumed that the radio access method of the base station device 40 is a cellular communication method such as LTE. At this time, the demultiplexer 411*b* demultiplexes an uplink channel such as a physical uplink shared channel (PUSCH) or a physical uplink control channel (PUCCH) and an uplink reference signal from the signal output from the radio receiver 411*a*. Using a modulation scheme such as binary phase shift keying (BPSK) or quadrature phase shift keying (QPSK) for the modulation symbol of the uplink channel, the demodulator 411*c* demodulates the received signal. The modulation scheme used by the demodulator 411*c* may be 16 quadrature amplitude modulation (QAM), 64 QAM, or 256 QAM. The decoder 411*d* performs a decoding process on the demodulated coded bits of the uplink channel. The decoded uplink data and uplink control information are output to the control unit 44.

The transmission processing unit 412 performs transmission processing of downlink control information and downlink data. The transmission processing unit 412 includes a coder 412*a*, a modulator 412*b*, a multiplexer 412*c*, and a radio transmitter 412*d*.

The coder 412*a* encodes the downlink control information and the downlink data input from the control unit 44 by using a coding method such as block coding, convolutional coding, or turbo coding. The modulator 412*b* modulates the coded bits output from the coder 412*a* by a predetermined modulation scheme such as BPSK, QPSK, 16 QAM, 64 QAM, or 256 QAM. The multiplexer 412*c* multiplexes the modulation symbol of each of channels and the downlink reference signal and allocates the multiplexed signals on a predetermined resource element. The radio transmitter 412*d* performs various kinds of signal processing on the signal from the multiplexer 412*c*. For example, the radio transmitter 412*d* performs processes such as conversion to the time domain using fast Fourier transform, addition of a guard interval, generation of a baseband digital signal, conversion to an analog signal, quadrature modulation, upconvert, removal of extra frequency components, and power amplification. The signal generated by the transmission processing unit 412 is transmitted from the antenna 413.

The storage unit 42 is a data readable/writable storage device such as DRAM, SRAM, a flash drive, and a hard disk. The storage unit 42 functions as a storage means in the base station device 40. The storage unit 42 stores desired transmission power information, operational parameters, resource holding information, and the like.

The desired transmission power information is information regarding transmission power required by the base station device 40 for information regarding transmission power necessary for transmission of radio waves, to the communication control device 60.

The operational parameter is information (for example, the setting information) related to the radio transmission operation of the base station device 40. For example, the operational parameter is information regarding the maximum value of the transmission power (maximum allowable transmission power) allowed for the base station device 40. Note that the operational parameter is not limited to the information of the maximum allowable transmission power.

In addition, the resource holding information is information related to holding of radio resources of the base station device 40. For example, the resource holding information is information of radio resources currently usable by the base station device 40. For example, the resource holding information is information regarding a holding amount of the interference margin allocated from the communication control device 60 to the base station device 40. The information regarding the holding amount may be information in units of resource blocks described below. That is, the resource holding information may be information regarding the resource block held by the base station device 40 (for example, the resource block holding amount).

The network communication unit 43 is a communication interface for communicating with other devices (for example, the communication control device 60, the proxy device 50, and other base station devices 40). An example of the network communication unit 43 is a local area network (LAN) interface such as a Network Interface Card (NIC). The network communication unit 43 may be a universal serial bus (USB) interface including a USB host controller, a USB port, and the like. Furthermore, the network communication unit 43 may be a wired interface or a wireless interface. The network communication unit 43 functions as a network communication means of the base station device 40. The network communication unit 43 communicates with other devices under the control of the control unit 44

The control unit 44 is a controller that controls individual components of the base station device 40. The control unit 44 is actualized by a processor such as a central processing unit (CPU) or a micro processing unit (MPU), for example. For example, the control unit 44 is actualized by execution of various programs stored in the storage device inside the base station device 40 by the processor using random access memory (RAM) or the like as a work area. The control unit 44 may be actualized by an integrated circuit such as an application specific integrated circuit (ASIC) or a field programmable gate array (FPGA). The CPU, MPU, ASIC, and FPGA can all be regarded as controllers.

As illustrated in FIG. 10, the control unit 44 includes an acquisition unit 441, a transmission unit 442, and a communication control unit 443. Individual blocks (acquisition unit 441 to communication control unit 443) constituting the control unit 44 are functional blocks individually indicating functions of the control unit 44. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 44 may be configured in a functional unit different from the above-described functional block.

As described above, the control unit 34 of the terminal device 30 may have individual functional blocks included in the control unit 44 of the base station device 40. In this case, the description of the "base station device 40" in the following description can be appropriately replaced with the "terminal device 30". In addition, descriptions of "control unit 44", "acquisition unit 441", "transmission unit 442", and "communication control unit 443" in the following description can also be replaced with "control unit 13" as appropriate.

2-5. Configuration of Proxy Device

Figure 11:
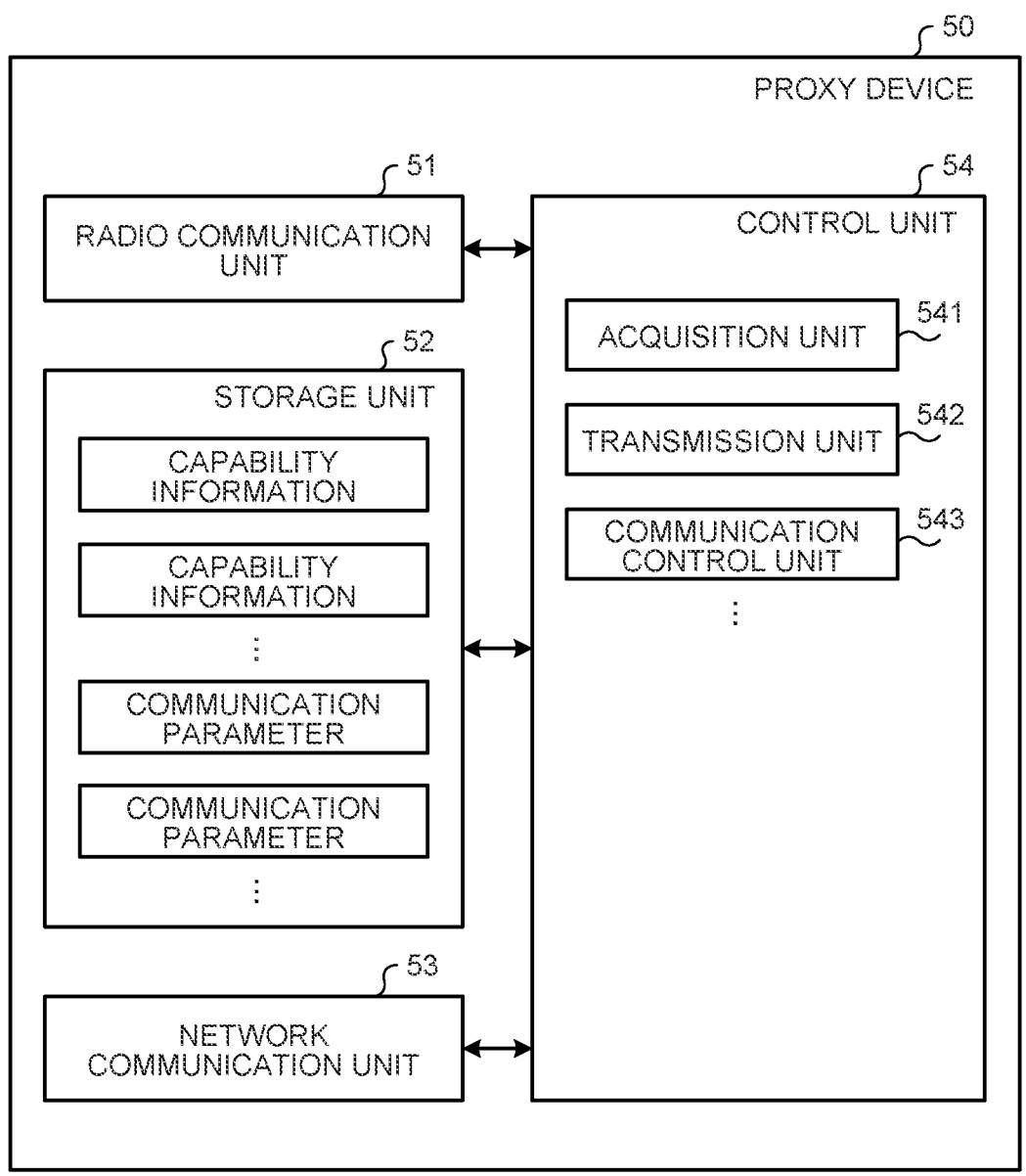
FIG. 11 is a diagram illustrating a configuration example of a proxy device according to an embodiment of the present disclosure.

Next, a configuration of the proxy device 50 will be described. FIG. 11 is a diagram illustrating a configuration example of the proxy device 50 according to an embodiment of the present disclosure. The proxy device 50 is a communication device that communicates with the base station device 40 and the communication control device 60. The proxy device 50 is a type of information processing device.

The proxy device 50 includes a radio communication unit 51, a storage unit 52, a network communication unit 53, and a control unit 54. Note that the configuration illustrated in FIG. 11 is a functional configuration, and the hardware configuration may be different from this. Furthermore, the functions of the proxy device 50 may be implemented in a distributed manner in a plurality of physically separated configurations.

The radio communication unit 51 is a radio communication interface that performs radio communication with other communication devices (for example, the base station device 40, the terminal device 30, the communication control device 60, and other proxy device (s) 50). The radio communication unit 51 operates under the control of the control unit 54. The radio communication unit 51 may support one or a plurality of radio access methods. For example, the radio communication unit 51 supports both NR and LTE. The radio communication unit 51 may support other radio access methods such as W-CDMA and cdma 2000. The configuration of the radio communication unit 51 is similar to that of the radio communication unit 41 of the base station device 40.

The storage unit 52 is a data readable/writable storage device such as DRAM, SRAM, a flash drive, and a hard disk. The storage unit 52 functions as a storage means in the proxy device 50. The storage unit 52 may store desired transmission power information, an operational parameter, resource holding information, and the like of each of the subordinate base station devices 40.

The network communication unit 53 is a communication interface for communicating with other devices (for example, the base station device 40, the communication control device 60, and another proxy device 50). For example, the network communication unit 53 is a LAN interface such as an NIC. The network communication unit 53 may be a USB interface including a USB host controller, a USB port, and the like. Furthermore, the network communication unit 53 may be a wired interface or a wireless interface. The network communication unit 53 functions as a network communication means in the proxy device 50. The network communication unit 53 communicates with other devices under the control of the control unit 54.

The control unit 54 is a controller that controls individual parts of the proxy device 50. The control unit 54 is actualized by a processor such as a CPU or an MPU, for example. For example, the control unit 54 is actualized by a processor executing various programs stored in a storage device inside the proxy device 50 using RAM or the like as a work area. Note that the control unit 54 may be actualized by an integrated circuit such as an ASIC or an FPGA. The CPU, MPU, ASIC, and FPGA can all be regarded as controllers.

As illustrated in FIG. 11, the control unit 54 includes an acquisition unit 541, a transmission unit 542, and a communication control unit 543. Individual blocks (acquisition unit 541 to communication control unit 543) constituting the control unit 54 are functional blocks individually indicating functions of the control unit 54. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 54 may be configured in a functional unit different from the above-described functional block. The operation of individual blocks constituting the control unit 54 will be described below.

The operations of individual blocks (the acquisition unit 541 to the communication control unit 543) constituting the control unit 54 may be the same as the operations of individual blocks (the acquisition unit 441 to the communication control unit 443) constituting the control unit 54 of the base station device 40. In this case, the description of the "proxy device 50" in the following description can be appropriately replaced with the "base station device 40". Similarly, description of "control unit 54", "acquisition unit 541", "transmission unit 542", and "communication control unit 543" in the following description can be appropriately replaced with "control unit 44", "acquisition unit 441", "transmission unit 442", and "communication control unit 443".

2-6. Configuration of Communication Control Device

The communication control device 60 is a device that controls radio communication of the base station device 40. The communication control device 60 may control radio communication of the terminal device 30 via the base station device 40 or directly. The communication control device 60 is a type of information processing device.

Figure 12:
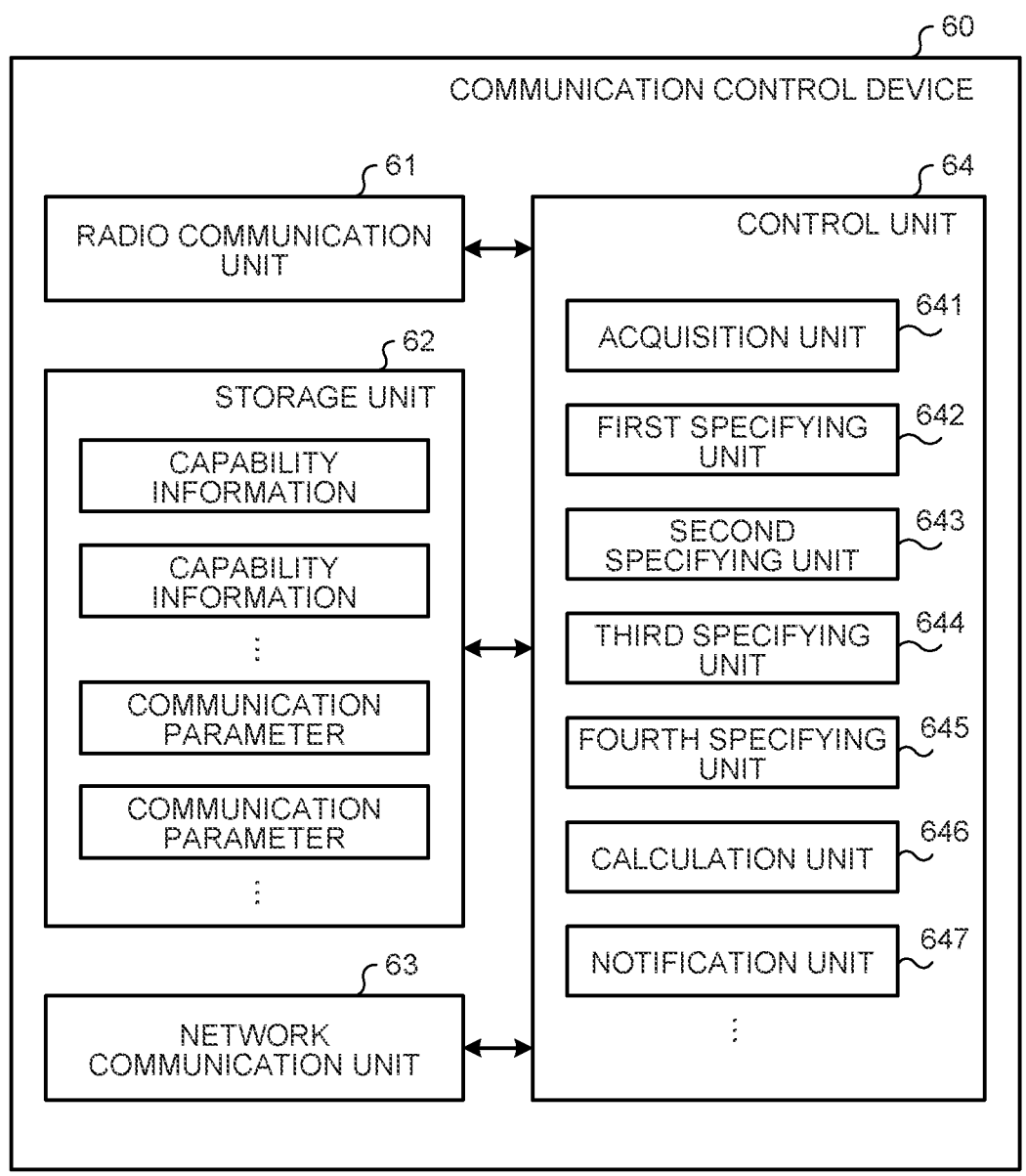
FIG. 12 is a diagram illustrating a configuration example of a communication control device according to an embodiment of the present disclosure.

FIG. 12 is a diagram illustrating a configuration example of the communication control device 60 according to an embodiment of the present disclosure. The communication control device 60 includes a radio communication unit 61, a storage unit 62, a network communication unit 63, and a control unit 64. Note that the configuration illustrated in FIG. 12 is a functional configuration, and the hardware configuration may be different from this. Furthermore, the functions of the communication control device 60 may be implemented in a distributed manner in a plurality of physically separated configurations. For example, the communication control device 60 may be constituted with a plurality of server devices.

The radio communication unit 61 is a radio communication interface that performs radio communication with other communication devices (for example, the base station device 40, the terminal device 30, the proxy device 50, and other communication control device (s) 60). The radio communication unit 61 operates under the control of the control unit 64. The radio communication unit 61 may support one or a plurality of radio access methods. For example, the radio communication unit 61 supports both NR and LTE. The radio communication unit 61 may support other radio access methods such as W-CDMA and cdma 2000. The configuration of the radio communication unit 61 is similar to that of the radio communication unit 41 of the base station device 40.

The storage unit 62 is a data readable/writable storage device such as DRAM, SRAM, a flash drive, and a hard disk. The storage unit 62 functions as a storage means in the base station device 40. The storage unit 62 stores operational parameters of each of the plurality of base station devices 40 constituting the communication system 2. Note that the storage unit 62 may store the resource holding information of each of the plurality of base station devices 40 constituting the communication system 2. As described above, the resource holding information is information regarding holding of the radio resource of the base station device 40.

The network communication unit 63 is a communication interface for communicating with other devices (for example, the base station device 40, the proxy device 50, and other communication control device (s) 60). The network communication unit 63 may be a network interface or a device connection interface. For example, the network communication unit 63 may be a local area network (LAN) interface such as a Network Interface Card (NIC). In addition, the network communication unit 63 may be a universal serial bus (USB) interface including a USB host controller, a USB port, and the like. Furthermore, the network communication unit 63 may be a wired interface or a wireless interface. The network communication unit 63 functions as a communication means in the communication control device 60. Under the control of the control unit 64, the network communication unit 63 communicates with the base station device 40, the terminal device 30, and the proxy device 50.

The control unit 64 is a controller that controls individual parts of the communication control device 60. The control unit 64 is actualized by a processor such as a CPU or an MPU, for example. For example, the control unit 64 is actualized by a processor executing various programs stored in a storage device inside the communication control device 60 using RAM or the like as a work area. Note that the control unit 64 may be actualized by an integrated circuit such as an ASIC or an FPGA. The CPU, MPU, ASIC, and FPGA can all be regarded as controllers.

As illustrated in FIG. 12, the control unit 64 includes an acquisition unit 641, a first specifying unit 642, a second specifying unit 643, a third specifying unit 644, a fourth specifying unit 645, a calculation unit 646, and a notification unit 647. Individual blocks (the acquisition unit 641 to the notification unit 647) constituting the control unit 64 are functional blocks individually indicating functions of the control unit 64. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 64 may be configured in a functional unit different from the above-described functional block. The operation of individual blocks constituting the control unit 64 will be described below.

3. INTERFERENCE MODEL

Figure 13:
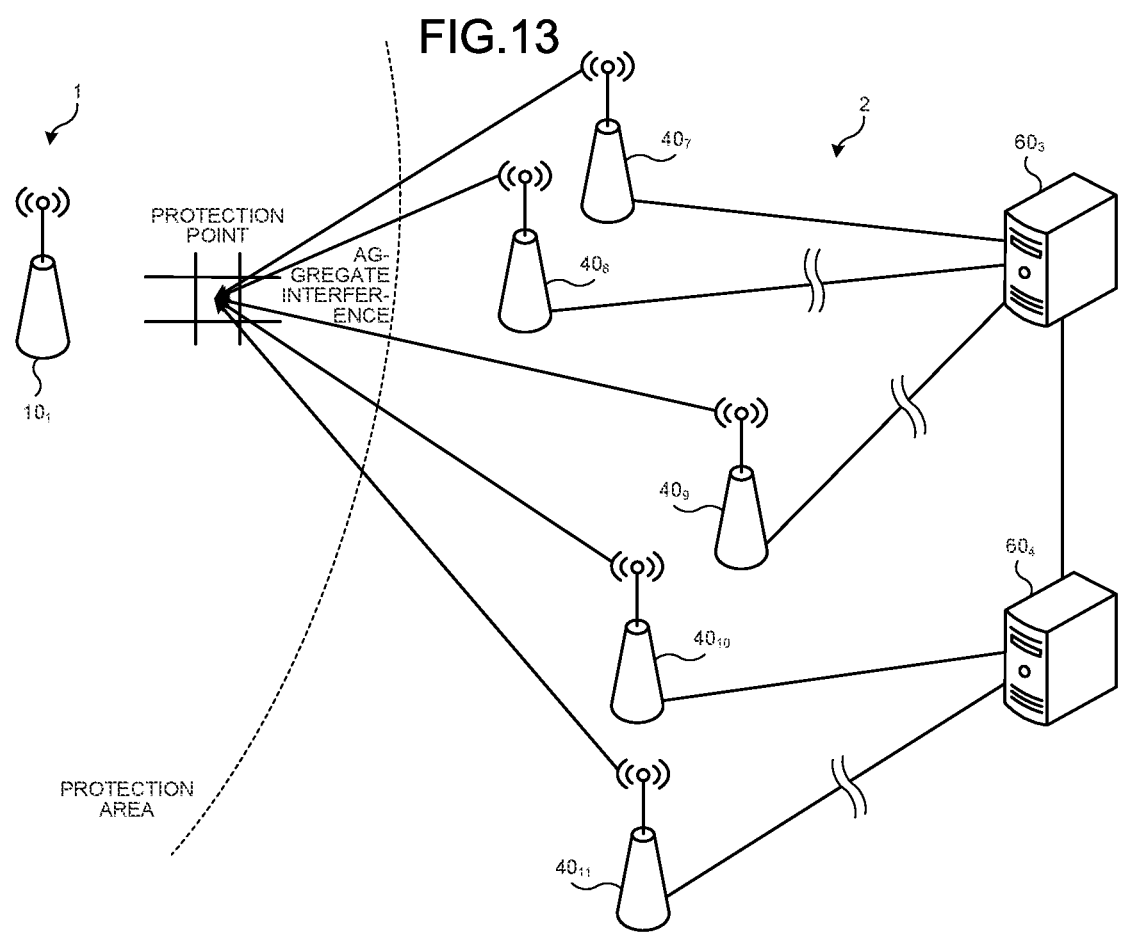
FIG. 13 is a diagram illustrating an example of an interference model assumed in an embodiment of the present disclosure.

Next, an interference model assumed in the present embodiment will be described. FIG. 13 is a diagram illustrating an example of an interference model assumed in an embodiment of the present disclosure. Note that the description of the base station device 40 in the following description can be replaced with a word indicating another communication device having a wireless communication function.

The interference model illustrated in FIG. 13 is applied in a case where the primary system has a service area, for example. In the example of FIG. 13, the communication system 1 (primary system) is a radio communication system having a service area. This service area is to be a protection area of the communication system 1, for example. A plurality of interference calculation points of reference (hereinafter, referred to as an interference calculation point or a protection point) is set in the protection area. The protection point is set by an operator of the communication system 1, a public organization that manages radio waves, or the like (hereinafter, referred to as an administrator), for example. For example, the administrator may divide the protection area into a grid-like shape and set the center of a predetermined grid as the protection point. The protection point can be determined by any method.

The protection point may be set not only in the horizontal direction but also in the vertical direction. That is, the protection points may be arranged three-dimensionally. In the following description, a three-dimensionally arranged protection point (that is, a protection point under an assumption of a three-dimensional space, rather than in a protection point under an assumption of a horizontal plane) may be referred to as a spatial protection point.

The interference margin of each protection point is set by an administrator or the like. FIG. 13 illustrates interference given to a protection point by a plurality of base station devices 40 constituting the communication system 2 (secondary system). The communication control device 60 of the communication system 2 controls the transmission power of the plurality of base station devices 40 such that the aggregate interference at each protection point does not exceed a set interference margin.

Figure 14:
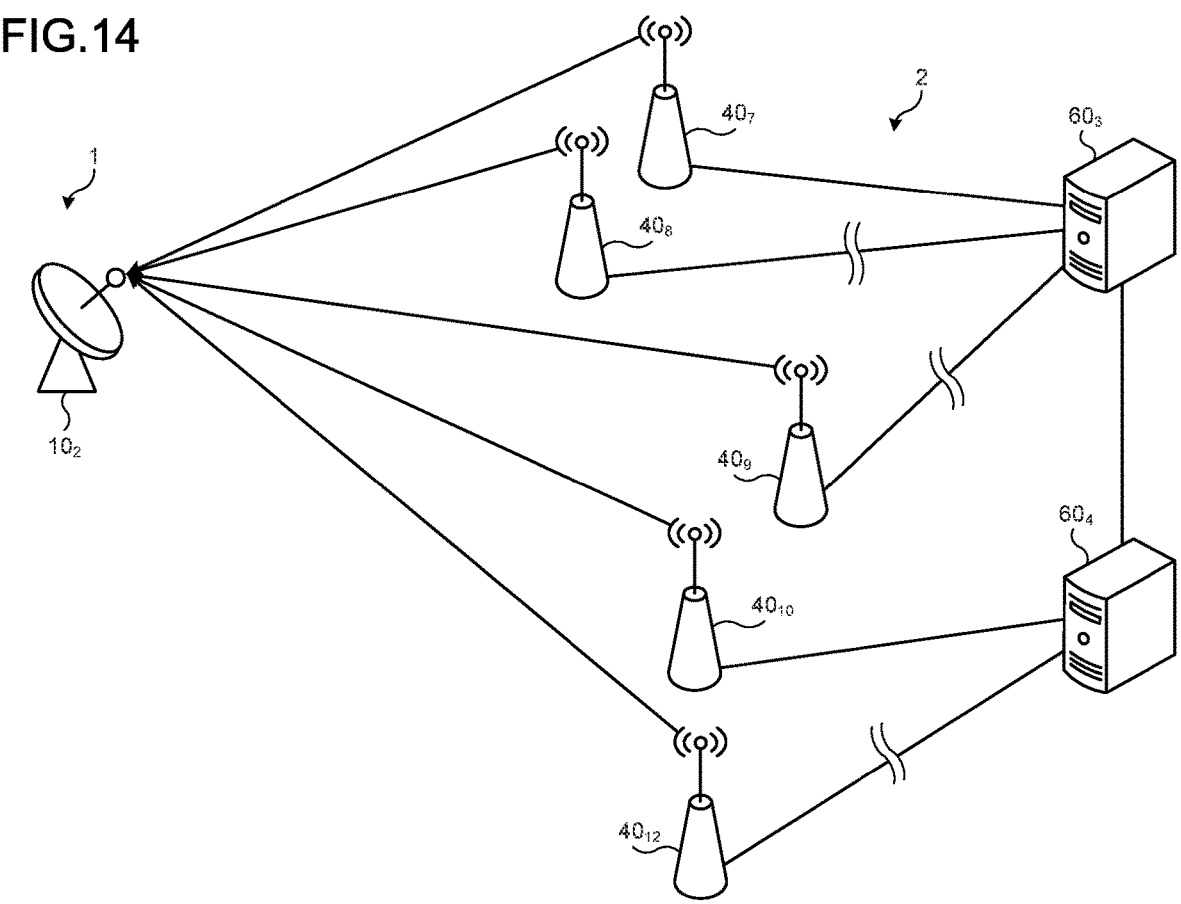
FIG. 14 is a diagram illustrating another example of an interference model assumed in an embodiment of the present disclosure.

FIG. 14 is a diagram illustrating another example of an interference model assumed in the embodiment of the present disclosure. The interference model illustrated in FIG. 14 is applied in a case where the primary system performs only reception, for example. In the example of FIG. 14, the communication system 1 (primary system) includes a reception antenna as the radio wave utilization device $10_2$. The radio wave utilization device $10_2$ is a reception antenna of a satellite ground station, for example. The communication control device 60 of the communication system 2 sets the position of the reception antenna as a protection point, and controls the transmission power of the plurality of base station devices 40 such that the aggregate interference at the point does not exceed an interference margin.

4. PRIMARY SYSTEM PROTECTION METHOD

Next, a primary system protection method will be described. As described above, the primary system protection method can be classified into the following two types, for example.

(1) Interference margin simultaneous allocation type
(2) Interference margin sequential allocation type An example of the interference margin simultaneous allocation type primary system protection method is a method disclosed in Non Patent Literature 3 (for example, a calculation method of the maximum allowable EIRP), for example. In addition, an example of the interference margin sequential allocation type primary system protection method is a sequential allocation process (referred to as Iterative Allocation Process (IAP)) disclosed in Non Patent Literature 6, for example.

Hereinafter, the "interference margin simultaneous allocation type" primary system protection method and the "interference margin sequential allocation type" primary system protection method will be described. Note that the description of the base station device 40 in the following description can be replaced with a word indicating another communication device having a wireless communication function.

4-1. Interference Margin Simultaneous Allocation Type

Figure 15:
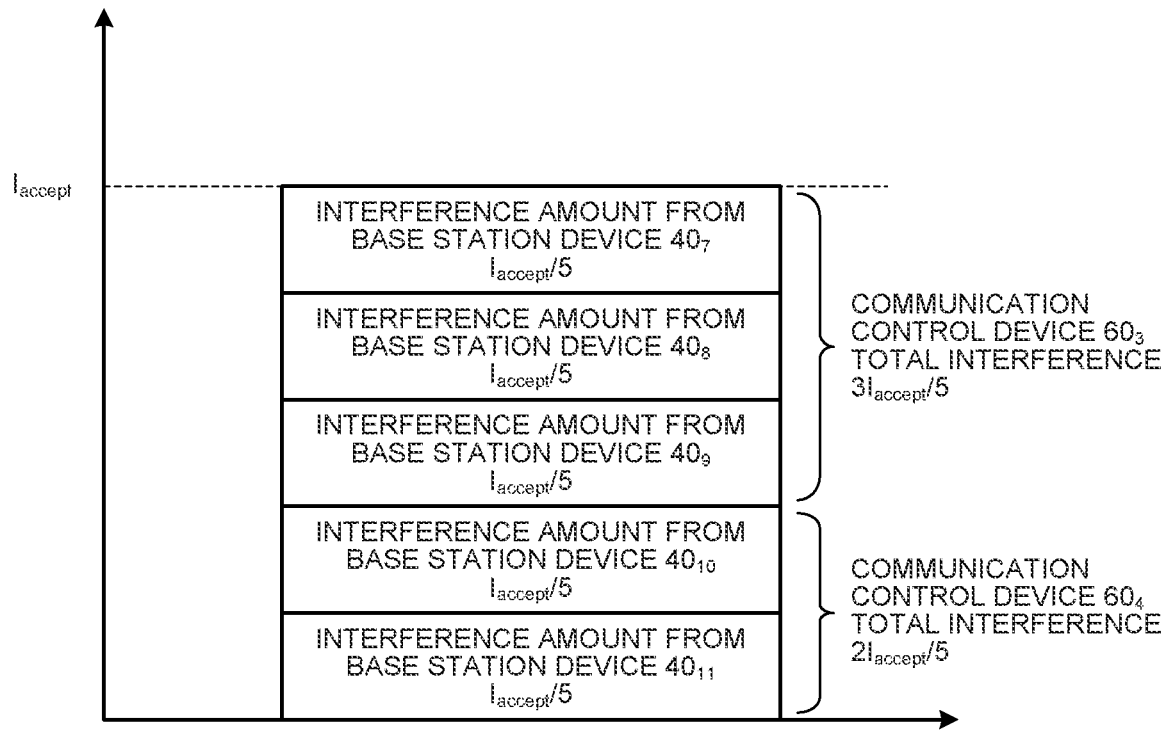
FIG. 15 is a diagram illustrating an interference margin simultaneous allocation type primary system protection method.

First, an interference margin simultaneous allocation type primary system protection method will be described. FIG. 15 is a diagram illustrating an interference margin simultaneous allocation type primary system protection method. As described above, in the interference margin simultaneous allocation type, the communication control device 60 calculates the maximum allowable transmission power of the secondary system using a "value uniquely obtained by positional relationship between the protection point of reference regarding the primary system and the secondary system" as a reference value. In the example of FIG. 15, an allowable interference threshold of the primary system is represented by $I_{accept}$. This threshold may be an actual threshold, or may be a value set assuming a certain margin (for example, a protection ratio) from the actual threshold in consideration of a calculation error and an interference variation.

In the interference margin simultaneous allocation type primary system protection method, interference control represents determination of transmission power (EIRP, Conducted Power+Antenna gain, and the like) of a radio device so as not to exceed an allowable interference threshold. At this time, when there are a large number of base station devices 40 and an attempt is made so as not to allow each to exceed an allowable interference threshold, there might be a concern that interference power received in the communication system 1 (primary system) exceeds the allowable interference threshold. To handle this, the interference margin (allowable interference amount) is "allocated" based on the number of base station devices 40 registered in the communication control device 60.

For example, in the example of FIG. 15, the total number of base station devices 40 is five. Therefore, the acceptable interference amount being $I_{accept}/5$ is allocated to each of the base station devices 40. Since the base station device 40 cannot self recognize the allocation amount, the base station device 40 recognizes the allocation amount through the communication control device or acquires transmission power determined based on the allocation amount. The communication control device cannot recognize the number of radio devices managed by other communication control devices. Therefore, by exchanging information with each other, the communication control device can recognize the total number of devices and can allocate the acceptable interference amount. For example, an acceptable interference amount of $3I_{accept}/5$ is allocated in the communication control device $60_1$.

Figure 16:
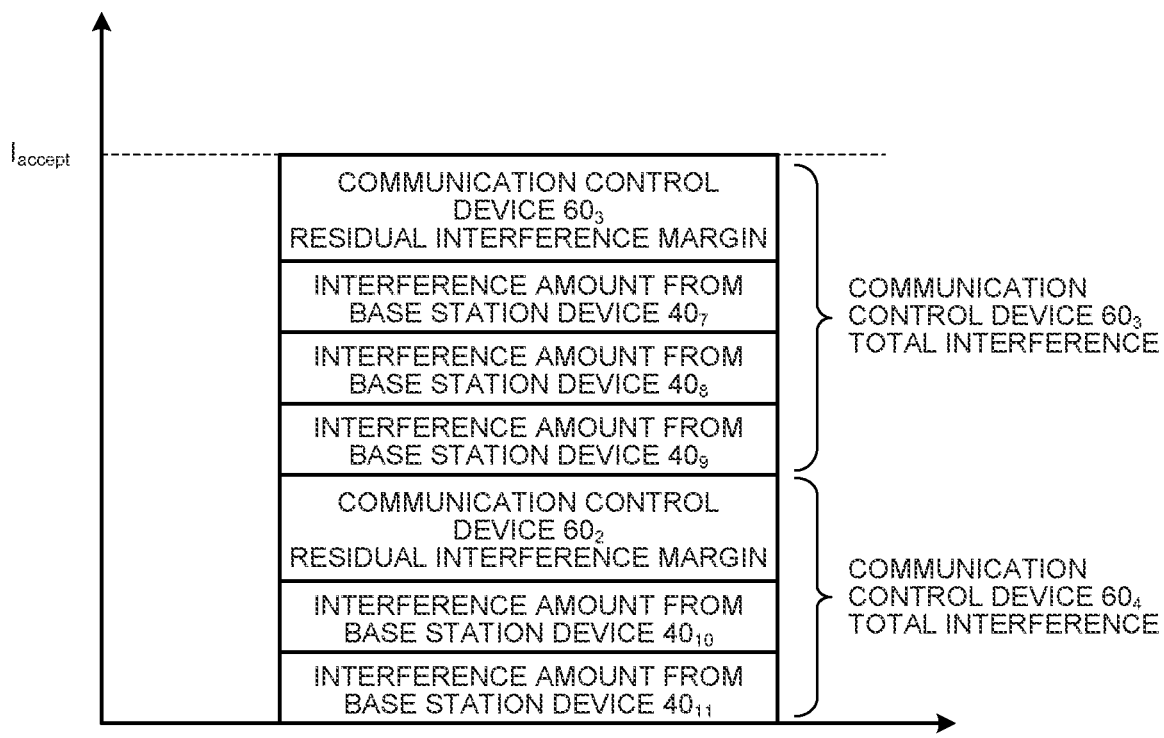
FIG. 16 is a diagram illustrating a state in which a residual interference margin occurs.

Note that, the interference margin that has not been used by the base station device 40 can be a residual interference margin in this method. FIG. 16 is a diagram illustrating a state in which a residual interference margin occurs. FIG. 16 illustrates a total interference set in each of the two communication control devices 60 (communication control devices $60_3$ and $60_4$). In addition, FIG. 16 illustrates an interference amount (interference amount) given to a predetermined protection point of the communication system 1 by a plurality of base station devices 40 (base station devices $40_7$ to $40_{11}$) under the management of the two communication control devices 60. An interference amount obtained by subtracting the interference amount of the base station device 40 from the total interference of each of the two communication control devices 60 is the residual interference margin. In the following description, an excessive interference amount is referred to as the residual interference margin. The residual interference margin can be rephrased as a residual interference amount.

4-2. Interference Margin Sequential Allocation Type

Figure 17:
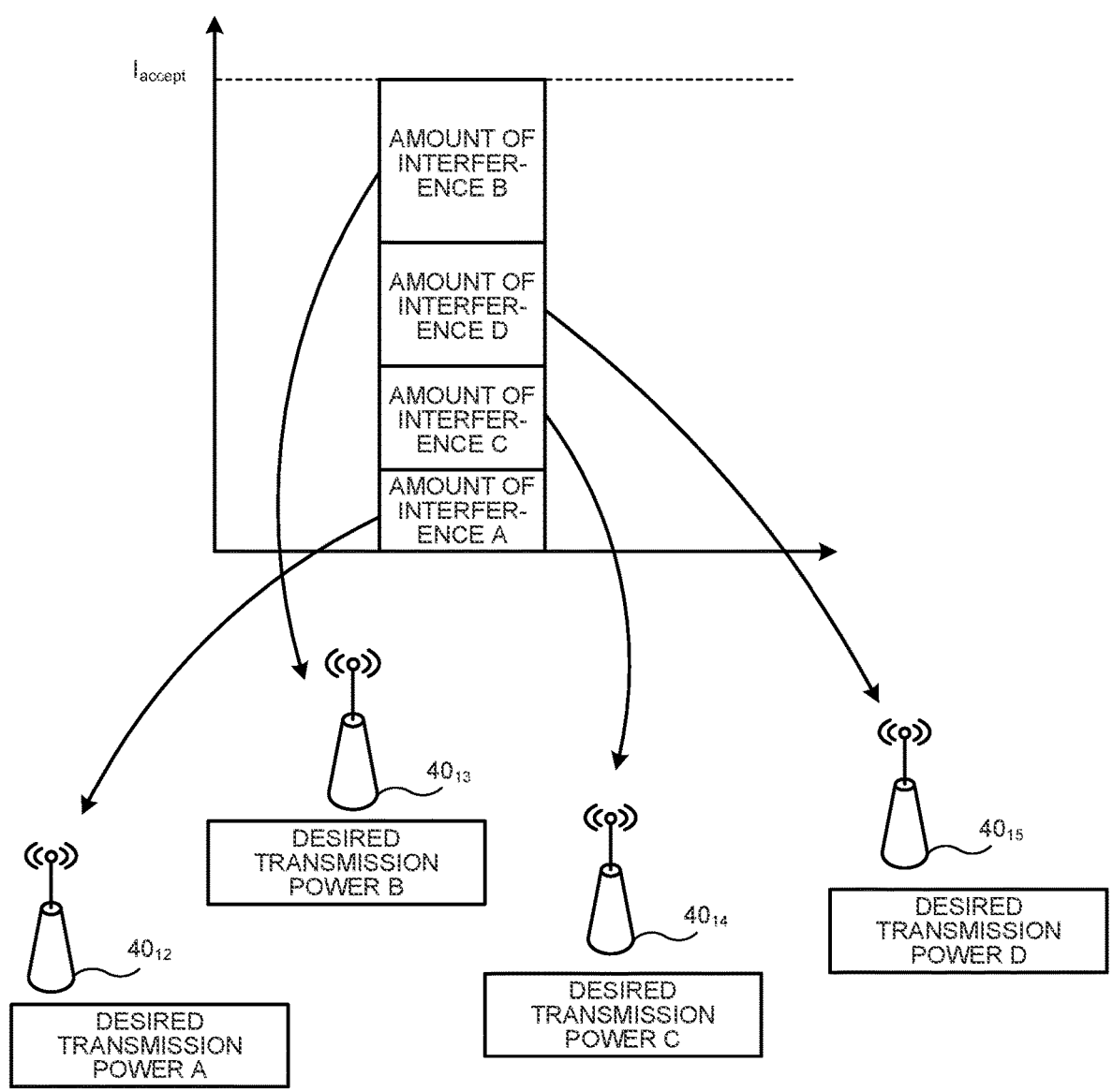
FIG. 17 is a diagram illustrating an interference margin sequential allocation type primary system protection method.

Next, an interference margin sequential allocation type primary system protection method will be described. As described above, in the case of interference margin sequential allocation type, the communication control device 60 calculates the maximum allowable transmission power of the secondary system using the "desired transmission power of the secondary system" as a reference value. FIG. 17 is a diagram illustrating an interference margin sequential allocation type primary system protection method. In the interference margin sequential allocation type, for example, each of the plurality of base station devices 40 stores the desired transmission power information in the storage unit 42. The desired transmission power information is information regarding transmission power required by the base station device 40 for information regarding transmission power necessary for transmission of radio waves, to the communication control device 60. In the example of FIG. 17, the base station devices $40_{12}$ to $40_{15}$ hold desired transmission power information A to D, respectively. The communication control device 60 allocates the interference amounts A to D to the base station devices $40_{12}$ to $40_{15}$ based on the desired transmission power information A to D, respectively.

5. DESCRIPTION OF VARIOUS PROCEDURES

Next, various procedures that can occur between entities of the communication system 2 will be described. Note that the description of the base station device 40 in the following description can be replaced with a word indicating another communication device having a wireless communication function.

5-1. Registration Procedure

A registration procedure is a procedure of registering a device parameter related to the base station device 40 to the communication control device 60. Typically, the registration procedure is started when one or more communication systems including the base station device 40 or the plurality of base station devices 40 notify the communication control device 60 of a registration request including the device parameter. The registration request may be transmitted by a communication system (for example, a proxy system such as the proxy device 50) substituting (representing) one or a plurality of base station devices 40.

In the following description, the communication system that substitutes (represents) the plurality of base station devices 40 is assumed to be the proxy device 50. However, a word of the proxy device 50 in the following description can be replaced with a word indicating a communication system that substitutes (represents) other communication devices such as a proxy system. The description of the base station device 40 can also be replaced with a word indicating other communication devices having a wireless communication function.

[Details of Required Parameters]

The device parameter refers to the following information, for example.
Information specific to communication device
Location information
Antenna information
Wireless interface information
Legal Information
Installer information At the time of implementation, information other than these may be handled as device parameters.

The information specific to the communication device includes information by which the base station device 40 can be specified, information regarding hardware of the base station device 40, and the like. For example, the information can include a serial number, a product model number, and the like.

The information by which the base station device 40 can be specified indicates communication device user information, a communication device serial number, and the like. For example, assumable communication device user information can include user ID, call sign, and the like. The user ID may be independently generated by the communication device user or may be issued in advance by the communication control device 60.

The information regarding the hardware of the base station device 40 can include, for example, transmission power class information, manufacturer information, and the like. In FCC C.F.R Part 96, for example, the transmission power class information can include one of two types of defined classes, namely, Category A and Category B. Furthermore, 3GPP TS 36.104 and TS 38.104 define some classes of eNodeB and gNodeB, and these can also be used as the information.

The information regarding the software of the base station device 40 can include, for example, version information, a build number, and the like regarding an execution program in which processing necessary for interaction with the communication control device 60 is described. In addition, the information may include version information, a build number, and the like of software for operating as the base station device 40.

The location information is typically information by which the geographical position of the base station device 40 can be specified. For example, the location information is coordinate information acquired by a positioning function represented by a global positioning system (GPS), Beidou, a Quasi-Zenith Satellite System (QZSS), Galileo, or an assisted global positioning system (A-GPS). Typically, the location information can include information regarding latitude, longitude, altitude, and positioning error. Alternatively, for example, the location information may be location information registered in an information management device managed by a National Regulatory Authority (NRA) or its agency. Alternatively, for example, it is allowable to use coordinates of an X axis, a Y axis, and a Z axis having its origin in a specific geographical position. In addition, coordinate information like this can be added with an identifier indicating outdoor/indoor.

Furthermore, the location information may be information indicating an area in which the base station device 40 is located. For example, it is allowable to use information defined by the government, such as a postal code and a postal address. Furthermore, for example, the area may be indicated by a set of three or more geographic coordinates. The information indicating these regions may be provided together with the coordinate information.

Furthermore, in a case where the base station device 40 is located indoors, information indicating a floor of a building may be added to the location information. For example, it is allowable to add an identifier or the like indicating floor number, ground/underground. Furthermore, it is allowable to add information indicating a further closed space inside the building, such as a room number and a room name in the building, for example.

Typically, the positioning function is desirably provided in the base station device 40. However, it is not always possible to acquire the location information satisfying required accuracy depending on the performance of the positioning function or the installation position. Therefore, the positioning function may be used by the installer. In such a case, the location information measured by the installer is to be desirably written in the base station device 40.

The antenna information is typically information indicating performance, a configuration, and the like of an antenna included in the base station device 40. Typically, for example, the antenna information can include information such as an antenna installation height, a tilt angle (Downtilt), a horizontal direction (Azimuth), an aim (Boresight), an antenna peak gain, and an antenna model.

The antenna information can also include information regarding a formable beam. For example, it is allowable to include information such as a beamwidth, a beam pattern, and an analog/digital beamforming capability.

In addition, the antenna information can also include information related to performance and a configuration of Multiple Input Multiple Output (MIMO) communication. For example, information such as the number of antenna elements and the maximum number of spatial streams can be included. In addition, the antenna information can include codebook information to be used, weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like. In addition, when equipped with Maximum Likelihood Detection (MLD) or the like that requires nonlinear calculation, information indicating the MLD or the like may be included.

The antenna information may include Zenith of Direction, Departure (ZoD). The ZoD is a type of radio wave arrival angle. The ZoD may be estimated by another base station device 40 based on the radio wave radiated from the antenna of the base station device 40. In this case, the base station device 40 may be a terminal device that operates as a base station or an access point, a device that performs D2D communication, a moving relay base station, or the like. The ZoD can be estimated by a radio wave arrival direction estimation technology such as Multiple Signal Classification (MUSIC) or Estimation of Signal Propagation via Rotation Invariance Techniques (ESPRIT). This information can be used as measurement information by the communication control device 60.

The wireless interface information is typically information indicating a wireless interface technology included in the base station device 40. For example, the wireless interface information includes identifier information indicating a technology used in GSM (registered trademark), CDMA 2000, UMTS, E-UTRA, 5G NR or technologies used in further next generation cellular system, derivative technologies based on LTE such as MulteFire or LTE-Unlicensed (LTE-U), or standard technologies such as a Metropolitan Area Network (MAN) such as WiMAX or WiMAX2+, or a wireless LAN based on IEEE 802.11. In addition, it is also possible to add a version number or a release number of the technical specification that defines the information like this. There is no need to be a standard technology, and information indicating a proprietary radio technology may be included.

The wireless interface information can also include frequency band information supported by the base station device 40. For example, the information can be expressed by: one or more combinations of the upper limit frequency and the lower limit frequency; one or more combinations of the center frequency and the bandwidth, one or more 3GPP Operating Band numbers, and the like.

The frequency band information supported by the base station device 40 can further include capability information regarding carrier aggregation (CA) or channel bonding. For example, combinable band information or the like can be included. Furthermore, the carrier aggregation can also include information regarding a band to be used as a primary component carrier (PCC) or a secondary component carrier (SCC). Also, the number of CCs that can be aggregated at the same time can be included.

The frequency band information supported by the base station device 40 may also include information indicating radio wave utilization priority such as PAL and GAA.

The wireless interface information can also include modulation scheme information supported by the base station device 40. For example, as a representative example, the wireless interface information can include information indicating a primary modulation scheme such as frequency shift keying (FSK), n-value phase shift keying (PSK) (n is 2, 4, 8, or the like), or n-value quadrature amplitude modulation (QAM) (n is 4, 16, 64, 256, or the like), or information indicating a secondary modulation scheme such as orthogonal frequency division multiplexing (OFDM), DFT spread OFDM (DFT-s-OFDM), or Filter Bank Multi Carrier (FBMC).

The wireless interface information can also include information related to an error correction code. For example, the information can include capabilities regarding a turbo code, a low density parity check (LDPC) code, and a polar code, and coding rate information to be applied.

The modulation scheme information and the information related to the error correction code can also be expressed by a Modulation and Coding Scheme (MCS) index as another aspect.

In addition, the wireless interface information can also include information indicating functions specific to each of radio technologies supported by the base station device 40. For example, there is transmission mode (TM) information defined in LTE, as a representative example. In addition, information having two or more modes with respect to a specific function can be included in the wireless interface information as in the TM described above. In addition, in a case where, in the technical specification, the base station device 40 supports a function that is not essential in the specification even in the absence of two or more modes, information indicating this function can also be included.

The wireless interface information can also include radio access technology (RAT) information supported by the base station device 40. For example, the wireless interface information can include: information indicating an orthogonal multiple access (OMA) scheme such as time division multiple access (TDMA), frequency division multiple access (FDMA), or orthogonal frequency division multiple access (OFDMA); information indicating a non-orthogonal multiple access (NOMA) scheme such as Power Division Multiple Access (PDMA) which is represented by techniques implemented by combining Superposition Coding (SPC) and Successive Interference Canceller (SIC), Code Division Multiple Access (CDMA), Sparse Code Multiple Access (SCMA), Interleaver Division Multiple Access (IDMA), and Spatial Division Multiple Access (SDMA); and information indicating opportunistic access schemes such as Carrier Sense Multiple Access/Collision Avoidance (CSMA/CA) and Carrier Sense Multiple Access/Collision Detection (CSMA/CD).

In addition, the wireless interface information can also include information regarding a duplex mode supported by the base station device 40. For example, frequency division duplex (FDD), time division duplex (TDD), and full duplex (FD) can be included as a representative example. In a case where TDD is included as the wireless interface information, TDD Frame Configuration information used/supported by the base station device 40 can be added. Furthermore, information regarding the duplex mode can be included for each frequency band indicated by the frequency band information.

The wireless interface information can also include information related to a transmission diversity method supported by the base station device 40. For example, space time coding (STC) or the like may also be included.

The wireless interface information can also include guard band information. For example, information related to a standard guard band size can be included. Alternatively, for example, information regarding a guard band size desired by the base station device 40 may be included.

The legal information typically corresponds to information related to regulations that the base station device 40 must comply with, which are defined by radio administration agencies in different countries and regions or equivalent organizations, authentication information acquired by the base station device 40, and the like. The information regarding the regulation typically includes, for example, upper limit value information of out-of-band emission, information regarding a blocking characteristic of the receiver, and the like. Typically, the authentication information can include, for example, type approval information (FCC ID, Technical Standard Conformance Certificate, and the like), legal/regulatory information (for example, FCC regulation number, ETSI Harmonized Standard number, and the like) to be a standard for authentication acquisition, and the like.

Among the legal information, information related to a numerical value may be substituted by information defined in the specification of the wireless interface technology. For example, the upper limit value of the out-of-band emission may be derived for application by using an Adjacent Channel Leakage Ratio (ACLR) instead of the upper limit value information of the out-of-band emission. In addition, the ACLR itself may be used as necessary. Furthermore, adjacent channel selectivity (ACS) may be used instead of the blocking characteristic. In addition, these may be used in combination, or an adjacent channel interference ratio (ACIR) may be used.

The installer information can include information capable of specifying a person who installs the base station device 40 (installer), specific information associated with the installer, and the like. For example, Non Patent Literature 2 discloses Certified Professional Installer Registration ID (CPIR-ID) and a CPI name as information that can specify the installer. In addition, for example, a postal address (mailing/contact address), an e-mail address, a telephone number, a Public Key Identifier (PKI), and the like are disclosed as specific information associated with the installer. The information is not limited thereto, and other information related to the installer may be included as necessary.

[Supplement to Required Parameters]

In the registration procedure, depending on the embodiment, it is assumed that not only the base station device 40 but also the device parameters related to the terminal device 30 are required to be registered in the communication control device 60. In such a case, the term "communication device" in the above description (details of required parameters) may be replaced with a term "terminal device" or an equivalent term for application. In addition, a parameter specific to the "terminal device" that is not described above (details of the required parameters) may also be handled as a required parameter in the registration procedure. An example of this is a user equipment (UE) category defined in 3GPP.

[Details of Registration Process]

Figure 18:
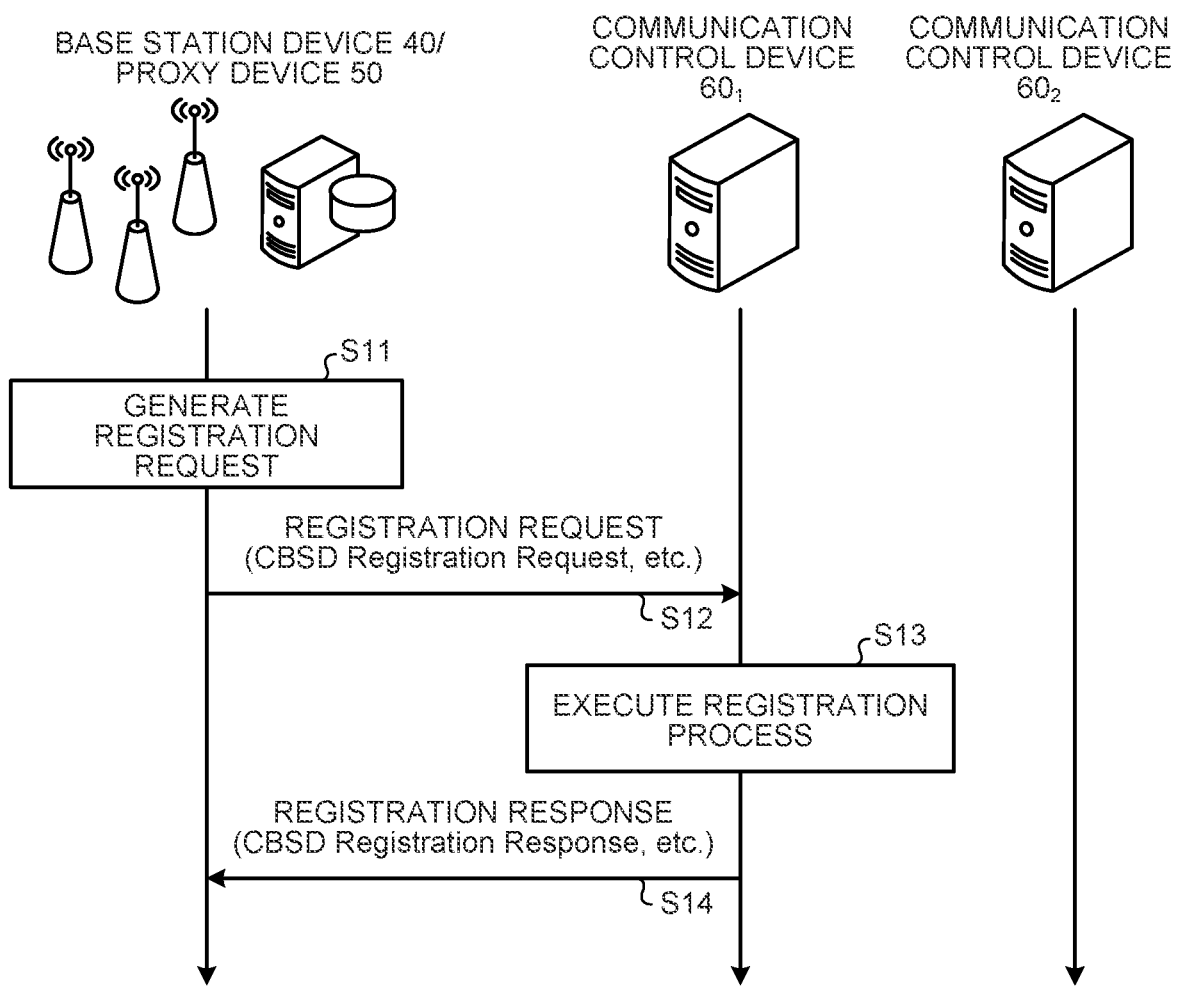
FIG. 18 is a sequence diagram illustrating a registration procedure.

FIG. 18 is a sequence diagram illustrating a registration procedure. One or more communication systems including the base station device 40 or a plurality of the base station devices 40 generate a registration request message using the device parameter (step S11), and then notifies the communication control device 60 of the registration request message (step S12). The generation and/or notification of the message may be performed by the proxy device 50.

Here, in a case where the device parameter includes installer information, falsification prevention processing or the like may be performed on the registration request by using this information. In addition, a part or all of the information included in the registration request may be subjected to an encryption process. Specifically, for example, it is possible to apply a process in which a public key specific to the installer is shared in advance between the installer and the communication control device 60, and the installer performs encryption on information using a secret key. Examples of the encryption target include security sensitive information such as location information.

Further, as disclosed in Non Patent Literature 2, the installer may directly write the location information into the communication control device 60, for example.

After receiving the registration request, the communication control device 60 performs a registration process regarding the base station device 40 (step S13), and returns a registration response according to a processing result (step S14). When there is no lack or abnormality of information necessary for registration, the communication control device 60 records the information to the storage unit 42 and notifies normal completion. Otherwise, the communication control device 60 notifies a registration failure. In a case of normal completion of registration, the communication control device 60 may assign an ID to each communication device and may notify the communication device of the ID information by enclosing the ID information at the time of response. In a case of a registration failure, typically, one or more communication systems including the base station device 40 or a plurality of the base station devices 40, or an operator (for example, a mobile network operator or an individual) or an installer thereof performs correction or the like of the registration request, and attempts the registration procedure until normal completion of the registration.

Note that the registration procedure is sometimes executed a plurality of times. Specifically, for example, when the location information is changed beyond a predetermined standard due to movement of the device, accuracy improvement, or the like, the registration procedure can be executed again. The predetermined standard is typically defined by a legal system. For example, in 47C.F.R Part 15, the Mode II personal/portable white space device is required to access the database again when the location information changes by 100 meters or more.

5-2. Available Spectrum Query Procedure

The available spectrum query procedure is a procedure used by the base station device 40 or the proxy device 50 to make a query about information regarding the available spectrum to the communication control device 60. Typically, the procedure is started when the base station device 40 or the proxy device 50 notifies the communication control device 60 of a query request including information by which the base station device 40 (or the base station device 40 under the proxy device 50) can be specified.

As described above, the description of the "base station device 40" can be replaced with a word indicating another communication device having a wireless communication function. Furthermore, the description of "proxy device 50" can also be replaced with a word indicating a communication system that substitutes (represents) another communication device, such as a proxy system.

(1) Example 1

Here, typically, the available spectrum information is information indicating a spectrum that can be safely provided as a secondary use without giving fatal interference to the primary system at the position of the base station device 40 (or the base station device 40 under the proxy device 50). For example, in a case where the base station device 40 is installed in a secondary use prohibited area such as an exclusion zone in order to protect the primary system using the frequency channel F1, the frequency channel F1 is not notified as an available channel to the base station device 40.

(2) Example 2

Further, for example, when it is determined that fatal interference might be given to the primary system even outside the secondary use prohibited area, the frequency channel would not be notified as an available channel in some cases.

(3) Example 3

Moreover, in the available spectrum information, there can also be frequency channels not to be notified as available channels because of conditions other than the primary system protection requirements of Example 2. Specifically, for example, in order to avoid interference that can occur between the base station devices 40 in advance, a frequency channel being used by another base station device 40 existing in the neighborhood of the base station device 40 (or the base station device 40 subordinate to the proxy device 50) might not be notified as an available channel in some cases.

(4) Example 4

Even in a case corresponding to these cases (Example 2 and Example 3), the spectrum same as that of the primary system or the neighboring base station device 40 can be notified as an available channel. In such a case, typically, the maximum allowable transmission power information is included in the available spectrum information. The maximum allowable transmission power is typically expressed by Equivalent Isotropic Radiated Power (EIRP). The present invention is not necessarily limited to this, and may be provided by a combination of conducted power and antenna gain, for example. It is also allowable to include a feeder loss. Furthermore, the antenna gain may have an allowable peak gain set for each spatial direction.

(Details of Required Parameters)

Examples of assumable information by which the base station device 40 can be specified include information specific to the communication device registered at the time of the registration procedure, and the ID information described above (details of the registration process).

The query request can also include query requirement information. The query requirement information can include, for example, information indicating a frequency band availability of which is desired to be obtained. Also, for example, transmission power information can be included. For example, the base station device 40 or the proxy device 50 can include the transmission power information when it is desired to know only the spectrum information likely to be available for utilization of desired transmission power. The query requirement information does not necessarily need to be included.

The query request can also include a measurement report. The measurement report includes a result of measurement performed by the base station device 40 and/or the terminal device 30. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

[Details of Available Spectrum Evaluation Process]

Figure 19:
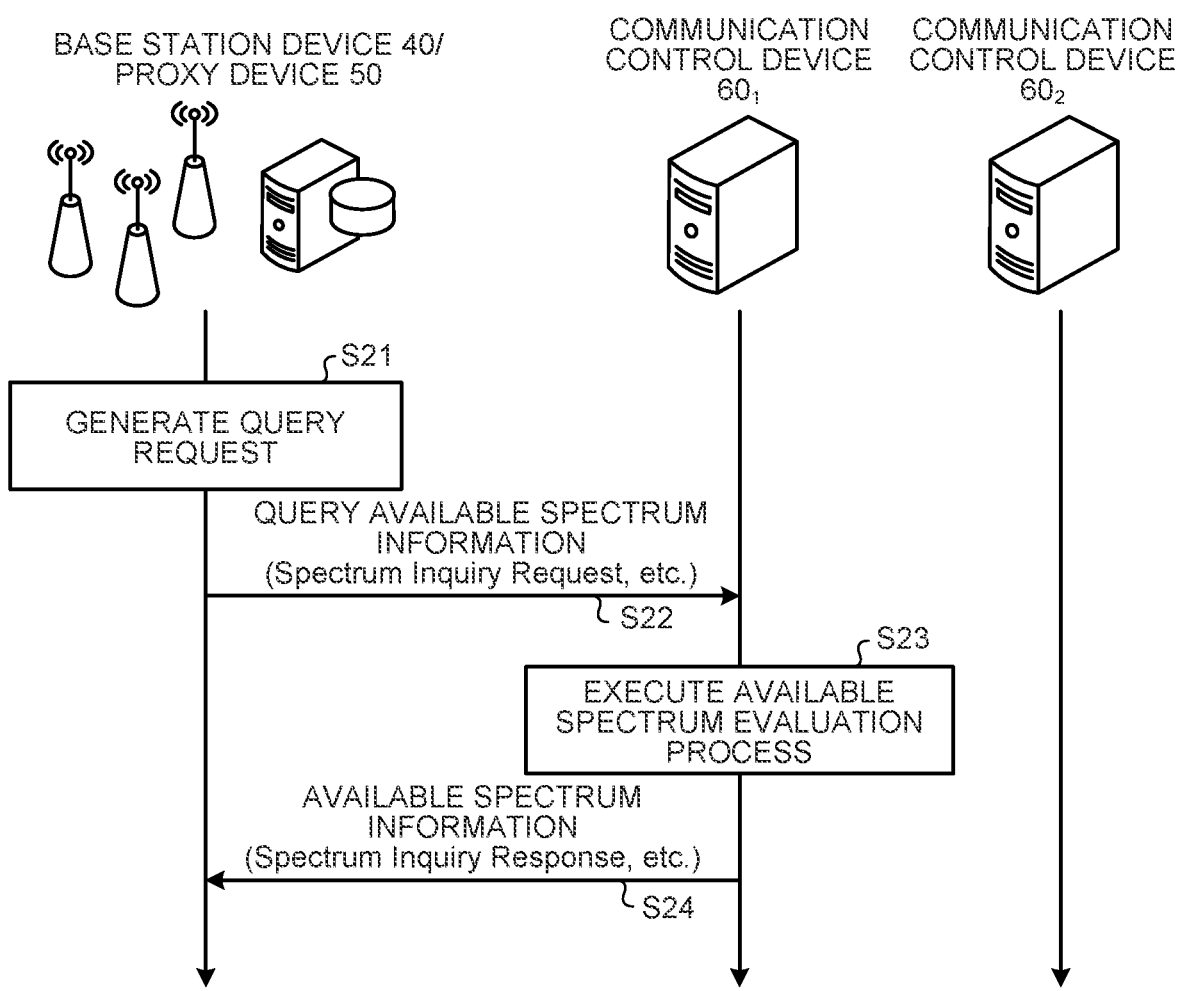
FIG. 19 is a sequence diagram illustrating an available spectrum query procedure.

FIG. 19 is a sequence diagram illustrating an available spectrum query procedure. The base station device 40 or the proxy device 50 generates a query request including information by which the base station device 40 (or the base station device 40 under the proxy device 50) can be specified (step S21) and notifies the communication control device 60 of the query request (step S22).

After receiving the query request, the communication control device 60 evaluates the available spectrum based on the query requirement information (step S23). For example, as described in Examples 1 to 3 described above, the available spectrum can be evaluated in consideration of the existence of the primary system, the secondary use prohibited area thereof, and the neighboring base station device 40.

As described in Example 4 above, the communication control device 60 may derive the maximum allowable transmission power information. Typically, the maximum allowable transmission power is calculated by using allowable interference power information in the primary system or its protection zone, calculation reference point information of an interference power level experienced by the primary system, registration information of the base station device 40, and a propagation loss estimation model. Specifically, as an example, calculation is performed by the following mathematical expression.

$$P_{MaxTx(dBm)} = I_{Th(dBm)} + PL(d)_{(dB)} \quad (1)$$

Here, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the antenna gain may be included according to a method of expressing the maximum allowable transmission power (EIRP, conducted power, etc.) or a point of reference of the reception power (antenna input point, antenna output point, and the like). Furthermore, a safety margin or the like for compensating for variation due to fading may also be included. In addition, feeder loss and the like may be taken in consideration as necessary.

In addition, the above mathematical expression is described based on the assumption that the single base station device 40 is an interference source. For example, in a case where it is necessary to consider aggregated interference from a plurality of base station devices 40 at the same time, a correction value may be added. Specifically, for example, the correction value can be determined based on three types (Fixed/Predetermined, Flexible, and Flexible Minimized) of interference margin methods disclosed in Non Patent Literature 3.

Note that, although the above mathematical expression is expressed using logarithms, the mathematical expression may naturally be converted into a true number to be used at the time of implementation. In addition, all parameters in logarithmic notation described in the present embodiment may be appropriately converted into true numbers to be used.

(1) Method 1

Furthermore, as described in the section of (Details of required parameters) above, in a case where the transmission power information is included in the query requirement information, the available spectrum can be evaluated by a method different from the above-described method. Specifically, in an exemplary case where it is assumed that desired transmission power indicated by transmission power information is used and when an estimated interference amount is less than the allowable interference power in the primary system or its protection zone, it is determined that the frequency channel is available, and the base station device 40 (or the proxy device 50) is notified of the frequency channel.

(2) Method 2

The above is an example in which the band use condition is calculated based on the other system related information, and the present disclosure is not limited to such an example. For example, similarly to an area of a radio environment map (REM), in a case where an area/space in which the base station device 40 can use the shared band is determined in advance, the available spectrum information may be derived based on only the position-related information and the height-related information. Furthermore, in a case where a lookup table associating a position and a height with available spectrum information is prepared, the available spectrum information may also be derived based on only the position-related information and the height-related information.

The evaluation of the available spectrum does not necessarily need to be performed after reception of the query request. For example, after the normal completion of the above-described registration procedure, the communication control device 60 may proactively perform the procedure without any query request. In such a case, the communication control device 60 may create an REM or a lookup table exemplified in the method 2 or an information table similar thereto.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature 2, in a case where information regarding the base station device 40 (referred to as Cluser List in Non Patent Literature 2) that performs high priority use (for example, PAL) is registered in the communication control device 60 in advance by the user, evaluation may be performed based on the information.

After the evaluation of the available spectrum is completed, the communication control device 60 notifies the base station device 40 (or the proxy device 50) of the evaluation result (step S24). The base station device 40 may select a desired communication parameter by using the evaluation result received from the communication control device 60.

5-3. Spectrum Grant Procedure

The spectrum grant procedure is a procedure needed for the base station device 40 to receive secondary use grant of a spectrum from the communication control device 60. Typically, after normal completion of the registration procedure, one or more communication systems including the base station device 40 or the plurality of base station devices 40 notify the communication control device 60 of a spectrum grant request including information by which the base station device 40 can be specified, thereby starting the procedure. This notification may be performed by the proxy device 50. Note that "after normal completion of the registration procedure" also implies that the available spectrum query procedure does not necessarily need to be performed.

As described above, the description of the "base station device 40" can be replaced with a word indicating another communication device having a wireless communication function. Furthermore, the description of "proxy device 50" can also be replaced with a word indicating a communication system that substitutes (represents) another communication device, such as a proxy system.

In the present invention, it is assumed that at least the following two types of spectrum grant request method are usable.

Designation method

Flexible method

The designation method is a request method in which the base station device 40 designates at least a frequency band desired to be used and the maximum transmission power as desired communication parameters and requests the communication control device 60 to permit operation based on the desired communication parameters. The parameters are not necessarily limited to these parameters, and parameters specific to the wireless interface technology (such as a modulation scheme and a duplex mode) may be designated. In addition, information indicating radio wave utilization priority such as PAL and GAA may be included in the parameter.

The flexible method is a request method in which the base station device 40 designates only a requirement regarding a communication parameter and requests the communication control device 60 to designate a communication parameter that can achieve secondary use grant while satisfying the requirement. A requirement for a communication parameter can include bandwidth or a desired maximum transmission power or a desired minimum transmission power. The parameters are not necessarily limited to these parameters, and parameters specific to the wireless interface technology (such as a modulation scheme and a duplex mode) may be designated. Specifically, for example, one or more parameters of TDD Frame Configurations may be selected in advance and notified.

In any manner, the measurement report may be included in the request. The measurement report includes a result of measurement performed by the base station device 40 and/or the terminal device 30. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

[Details of Spectrum Grant Process]

Figure 20:
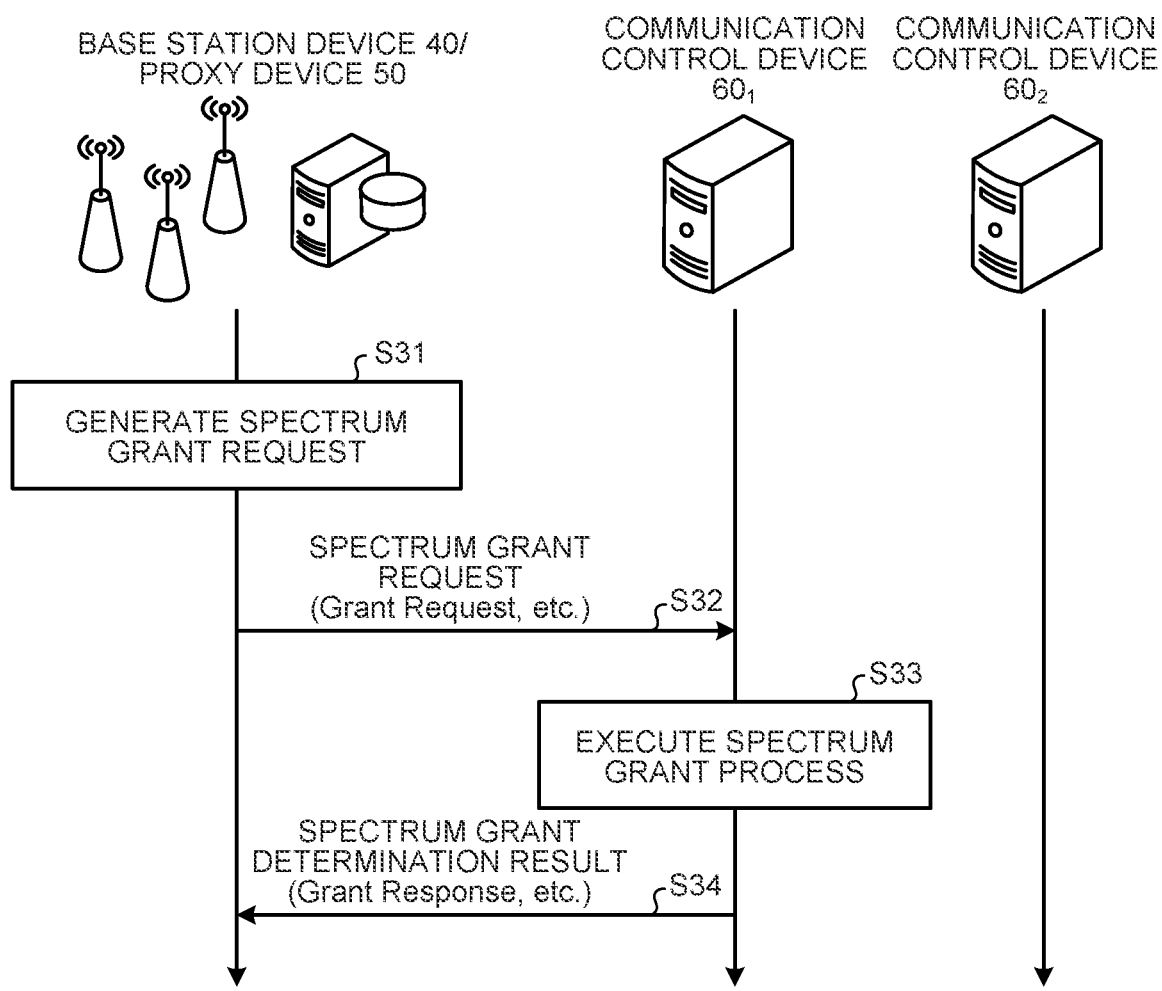
FIG. 20 is a sequence diagram illustrating a spectrum grant procedure.

FIG. 20 is a sequence diagram illustrating a spectrum grant procedure. One or more communication systems including the base station device 40 or the plurality of base station devices 40 generate a spectrum grant request including information by which the base station device 40 can be specified (step S31) and notify the communication control device 60 of the request (step S32). The generation and/or notification of the request may be performed by the proxy device 50.

After acquiring the spectrum grant request, the communication control device 60 performs spectrum grant process based on the spectrum grant request method (step S33). For example, using the methods described in Examples 1 to 3 of <5-2. Available spectrum query procedure>, the communication control device 60 can perform the spectrum grant process in consideration of the existence of the primary system, the secondary use prohibited area thereof, and the base station device 40 in the neighborhood.

In a case where the flexible method is used, the communication control device 60 may derive the maximum allowable transmission power information using the method described in Example 4 of <5-2. Available spectrum query procedure>. Typically, the communication control device 60 calculates the maximum allowable transmission power by using allowable interference power information in the primary system or its protection zone, calculation reference point information of an interference power level experienced by the primary system, registration information of the base station device 40, and a propagation loss estimation model. For example, the communication control device 60 calculates the maximum allowable transmission power by the following Formula (2).

$$P_{MaxTx(dBm)} = I_{Th(dBm)} + PL(d)_{(dB)} \quad (2)$$

Here, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the mathematical expression may be transformed according to a method of expressing the maximum allowable transmission power (EIRP, conducted power, etc.) or a point of reference of the reception power (antenna input point, antenna output point, and the like). Furthermore, a safety margin or the like for compensating for variation due to fading may also be included. In addition, feeder loss and the like may be taken in consideration as necessary.

In addition, the above mathematical expression is described based on the assumption that the single base station device 40 is an interference source. For example, in a case where it is necessary to consider aggregated interference from a plurality of base station devices 40 at the same time, a correction value may be added. Specifically, for example, the correction value can be determined based on three types of methods (Fixed/Predetermined, Flexible, and Flexible Minimized) disclosed in Non Patent Literature 3.

Various models can be used as the propagation loss estimation model. When a model is designated for each application, it is desirable to use the designated model. For example, in Non Patent Literature 6, a propagation loss model such as Extended Hata (eHATA) or Irregular Terrain Model (ITM) is adopted for each application. Certainly, during implementation of the present invention, the propagation loss model does not need to be limited thereto.

In a predetermined application, when a model is not designated, the model may be selectively used as necessary. As a specific example, for example, it is possible to selectively use models in such a way as to use an aggressive model such as a free space loss model when estimating the interfering power to the other base station device 40 and use a conservative model when estimating the coverage of the base station device 40.

Furthermore, in a case where the designation method is used, it is possible to perform the spectrum grant process using the method described in the Method 1 of <5-2. Available spectrum query procedure>. Specifically, in an exemplary case where it is assumed that desired transmission power indicated by transmission power information is used and when an estimated interference amount is less than the allowable interference power in the primary system or its protection zone, it is determined that the use of the frequency channel can be granted, and the base station device 40 (or the proxy device 50) is notified of the frequency channel.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature 2, in a case where information regarding the base station device 40 (referred to as Cluser List in Non Patent Literature 2) that performs high priority use (for example, PAL) is registered in the communication control device 60 in advance by the user, evaluation may be performed based on the information.

The spectrum grant process does not necessarily have to be performed when the spectrum grant request is received. For example, after normal completion of the registration procedure described above, the communication control device 60 may proactively perform the spectrum grant process without any spectrum grant request. Furthermore, for example, the spectrum grant determination process may be performed at regular intervals. In such a case, it is allowable to create the REM and the lookup table exemplified in Method 2 of <5-2. Available spectrum query procedure> or an information table similar to these tables.

After completion of the spectrum grant process, the communication control device 60 notifies the base station device 40 of the determination result (step S34).

5-4. Spectrum Use Notification/Heartbeat

The spectrum use notification/heartbeat is a procedure in which the base station device 40 or the proxy device 50 notifies the communication control device 60 of the spectrum use based on the communication parameter allowed to be used in the spectrum grant procedure. Typically, the procedure is started when the base station device 40 or the proxy device 50 has notified the communication control device 60 of a notification message including information by which the base station device 40 can be specified.

As described above, the description of the "base station device 40" can be replaced with a word indicating another communication device having a wireless communication function. Furthermore, the description of "proxy device 50" can also be replaced with a word indicating a communication system that substitutes (represents) another communication device, such as a proxy system.

This procedure is desirably performed periodically until the use of the spectrum is rejected from the communication control device 60. After this procedure is normally completed, the base station device 40 may start or continue radio transmission. For example, when the state of the grant indicated Granted, the state of the grant transitions to Authorized as a result of the success of this procedure. In addition, when the state of the grant indicated Authorized, failure of this procedure causes the state of the grant to transition to Granted or Idole.

Here, the grant is authorization for radio transmission given by the communication control device 60 (for example, SAS) to the base station device 40 (for example, CBSD). The grant is described, for example, in Non Patent Literature 2. According to Non Patent Literature 2, a signaling protocol between a database (SAS) and a base station (CBSD) for spectrum sharing of 3550-3700 MHz in the United States is standardized. In this standard, the authorization for radio transmission given by SAS to CBSD is referred to as a "grant". The operational parameters permitted in the grant are defined in two parameters, namely, maximum allowable equivalent isotropic radiated power (EIRP) and a frequency channel. That is, in order to perform radio transmission using a plurality of frequency channels, CBSD needs to acquire a plurality of grants from SAS.

Figure 21:
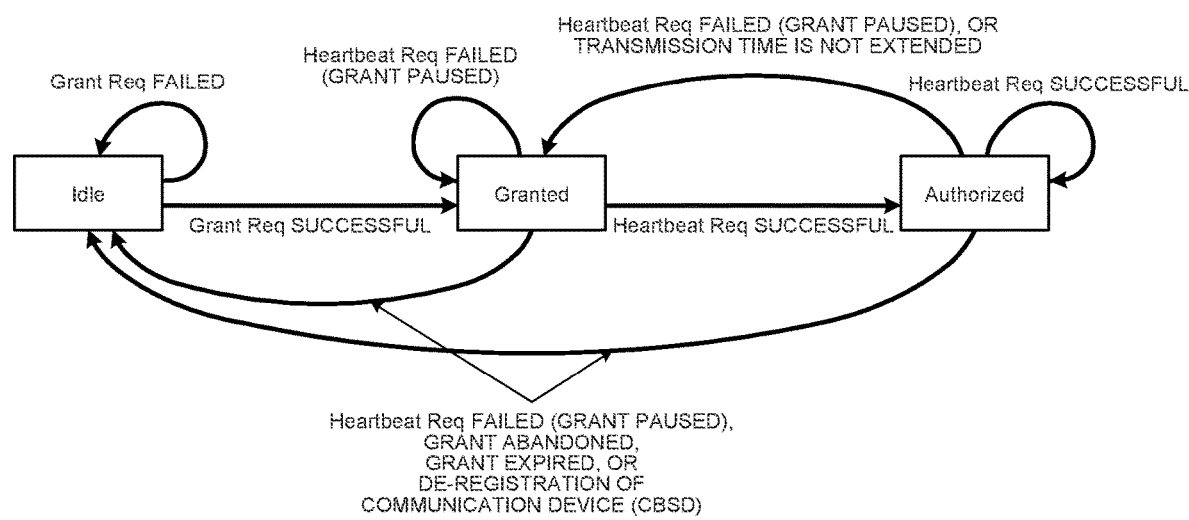
FIG. 21 is a state transition diagram illustrating a radio transmission permission state.

The grant has defined states indicating radio transmission permission states. Examples of the states indicating the radio transmission permission states include a Granted state and an Authorized state. FIG. 21 is a state transition diagram illustrating a radio transmission permission state. In FIG. 21, the Granted state indicates a state of holding a grant is but being prohibited from performing radio transmission, while the Authorized state indicates a state in which radio transmission is permitted based on an operational parameter value defined in the grant. These two states transition according to a result of a heartbeat procedure defined in the same standard.

In the following description, the spectrum use notification/heartbeat will be sometimes referred to as a heartbeat request or simply a heartbeat. In addition, a transmission interval of a heartbeat request may be referred to as a heartbeat interval. Note that the description of a heartbeat request or a heartbeat in the following description can be appropriately replaced with another description indicating "a request for starting or continuing radio transmission". Similarly, the heartbeat interval can also be replaced with another description (for example, the transmission interval) indicating the transmission interval of the spectrum use notification/heartbeat.

Figure 22:
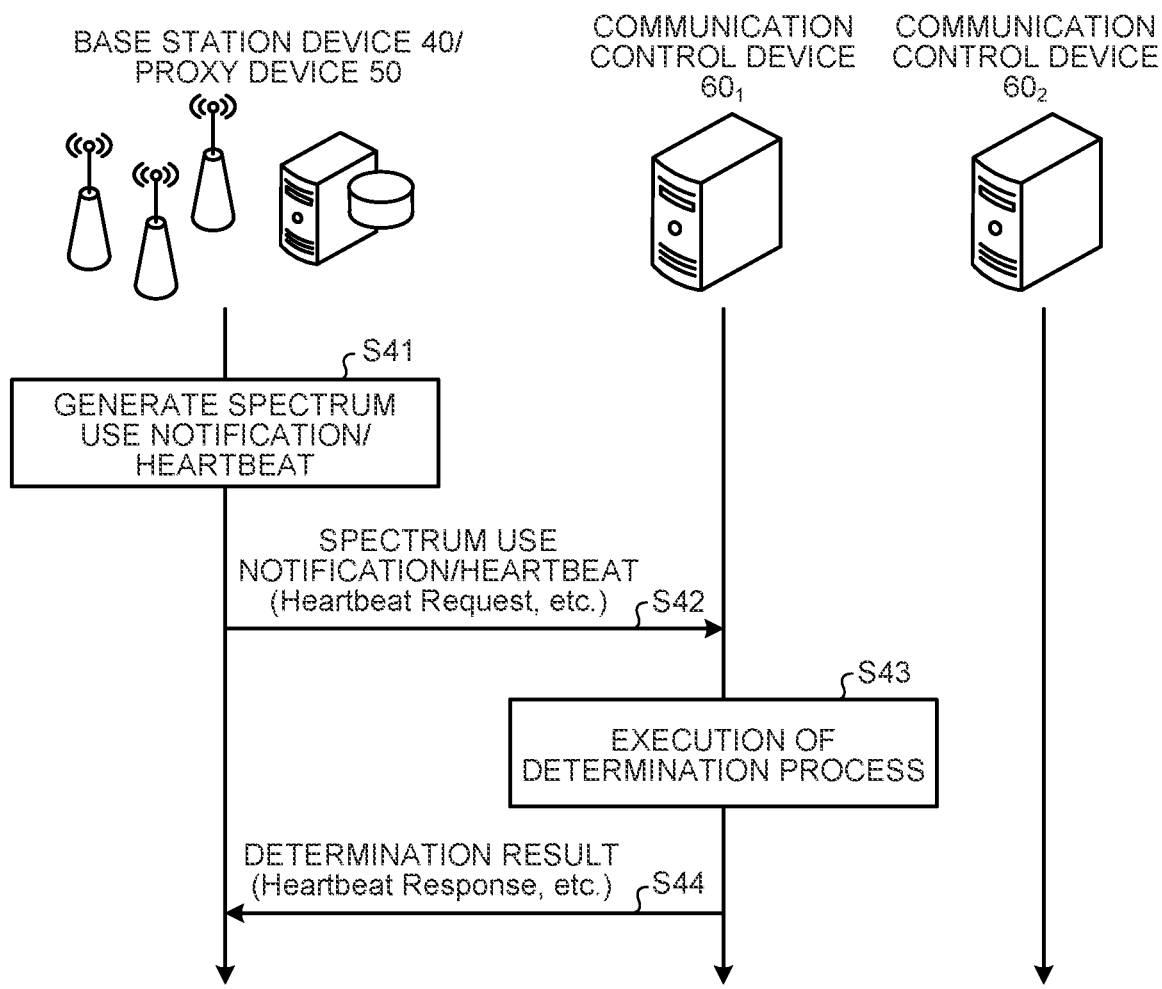
FIG. 22 is a sequence diagram illustrating a spectrum use notification/heartbeat procedure.

FIG. 22 is a sequence diagram illustrating a spectrum use notification/heartbeat procedure. One or more communication systems including the base station device 40 or the plurality of base station devices 40 generate a notification message including information by which the base station device 40 can be specified (step S41) and notify the communication control device 60 of the message (step S42). The generation and/or notification of the message may be performed by the proxy device 50.

After receiving the spectrum use notification/heartbeat, the communication control device 60 may determine whether the start/continuation of the radio transmission is permitted (step S43). Examples of the determination method include confirmation of the spectrum use information of the primary system. Specifically, the start/continuation permission or rejection of the radio transmission can be determined based on a change in the spectrum used by the primary system, a change in the status of spectrum used by the primary system with no steady use of radio waves (for example, in-ship radar), or the like.

After the determination process is completed, the communication control device 60 notifies the base station device 40 (or the proxy device 50) of the determination result (step S44).

In the present procedure, a communication parameter reconfiguration command may be issued from the communication control device 60 to the base station device 40 (or the proxy device 50). Typically, the reconfiguration command can be executed in response to the spectrum use notification/heartbeat. For example, recommended communication parameter information can be provided.

5-5. Supplement to Various Procedures

Here, the various procedures do not necessarily need to be individually implemented as described below. For example, the two different procedures may be implemented by substituting a third procedure with the roles of the two different procedures. Specifically, the registration request and the available spectrum information query request may be integrally notified, for example. Furthermore, for example, the spectrum grant procedure and the spectrum use notification/heartbeat may be integrally performed. It is of course allowable to set the number of combinations to three or more, not limited to these combinations. Furthermore, the above procedure may be separately performed.

In addition, in a case where the present embodiment is applied for the purpose of spectrum sharing with an incumbent system, it is desirable that appropriate procedures or equivalent procedures are selected and used based on the radio law related to the frequency band in a country or region in which the technology of the present embodiment is implemented. For example, in a case where registration of a communication device is required to use a specific frequency band in a specific country or region, it is desirable to perform the registration procedure.

In addition, the expression of "acquiring information" or an expression equivalent thereto in the present embodiment does not necessarily mean that the information is acquired precisely following the procedure described above. For example, even with a description that the location information of the base station device 40 is used in the available spectrum evaluation process, it means it is not always necessary to use the information acquired in the registration procedure. For example, when the location information is included in the available spectrum query procedure request, the location information may be used. In other words, this means that the described parameters may be included in other procedures within the scope described in the present embodiment and within the scope of technical feasibility.

Furthermore, information that can be included in the response from the communication control device 60 to the base station device 40 (or the proxy device 50) described in the above procedure may be notified by push notification. As a specific example, available spectrum information, recommended communication parameter information, radio transmission continuation/refusal notification, and the like may be notified by push notification.

5-6. Various Procedures Related to Terminal Device

Basically, individual procedures described in <5-1> to <5-4> are usable for the terminal device 30. However, unlike the base station device 40, the terminal device 30 has mobility. That is, the location information is dynamically updated. Depending on the legal system, when the change in the location information is a certain level or more, re-registration to the communication control device 60 would be required in some cases. Therefore, in an operation mode defined by the Office of Communication (Ofcom) (refer to Non Patent Literature 4), the following two types of communication parameters are defined.
Specific operational parameters
Generic operational parameters The specific operational parameters are defined as "operational parameters unique to a specific slave White Space Device (WSD)" in the Non Patent Literature. In other words, the parameter is a communication parameter calculated by using the device parameter of the slave WSD corresponding to the terminal device 30. The parameter is characterized by being calculated by a White Space Database (WSDB) using the location information of the slave WSD.

The generic operational parameters are defined as "operational parameters usable by any slave WSD located within the coverage area of a predetermined master WSD (corresponding to the base station device 40)" in the Non Patent Literature. The parameter is characterized by being calculated by the WSDB without using the location information of the slave WSD.

The information for the terminal device 30 can be provided from the base station device 40 by unicast/broadcast. For example, a broadcast signal represented by Contact Verification Signal (CVS) defined in FCC rule Part 15 Subpart H can be used for providing the information. Alternatively, the information may be provided by a broadcast signal specific to a wireless interface. Specifically, the information may be provided by using a physical broadcast channel (PBCH) or NR-PBCH used in LTE or 5G NR, for example.

5-7. Procedure Occurring Between Communication Control Devices

[Information exchange]

Figure 23:
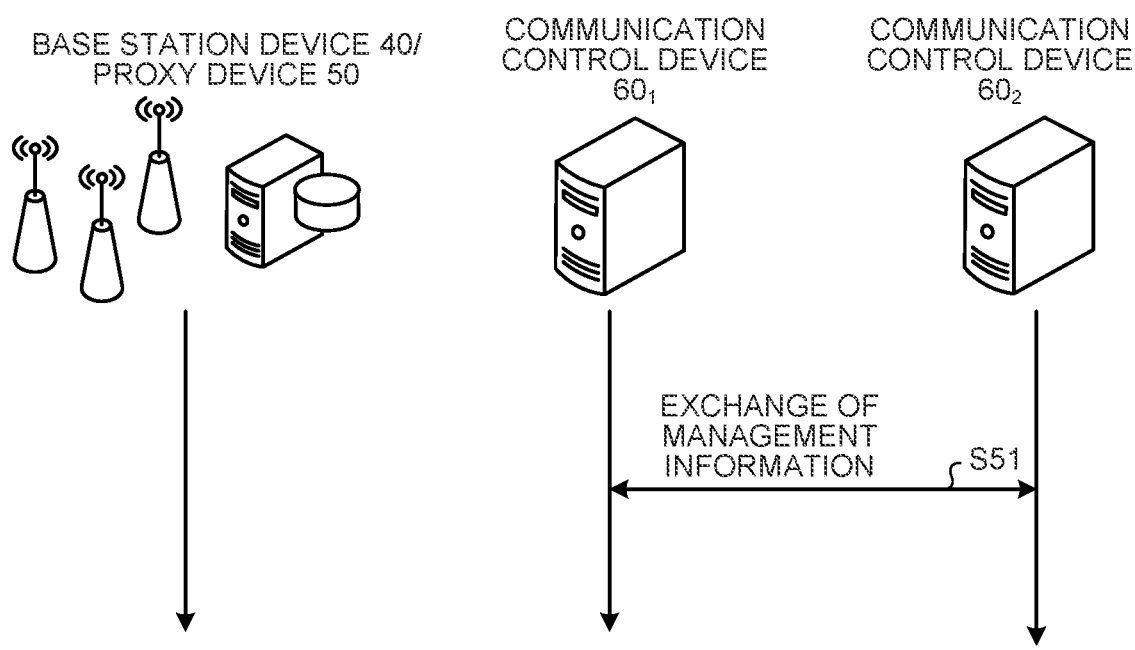
FIG. 23 is a sequence diagram illustrating a management information exchange procedure.

The communication control device 60 can exchange management information with another communication control device 60. FIG. 23 is a sequence diagram illustrating a management information exchange procedure. In the example of FIG. 23, the communication control device 60$_1$ and the communication control device 60$_2$ exchange information. Note that the communication control device that exchanges information is not limited to the two devices, namely, the communication control device 60$_1$ and the communication control device 60$_2$.

It is desirable that, in the management information exchange procedure, at least the following information is to be exchanged.
Communication device registration information
Communication device communication parameter information
Area information The communication device registration information is typically a device parameter of the base station device 40 to be registered in the communication control device 60 in the registration procedure. There is no need to exchange all the registered information. For example, there is no need to exchange information that might correspond to personal information. Furthermore, when the communication device registration information is exchanged, information that has undergone encryption or obfuscation may be exchanged. For example, information converted into a binary value or information signed using an electronic signature mechanism may be exchanged.

Typically, the communication device communication parameter information is information related to a communication parameter currently used by the base station device 40. It is desirable that the information includes at least information indicating the spectrum being used and the transmission power. The information may include other communication parameters.

The area information is typically information indicating a predetermined geographical zone. The information can include zone information of various attributes in various modes.

For example, the information may include protection zone information of the base station device 40 to be a high priority secondary system such as PAL Protection Area (PPA) disclosed in Non Patent Literature 5. The area information in this case can be expressed by a set of three or more geolocation coordinates, for example. Furthermore, for example, in a case where a plurality of communication control devices 60 can refer to a common external database, the information can be expressed by an ID indicating the information.

Furthermore, the information may include information indicating the coverage of the base station device 40, for example. The area information in this case can also be expressed by a set of three or more geolocation coordinates, for example. Furthermore, for example, the information can also be expressed by information indicating a radius size when assuming a circle having its origin in the geographical location of the base station device 40. Furthermore, for example, in a case where a plurality of communication control devices 60 can refer to a common external database, the information can be expressed by an ID indicating the information.

Furthermore, as another aspect, the area information can include information regarding an area section determined in advance by the government or the like. Specifically, for example, it is possible to indicate a certain region by indicating a postal address. Furthermore, for example, a license area or the like can be similarly expressed.

Furthermore, as still another aspect, the area information does not necessarily have to express a planar area, and may express a three-dimensional space. For example, it may be expressed using a spatial coordinate system. In addition, for example, information indicating a predetermined closed space, such as a floor number, a floor, or a room number of a building, may be used.

These pieces of information can be exchanged in various methods. Example of methods will be described below.

ID designation method
Period designation method
Zone designation method
Dump method The ID designation method is a method of acquiring information corresponding to an ID assigned in advance to specify information managed by the communication control device 60 by using the ID. For example, it is assumed that the communication control device 60$_1$ manages a base station device 40 with ID: AAA. At this time, the communication control device 60$_2$ designates the ID: AAA and makes an information acquisition request to the communication control device 60$_1$. After receiving the request, the communication control device 60$_1$ searches for information of ID: AAA, and notifies the registration information and the communication parameter information of the corresponding base station device 40 as a response.

The period designation method in which a specific period is designated and information satisfying a predetermined condition can be exchanged during the period.

Examples of the predetermined condition include the presence or absence of information update. For example, in a case where acquisition of communication device information in a specific period is designated by a request, registration information regarding the base station device 40 newly registered in the period, registration information of the base station device 40 whose communication parameter has been changed, and information regarding the communication parameter, can be notified as a response.

Examples of the predetermined condition include whether the communication control device 60 has performed recording. For example, in a case where acquisition of the communication device information in a specific period is designated by the request, the registration information of the base station device 40 and the information of the communication parameter recorded by the communication control device 60 in the specific period can be notified as a response. Furthermore, the latest information in the period can be notified. Alternatively, the update history may be notified for each piece of information.

The zone designation method is a method of designating a specific zone, and exchanging information belonging to the zone. For example, in a case where acquisition of communication device information in a specific zone is designated by a request, registration information regarding the base station device 40 installed in the zone and information regarding a communication parameter can be notified as a response.

The dump method is a method of providing all information recorded by the communication control device 60. At least information and area information regarding the base station device 40 are desirably provided by the dump method.

All the above description of the information exchange between the communication control devices 60 is based on a pull method. That is, information exchange is performed in a mode in which information corresponding to the parameter designated in the request is given as a response, and can be implemented by the HTTP GET method as an example. However, the present invention is not limited to the pull method, and information may be actively provided to another communication control device 60 by a push method. The push method can be implemented by the HTTP POST method, as an example.

[Command/Request Procedure]

The communication control device 60 may send a command and/or a request to each other. A specific example of this is reconfiguration of communication parameters of the base station device 40. For example, when it is determined that the base station device 40$_1$ managed by the communication control device 60$_1$ is experiencing a large amount of interference from the base station device 40$_4$ managed by the communication control device 60$_2$, the communication control device 60$_1$ may request the communication control device 60$_2$ to change the communication parameter of the base station device 40$_4$.

Another example is reconfiguration of area information. For example, when incompletion is found in calculation of the coverage information and the protection zone information regarding the base station device 40$_4$ managed by the communication control device 60$_2$, the communication control device 60$_1$ may request the communication control device 60$_2$ to reconfigure the area information. Besides this, the area information reconfiguration request may be made for various reasons.

5-8. Representative Operation Flow

Next, a representative operation flow regarding interference protection calculation (interference calculation) will be described.

Figure 24:
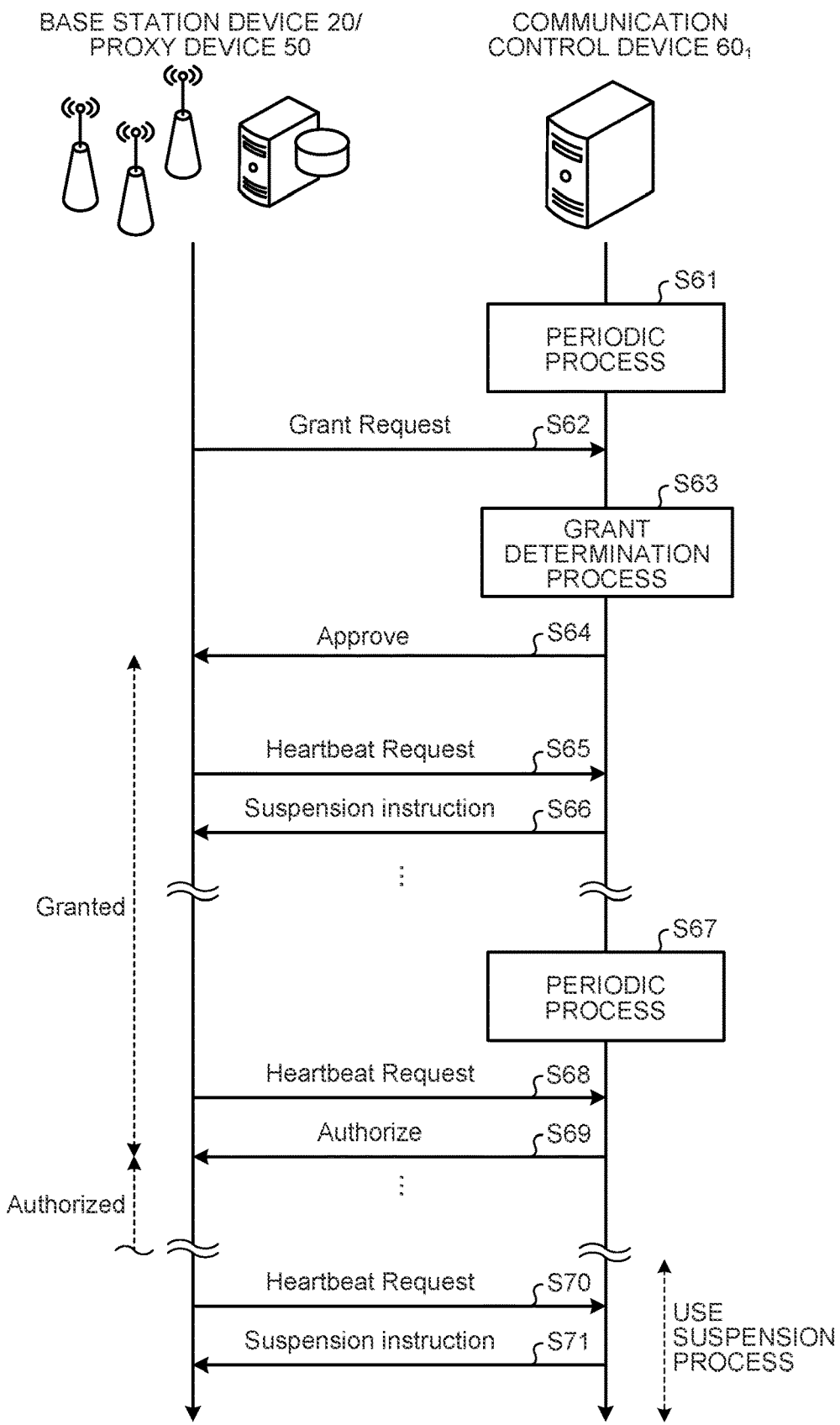
FIG. 24 is a sequence diagram illustrating an example of an operation related to a grant.

FIG. 24 is a sequence diagram illustrating an example of an operation related to a grant. Specifically, FIG. 24 is a sequence diagram illustrating an operation of the communication system 2 corresponding to procedures of <5-3. Spectrum grant procedure> and <5-4. Spectrum use notification/heartbeat>. Note that the operation flow illustrated in FIG. 24 is merely an example, and various changes are made depending on a state of the base station device 40, the communication control device 60, and the proxy device 50, or the like.

First, the calculation unit 646 of the communication control device 60$_1$ executes a periodic process at the execution timing of the periodic process (step S61). The periodic process is a process of executing information synchronization between the communication control devices 60 and calculation related to primary system protection. An example of the periodic process is Coordinated Periodic Activities among SASs (CPAS) described in Non Patent Literature 10 and Non Patent Literature 11. In the following description, the periodic process may be referred to as periodic protection calculation. The execution timing of the periodic process is a point 24 hours after the previous execution of the periodic process, for example. Of course, the execution interval of the periodic process is not limited to 24 hours.

Figure 25:
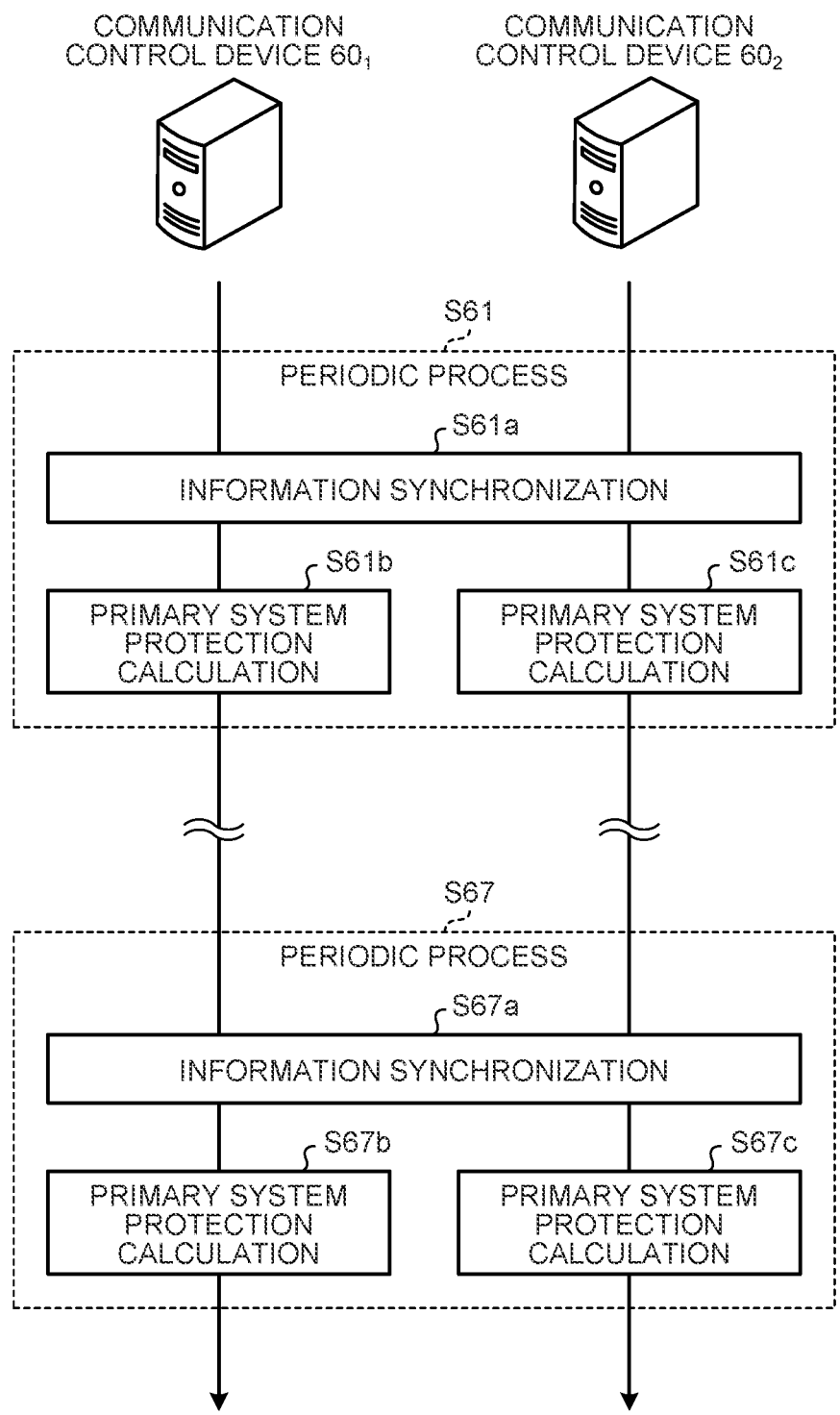
FIG. 25 is a diagram illustrating specific processing contents of a periodic process.

FIG. 25 is a diagram illustrating specific processing contents of the periodic process. In the example of FIG. 25, the communication control device 60$_1$ and the communication control device 60$_2$ perform information synchronization and primary system protection calculation. Note that the number of communication control devices 60 that perform periodic process (information synchronization or the like) may be more than two.

As illustrated in FIG. 25, each of the plurality of communication control devices 60 executes a periodic process (step S61). First, each of the plurality of communication control devices 60 synchronizes information with the other communication control device(s) 60 (step S61$a$). Subsequently, each of the plurality of communication control devices 60 performs primary system protection calculation (step S61$b$ and step S61$c$). At this time, the communication control device 60 may calculate an estimated value of an interference amount, a residual interference margin, or the like that can be individually given to the primary system by each communication node (for example, the base station device 40).

Returning to FIG. 24, the base station device 40 or the proxy device 50 transmits a grant request to the communication control device 60$_1$ (step S62). The transmission of the grant request may be performed by the transmission unit 442 of the base station device 40 or the transmission unit 542 of the proxy device 50. In the present embodiment, the base station device 40 or the proxy device 50 adds, to the grant request, information regarding the use mode of spectrum resource (radio resource) allocated as a result of the grant request. For example, the base station device 40 or the proxy device 50 adds information indicating "grant application and details" to the grant request. The "grant application and details" will be described below in detail in the section of <6-2. Addition of grant use mode information>. Note that, in the following description, the "information regarding the use mode of the spectrum resource" may be referred to as "information regarding the use mode of the grant" or simply as "use mode information".

The acquisition unit 641 of the communication control device 60$_1$ acquires a grant request to which the use mode information is added. The communication control device 60$_1$ performs a process related to the spectrum resources (that is, a process related to grant) based on the use mode information (step S63). For example, the communication control device 60$_1$ performs a grant determination process for allocating an available spectrum to the base station device 40 based on the use mode information. This process will be described below in detail in <6-3. Grant assignment determination using use mode information>.

After allocating the spectrum, the notification unit 647 of the communication control device 60$_1$ transmits a grant response to the base station device 40 or the proxy device 50. In the example of FIG. 24, the notification unit 647 notifies the success of the grant request (Approve illustrated in FIG. 24) as the grant response (step S64). The acquisition unit 441 of the base station device 40 or the acquisition unit 541 of the proxy device 50 acquires the grant response from the communication control device 60$_1$. Due to the success of the grant request, the grant state of the base station device 40 transitions from Idole to Granted as illustrated in FIG. 21. The base station device 40 performs setting of individual parts based on the allocated grant.

Subsequently, the base station device 40 or the proxy device 50 transmits a heartbeat request to the communication control device 60$_1$ (step S65). Subsequently, the acquisition unit 641 of the communication control device 60$_1$ acquires the transmitted heartbeat request. The communication control device 60$_1$ then transmits a heartbeat response.

Note that, in the example of FIG. 24, the grant allocated to the base station device 40 has not passed the periodic process (for example, CPAS) yet. Therefore, in the example of FIG. 24, the communication control device 60$_1$ cannot approve the start of the radio transmission. Accordingly, the communication control device 60$_1$ transmits a radio transmission suspension instruction as a heartbeat response (step S65).

Thereafter, the base station device 40 or the proxy device 50 continues to transmit the heartbeat request at the heartbeat interval notified from the communication control device 60$_1$. In response to the heartbeat request, the communication control device 60$_1$ continues to transmit the radio transmission suspension instruction as a heartbeat response until the next periodic process is completed.

When the execution timing of the periodic process arrives, each of the plurality of communication control devices 60 including the communication control device 60$_1$ executes the periodic process (step S67). For example, as illustrated in FIG. 25, each of the plurality of communication control devices 60 synchronizes information with the other communication control device(s) 60 (step S67a). Subsequently, each of the plurality of communication control devices 60 performs primary system protection calculation (step S67b and step S67c). This protection calculation is an example of interference calculation of the present embodiment.

Subsequently, the base station device 40 or the proxy device 50 transmits a heartbeat request to the communication control device 60$_1$ (step S68). Subsequently, the acquisition unit 641 of the communication control device 60$_1$ acquires the transmitted heartbeat request. Next, the notification unit 647 of the communication control device 60, transmits the heartbeat response. At this time, since the grant allocated to the base station device 40 has passed the periodic process, the communication control device 60$_1$ can approve the start of the radio transmission of the base station device 40 that has transmitted the heartbeat request. Accordingly, the communication control device 60$_1$ transmits success (Authorize illustrated in FIG. 24) of the heartbeat response as the heartbeat response (step S68). As a result of the success of the heartbeat request, the grant state of the base station device 40 transitions from Granted to Authorized as illustrated in FIG. 21. The radio communication control unit 244 of the base station device 40 performs radio communication by controlling the radio communication unit 21 based on the allocated grant.

As described above, the state of the grant (the state indicating the radio transmission permission state) transitions according to the result of the heartbeat procedure. One purpose among various purposes defined in the heartbeat procedure is a radio wave suspension instruction of the base station device 40 at the time of use of the radio wave by incumbent systems (for example, in-ship radar) in a same band. For example, when it is determined that an incumbent system such as the communication system 1 is using radio waves, the communication control device 60 must stop radio waves of all the base station devices 40 that can cause interference within a predetermined time (for example, within 300 seconds). At this time, push notification of the suspension instruction is assumed to be complicated in implementation, the communication control device 60 may issue the radio wave suspension instruction using a heartbeat response. In the following description, a process for causing the base station device 40 to suspend the use of the spectrum resources, which is executed by the communication control device 60, is referred to as a "spectrum resource use suspension process" or a "grant suspension process".

For example, the base station device 40 or the proxy device 50 transmits a heartbeat request to the communication control device 60$_1$ (step S70). Subsequently, the communication control device 60$_1$ acquires the transmitted heartbeat request. The communication control device 60$_1$ then determines whether a primary system such as the communication system 1 is using radio waves. When it is determined that the primary system is performing radio wave utilization related to a predetermined spectrum resource, the communication control device 60$_1$ transmits a radio transmission suspension instruction as a heartbeat response (step S71). The base station device 40 suspends the transmission of the radio wave related to the predetermined spectrum resource. With this procedure, the grant state of the base station device 40 transitions from Authorized to Idle (or Granted) as illustrated in FIG. 21. Alternatively, as illustrated in FIG. 21, the grant state of the base station device 40 transitions from Granted to Idole.

6. OPERATION RELATED TO INTERFERENCE CALCULATION (First Exemplary Embodiment)

Next, an operation of the communication system 1000 according to the first exemplary embodiment will be described.

6-1. Assumed Model of Interference Calculation

Figure 26:
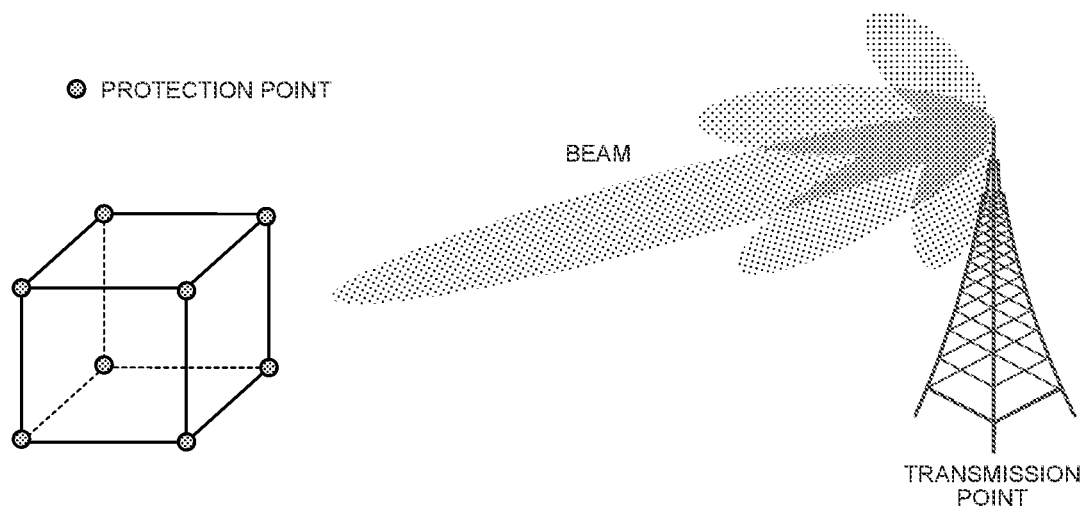
FIG. 26 is a diagram of a simplified model illustrating interference calculation.

FIG. 26 is a diagram of a simplified model illustrating interference calculation. In the present embodiment, in order to facilitate understanding, description will be made assuming the model illustrated in FIG. 26.

The model of FIG. 26 assumes that there is one transmission point of radio waves which has a capability of spatially forming a beam. The transmission point is, for example, a radio transmission unit of the secondary system. For example, the transmission point is a radio transmission antenna of the device constituting the communication system 2 (for example, the antenna 413 of the base station device 40). At this time, the spectrum to be used is the same as a part or all of the spectrum used by other systems (hereinafter, referred to as a protection target system).

In the present embodiment, the protection target system is the primary system, for example. An example of the protection target system is the communication system 1 or a device constituting the communication system 1 (for example, the radio wave utilization device 10). The protection target system is a system having a service area (or coverage). Alternatively, the protection target system is a system that uses a spectrum somewhere in a specific area. Therefore, in order to protect the protection target system, there is a need to achieve protection referred to as area protection defined in CBRS.

The present embodiment provides an extended concept of area protection. Specifically, in the present embodiment, the protection point is set not only in a plane but also in a space. The protection point is an interference calculation point. The communication control device controls the communication parameters at the radio transmission point such that the interference power level at the protection point set in this manner is suppressed to be below an allowable value.

Hereinafter, this protection is referred to as spatial protection.

Hereinafter, the following two methods will be described.
(1) Spatial protection point setting method
(2) Interference calculation method at set spatial protection point

6-2. Spatial Protection Point Setting Method

First, a method of setting the spatial protection point will be described.

The spatial protection point is a type of interference calculation point. The spatial protection point may be set by the communication system 1 (for example, the management device 20) or may be set by the communication system 2 (for example, the communication control device 60). The following description assumes, as an example, that the spatial protection point is set by the first specifying unit 642 of the communication control device 60. Determination that the spatial protection point is specified may be specified by acquisition, by the first specifying unit 642, of information regarding the spatial protection point set by another device.

As described above, the protection target system is the communication system 1 or a device constituting the communication system 1 (for example, the radio wave utilization device 10). In addition, the transmission point is a radio transmission antenna of the device constituting the communication system 2 (for example, the antenna 413 of the base station device 40). The transmission point is not limited to the antenna 413 of the base station device 40, and may be the antenna 313 of the terminal device 30, for example.

In the present embodiment, the first specifying unit 642 of the communication control device 60 specifies the spatial protection point based on environment information around the protection target system (for example, the radio wave utilization device 10). The environment information around the protection target system indicates, for example, information regarding the place such as urban, suburban, and rural used in the radio wave propagation loss model. These differences cause differences in some parameters. For example, Non Patent Literature 10 discloses a table indicating a relationship between a clutter, a reference height, and a reference interval. Table 1 is a table illustrating a relationship between the clutter, the reference height, and the reference interval.

TABLE 1

Reference clutter heights and intervals

| Clutter category | Reference height (m) | Reference interval (km) |
| --- | --- | --- |
| Broad field | 4 | 0.1 |
| Park | | |
| Sparsely planted trees with irregular intervals | | |
| Fruit farms (Regular intervals) | | |
| Sparsely located houses | | |
| Center of village | 5 | 0.07 |
| Deciduous trees (Irregular intervals) | 15 | 0.05 |
| Deciduous trees (Regular intervals) | | |
| Mixed forest | | |
| Needle leaf trees (Irregular intervals) | 20 | 0.05 |
| Needle leaf trees (Regular intervals) | | |
| Tropical rain forest | 20 | 0.03 |
| Suburban areas | 9 | 0.025 |
| Dense suburban areas | 12 | 0.02 |
| Urban areas | 20 | 0.02 |
| Dense urban areas | 25 | 0.02 |
| Industrial regions | 20 | 0.05 |

In this example, the first specifying unit 642 of the communication control device 60 specifies which clutter category the surroundings of the protection target system correspond to. There are various means applicable as a specifying method. For example, when the information corresponding to the clutter category is embedded in digital map information, the first specifying unit 642 may specify the environment information regarding the surroundings of the protection target system using the embedded information. Furthermore, for example, in a case where an area/space to be protected is designated in advance and a clutter category is designated for each area/space, the first specifying unit 642 may specify environment information around the protection target system with reference to the designation information. Further, the environment information may have clutter categories such as on the sea and on the lake in addition to on the ground.

Next, the first specifying unit 642 of the communication control device 60 determines a grid interval on the vertical plane based on the specified clutter category. For example, it can be assumed, in an urban area and the like, that a base station is likely to be placed on a rooftop or a street lamp of a building or on each floor of a building in an indoor area and that terminals exist on the ground or on each floor of the building. In addition, for example, it can be assumed, in case of a suburban, that a radio device is installed on a high steel tower. For example, it can be assumed, on the sea, that the radio device is placed on a ship. In this manner, since the installation position of the radio device can be limited to some extent depending on the environment, it is considered to be possible to set the grid interval so as to ignore places other than the installation position.

The grid interval may be designated in advance for each category by laws and standards. For example, in an urban area, the first specifying unit 642 of the communication control device 60 may set an average height between individual floors of a building, as the grid interval. As this value, for example, in a case where an upper limit value, a lower limit value, or the like of the height between the floors is defined in the Building Standards Act or the like, the first specifying unit 642 may specify the grid interval with reference to the defined values. In the case of the sea, the first specifying unit 642 may set the grid interval according to the type of the ship using the protection target system, for example. For example, in the case of a marine radio such as a fishing boat, the first specifying unit 642 may specify the grid interval based on information regarding the height of a general fishing boat or the like. When the protection target system is an in-ship radar, the first specifying unit 642 may set the grid interval based on the height of the ship. Note that the grid interval on the vertical plane does not necessarily have to be constant. The first specifying unit 642 may set different grid intervals according to the height. It is of course desirable to set the upper limit height at which the grid is provided.

The interference power at the spatial protection point set in this manner is calculated.

Note that the first specifying unit 642 may determine whether to specify the clutter category depending on whether the installation position of the protection target system is indoor or outdoor. For example, the first specifying unit 642 may determine to specify the clutter category when the installation position is outdoors. In the indoor environment, the installation floor itself in a building can be set as exclusion zone/protection zone, making it possible to easily set the protection point without using the clutter category. Accordingly, the first specifying unit 642 does not need to make such a determination (for example, the first specifying unit 642 may set a side surface of the building as a spatial protection point).

[Spatial Protection Point for Priority Access]

This method can also be applied to a case where there is a priority of spectrum access between secondary users and where a high priority system is protected against low priority systems. There are assumable scenarios by which each of the plurality of communication control devices 60 manages and controls such a system.

In such a case, it is assumed that each of the devices constructs a space to protect a managed high priority system. At that time, the communication control device may set the clutter category of the zone to which the space to protect the managed high priority system belongs. The set clutter category is enclosed when the protected space information regarding the high priority system is shared between the communication control devices.

Note that it is assumed that the setting of the grid intervals of the protection points for the incumbent system is performed by setting all the communication control devices 60 in accordance with common rules in law. Therefore, specifying the grid interval without using the clutter category would make the setting of the grid interval of the protection point for the incumbent system different from the setting of the grid interval of the protection point for the high priority system, leading to a concern of complication of the implementation of the communication control device 60.

The present embodiment specifies the grid interval using the clutter category, making it possible to make the setting of the grid interval of the protection point for the incumbent system and the setting of the grid interval of the protection point for the high priority system match each other. As a result, it is possible to reduce the calculation volume of the protection calculation of the communication control device 60.

6-3. Interference Calculation Method at Set Spatial Protection Point

Next, an interference calculation method at the set spatial protection point will be described.

Figure 27:
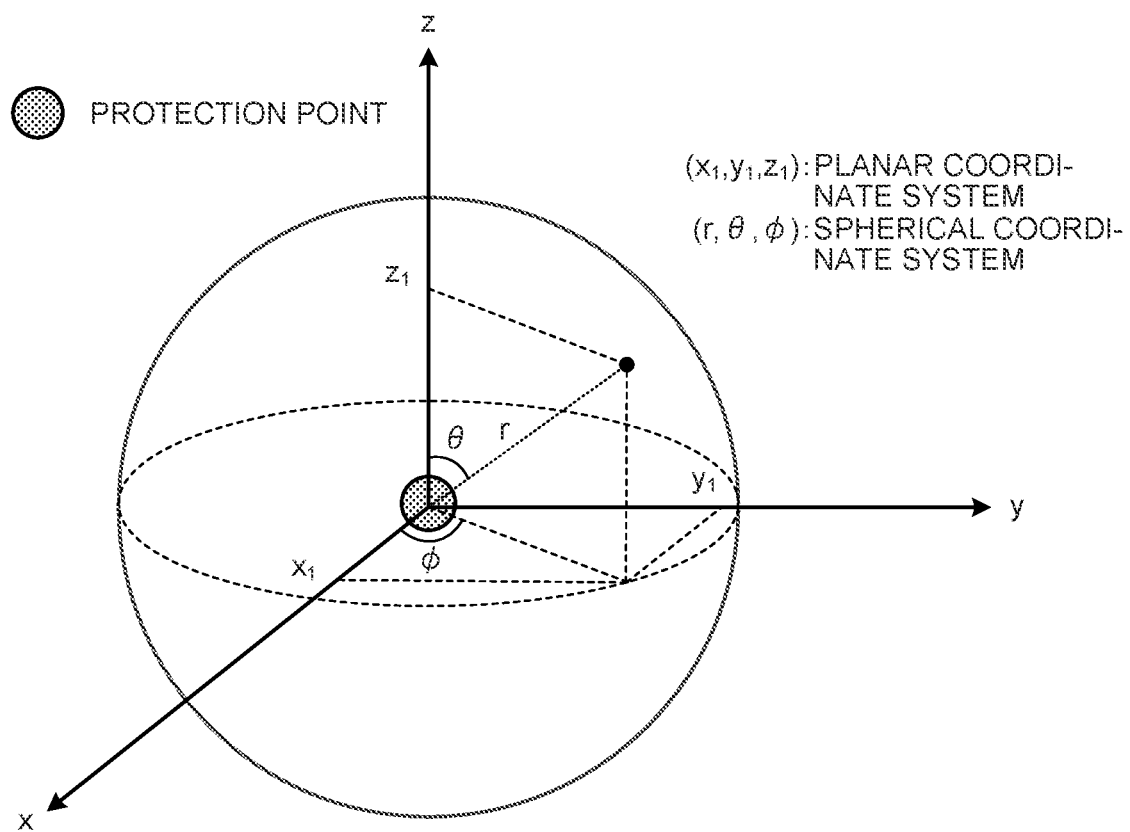
FIG. 27 is a diagram illustrating a spherical coordinate system with its origin at a protection point.

FIG. 27 is a diagram illustrating a spherical coordinate system with its origin at a protection point. The following description is an interference calculation method using the spherical coordinate system illustrated in FIG. 27 as a model. The interference calculation is executed by the calculation unit 646 of the communication control device 60, for example.

First, the calculation unit 646 of the communication control device 60 specifies a direction in which the interference source is located as viewed from the protection point. The protection point is the above-described spatial protection point, for example and the interference source is the antenna 413 of the base station device 40, for example. The calculation unit 646 may use the location information and the height information of the interference source in specifying the direction in which the interference source is located when viewed from the protection point. The calculation unit 646 obtains $\theta$ and $\phi$ in FIG. 27. This enables the calculation unit 646 to obtain the reception antenna gain in the direction in which the interference source is located. In FIG. 27, the reception antenna gain corresponds to r. Accordingly, the gain itself can be expressed as a function $G(\theta, \phi)$ of $\theta$ and $\phi$. Similarly, the calculation unit 646 also obtains the transmission antenna gain of the interference source in the direction in which the protection point is located.

The calculation unit 646 performs interference calculation using the value of the transmission/reception antenna gain obtained in this manner.

Here, the interference power at the reception antenna output point can be calculated by the following Formula (3).

$$I_{PP(dBm/BW_{pp}MHz)} = P_{Tx,Conducted(dBm/BW_{pp}MHz)} + G_{Tx}(\varphi_{I \to PP}, \theta_{I \to PP})_{(dB)} - L_{I \to PP(dB)} + G_{Rx}(\varphi_{PP \to I}, \theta_{PP \to I})_{(dB)} \quad (3)$$

In Formula (3), the meaning of each symbol is as follows.

$BW_{pp}$: use bandwidth of the protection target system $I_{pp(dBm/BW_{pp}MHz)}$: interference power at the reception antenna output end at a protection point (PP) per bandwidth of $B_{WPP}$MHz $P_{Tx,Conducted(dBm/BWppMHz)}$: conducted power of interference source $G_{Tx}(\phi_{I \to PP}, \theta_{I \to PP})_{(dB)}$: transmission antenna gain in a direction $(\phi_{I \to PP}, \theta_{I \to PP})$ in which the protection point is located $L_{I \to PP)(dB)}$: radio wave propagation loss between the interference source and PP (note: there is no limitation of models)

$G_{Rx}(\phi_{I \to PP}, \theta_{I \to PP})_{(dB)}$: transmission antenna gain in a direction $(\phi_{I \to PP}, \theta_{I \to PP})$ in which the interference source is located Note that the calculation unit 646 similarly calculates interference power based on another interference source. The calculation unit 646 can calculate the aggregate interference power by calculating the sum of the interference power values.

[Method for Specifying Interference Calculation Range]

Although the interference calculation can basically be performed based on the above-described method, the calculation volume increases as the calculation target region expands from the "plane" to the "space". Therefore, it is desirable that the interference calculation range is limited to some extent.

Therefore, the second specifying unit 643 of the communication control device 60 specifies one or a plurality of spatial protection points to be subjected to interference calculation (hereinafter, referred to as a calculation target point) from among a plurality of spatial protection points. At this time, the second specifying unit 643 may specify one or a plurality of spatial protection points to be subjected to interference calculation based on beamforming capability information (hereinafter, referred to as capability information) of a radio system to be an interference source (for example, the base station device 40 or the terminal device 30; hereinafter, also referred to as an interfering system).

The capability information is, for example, beam pattern information of a communication device. At this time, the capability information may be information regarding the output direction of the beam. The following parameters can be assumed as the beam pattern information available for specifying the calculation target point.

Figure 28:
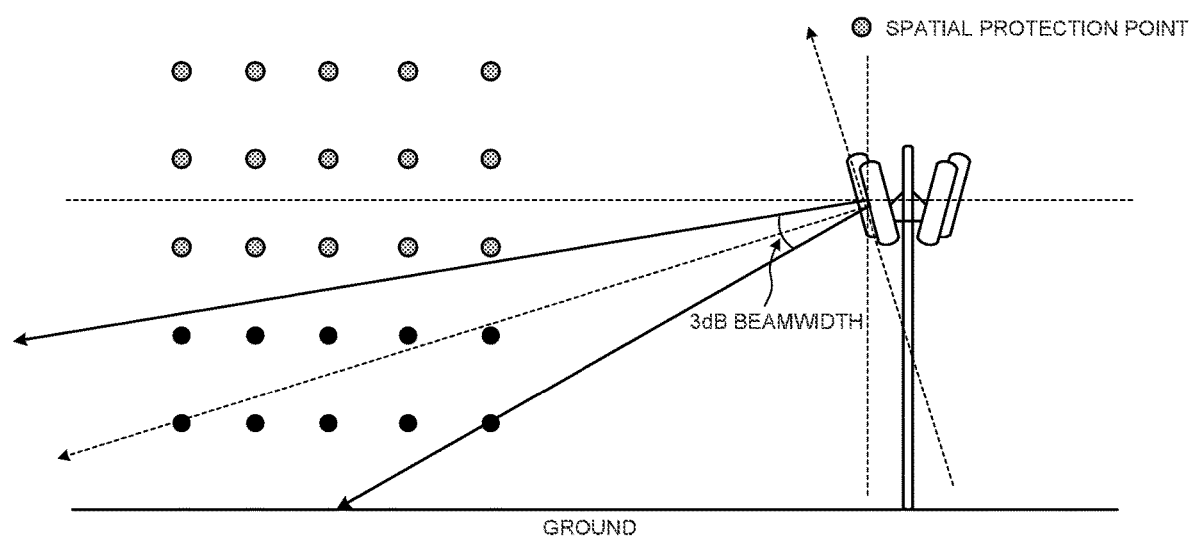
FIG. 28 is a diagram illustrating a method of specifying a calculation target point based on capability information regarding beamforming.

(1) Precoding matrix, weight matrix, or steering vector
(2) Combination of antenna elevation, azimuth and beamwidth
(3) Movable range regarding elevation and azimuth of antenna FIG. 28 is a diagram illustrating a method of specifying a calculation target point based on capability information regarding beamforming. For example, as illustrated in FIG. 28, the second specifying unit 643 of the communication control device 60 may specify, as a calculation target point, a spatial protection point belonging to a spatial zone included in a half width (3 dB beamwidth illustrated in FIG. 28) with respect to a peak gain direction. In addition, the calculation unit 646 of the communication control device 60 may perform interference calculation only on the specified spatial protection point. In the above example, the spatial protection point indicated by the black filled circle is the calculation target. When a communication device capable of forming a plurality of beams can be an interfering system, the spatial protection point to be a calculation target point may be specified for each of beams in a similar procedure. The calculation unit 646 may then perform interference calculation on the specified spatial protection points.

Naturally, the "half width" is not necessarily used as a reference. For example, the second specifying unit 643 of the communication control device 60 may set a spatial protection point included in a range up to a direction having a gain lower than a certain value (20 dB or the like), as the calculation target point. This is because interference that can occur in that direction cannot be ignored depending on the aggregate interference or the radio wave propagation environment. When the communication control device 60 uses a unique value for the certain value and there is another communication control device 60, it is desirable that the values be notified to each other between the communication control devices 60. In addition, a different value may be set for each of the communication devices to be the interfering system, or a common value may be used among the communication devices.

Note that the second specifying unit 643 of the communication control device 60 may similarly set the interference calculation range not only in the vertical direction but also in the horizontal direction.

Example of Method of Calculating Interference Calculation Range

Figure 29:
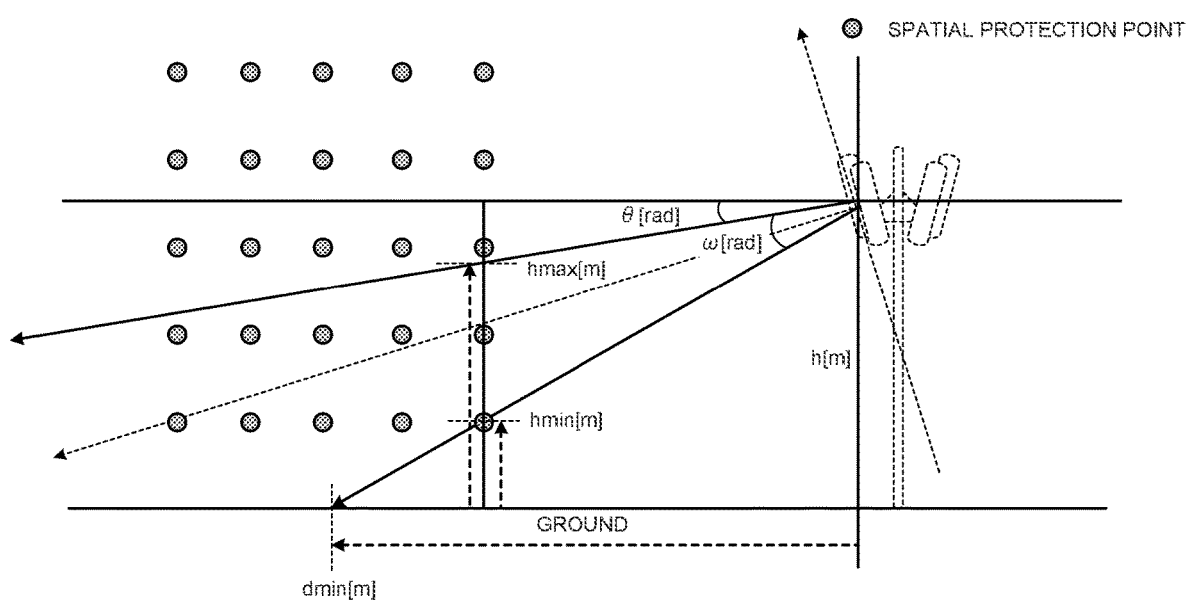
FIG. 29 is a diagram illustrating a method of calculating an interference calculation range.

Here, an example of a method of calculating (specifying) an interference calculation range will be described. FIG. 29 is a diagram illustrating a method of calculating an interference calculation range. In the following description, a method of calculating an interference calculation range will be described using a model illustrated in FIG. 29.

First, the shortest distance from the antenna, which should be considered at the minimum, is dmin [m] illustrated in FIG. 29. The Second specifying unit 643 of the communication control device 60 can calculate dmin as in the following Formula (4).

$$d\min = h \cdot \tan\left(\frac{\pi}{2} - \omega - \theta\right) \quad (4)$$

Figure 30:
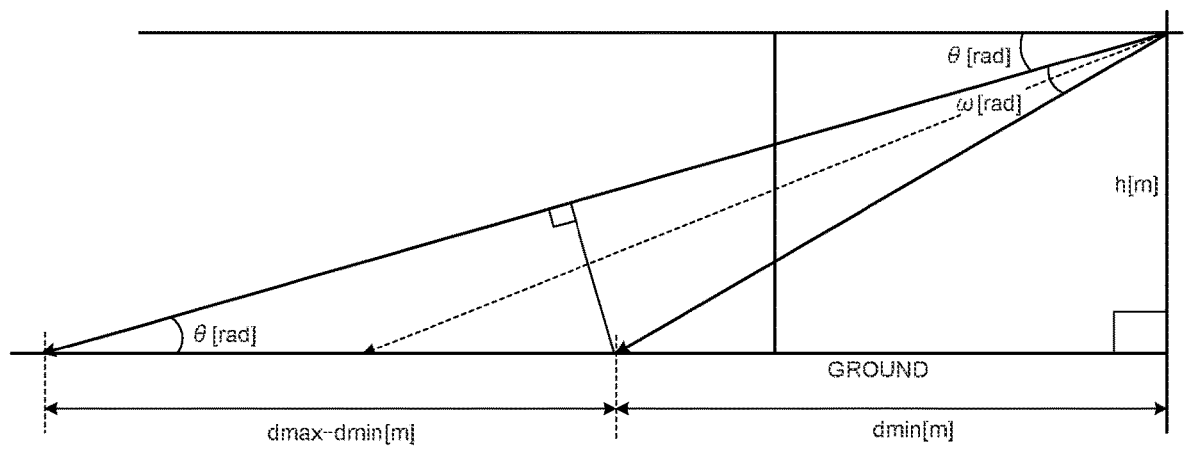
FIG. 30 is a diagram illustrating a method of calculating an interference calculation range.

Next, the second specifying unit 643 of the communication control device 60 calculates the longest distance dmax. FIG. 30 is a diagram illustrating a method of calculating an interference calculation range. The second specifying unit 643 can calculate dmax as in the following Formulas (5) to (8).

$$d\max = h \cdot \tan\left(\frac{\pi}{2} - \omega\right) \quad (5)$$

$$(d\max - d\min) \cdot \sin\theta = \frac{h}{\sin(\theta + \omega)} \cdot \sin\omega \quad (6)$$

$$d\max = h \cdot \frac{\sin\omega}{\sin(\theta + \omega) \cdot \sin\theta} + d\min \quad (7)$$

$$d\max = h \cdot \frac{\sin\omega}{\sin(\theta + \omega) \cdot \sin\theta} + h \cdot \tan\left(\frac{\pi}{2} - \omega - \theta\right) \quad (8)$$

As can be seen from FIG. 30, there is a possibility that the calculation unit 646 of the communication control device 60 needs to perform protection calculation of the spatial protection point included in a distance range dmin to dmax at minimum on the ground (=on the horizontal plane).

Next, consideration will be given in the vertical direction. For the vertical direction, consideration is separately depending on which of the following cases corresponds to the distance d of the horizontal plane.

Case: $0 < d \leq d\min$

Case: $d\min < d \leq d\max$

In the case of $0 < d \leq d\min$, the second specifying unit 643 of the communication control device 60 can calculate the maximum height hmax and the minimum height hmin as in the following Formulas (9) to (10).

$$h_{min} = \frac{d_{min}}{d} \cdot h \quad (9)$$

$$h_{max} = \frac{d_{max} - d_{min}}{d} \cdot h \quad (10)$$

In the case of 0<d dmin, the second specifying unit 643 of the communication control device 60 can calculate the maximum height hmax and the minimum height hmin as in the following Formulas (11) to (12).

$$h_{min} = 0 \quad (11)$$

$$h_{max} = \frac{d_{max} - d_{min}}{d_{max}} \cdot h \quad (12)$$

The second specifying unit 643 of the communication control device 60 may specify the calculation target point from among the plurality of spatial protection points using hmax and hmin calculated as described above in addition to clutter category information. With this operation, the second specifying unit 643 can set the upper limit and the lower limit of the height at which the grid is provided according to the positional relationship with the interfering system. In other words, the second specifying unit 643 can set the interference victim spatial protection point for each communication device to be the interfering system. In this case, it is desirable that information is exchanged between the communication control devices 60.

[Interference Calculation]

The calculation unit 646 of the communication control device 60 performs the above-described interference calculation based on the interference victim spatial protection point specified in this manner. Note that the fourth specifying unit 645 of the communication control device 60 may specify the available spectrum information of the communication device to be the secondary system based on the result of the interference calculation. At this time, the available spectrum information may include information regarding beams usable by the communication device (for example, information regarding the direction and the movable range of the beam that can be output by the secondary system). The notification unit 647 of the communication control device 60 may notify the available spectrum information regarding the beams usable by the communication device.

Furthermore, the notification unit 647 of the communication control device 60 notifies the communication parameter to be used by the communication device. When the communication device is the base station device 40, the acquisition unit 441 of the base station device 40 acquires the communication parameter from the communication control device 60. The communication control unit 443 of the base station device 40 executes radio transmission using the one or more spectrum resources based on the communication parameter.

As described above, the communication control device 60 specifies one or a plurality of spatial protection points (interference calculation points) to be subjected to interference calculation from among a plurality of spatial protection points (interference calculation points) based on capability information regarding beamforming of an interfering system (secondary system such as the base station device 40). Subsequently, the communication control device 60 performs interference calculation based on the specified spatial protection point. This makes it possible for the communication control device 60 to perform efficient interference calculation at a practically operable level, leading to achievement of efficient use of radio resources.

7. OPERATION RELATED TO INTERFERENCE CALCULATION (Second Exemplary Embodiment)

Next, an operation of the communication system 1000 according to the second exemplary embodiment will be described.

In the first exemplary embodiment, efficient interference calculation is achieved by limiting spatial protection points to be subjected to interference calculation. It is expected, however, that the more the number of radio communication devices having a beam management function, the more the further improvement of the efficiency of interference calculation will be needed.

Therefore, in the second exemplary embodiment, one or a plurality of interfering systems (secondary systems) to be subjected to interference calculation are limitedly selected from among a plurality of interfering systems (secondary systems) in addition to the limitation of the spatial protection point. This makes it possible to achieve further efficiency in interference calculation.

In the following description, one or a plurality of interfering systems to be subjected to interference calculation among the plurality of interfering systems may be referred to as potential interferers.

7-1. Specifying Potential Interferers

There are at least two types of conceivable methods for specifying a potential interferer in rough classification according to a spectrum grant method of an interfering system (secondary system).

[Identification of Potential Interferer Using Desired Beam Pattern Information]

In a case where the calculation unit 646 of the communication control device 60 performs aggregate interference control by using desired communication parameters (for example, maximum EIRP and frequency) of a radio communication device, the third specifying unit 644 of the communication control device 60 can specify a potential interferer by using desired beam pattern information regarding the communication device that can be an interfering system. This is a scenario assuming CBRS-like operation, for example. Note that the desired beam pattern information can also be regarded as a type of capability information.

Figure 31:
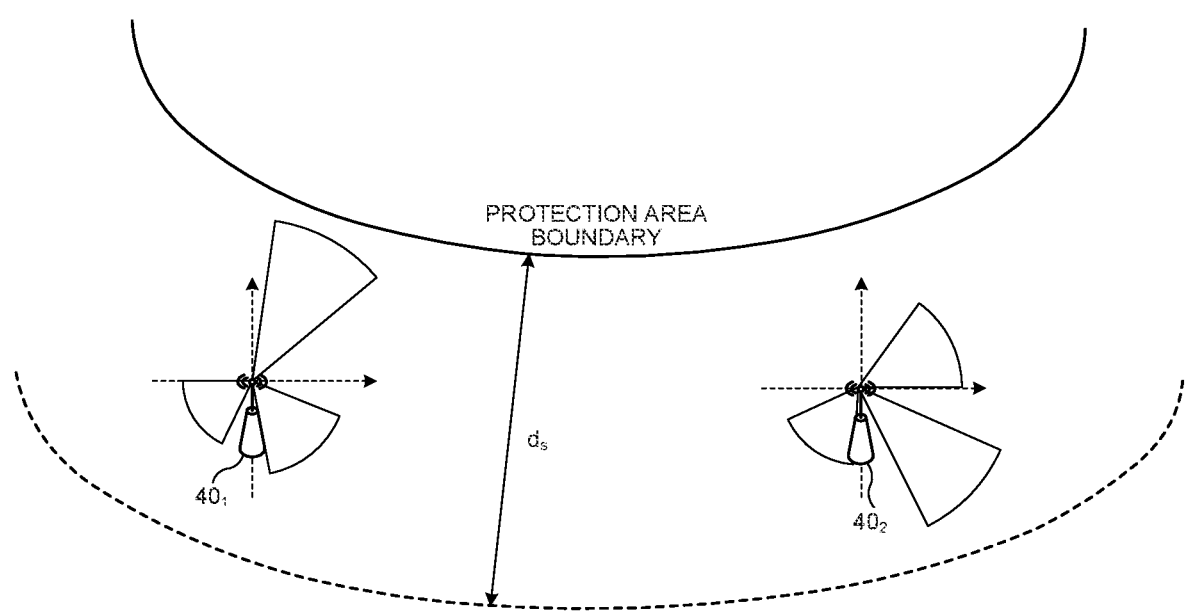
FIG. 31 is a diagram illustrating a method of specifying a potential interferer.

FIG. 31 is a diagram illustrating a method of specifying a potential interferer. Hereinafter, a method of specifying a potential interferer will be described assuming a situation as illustrated in FIG. 31.

Each of the two base station devices 40₁ and 40₂ illustrated in FIG. 31 is an example of a communication device (secondary system) that can be an interfering system. The two communication devices are installed in a zone within a predetermined separation distance $d_s$ from a boundary of a protection area. In the example of FIG. 31, a fan-shaped zone starting from the antennas of the base station devices 40₁ and 40₂ is an example of a desired beam pattern of the communication device.

In the case of an example illustrated in FIG. 31, the third specifying unit 644 of the communication control device 60 can specify a potential interferer based on the following criteria, for example.

(1) Criterion 1

In a case where the spotlight of the beam of the communication device brushes through any zone of the protection areas, the third specifying unit 644 of the communication control device 60 handles the communication device as a potential interferer. That is, the third specifying unit 644 specifies a communication device having at least one of movable directions (for example, at least one direction included in the fan-shaped movable range) in an output direction of a beam specified by the beam capability information (for example, information of the movable range of the elevation and the azimuth of the beam) being oriented in a direction of an arrangement area of a plurality of interference calculation points (for example, in a direction of the protection area boundary), as a communication device to be subjected to the interference calculation.

Figure 32:
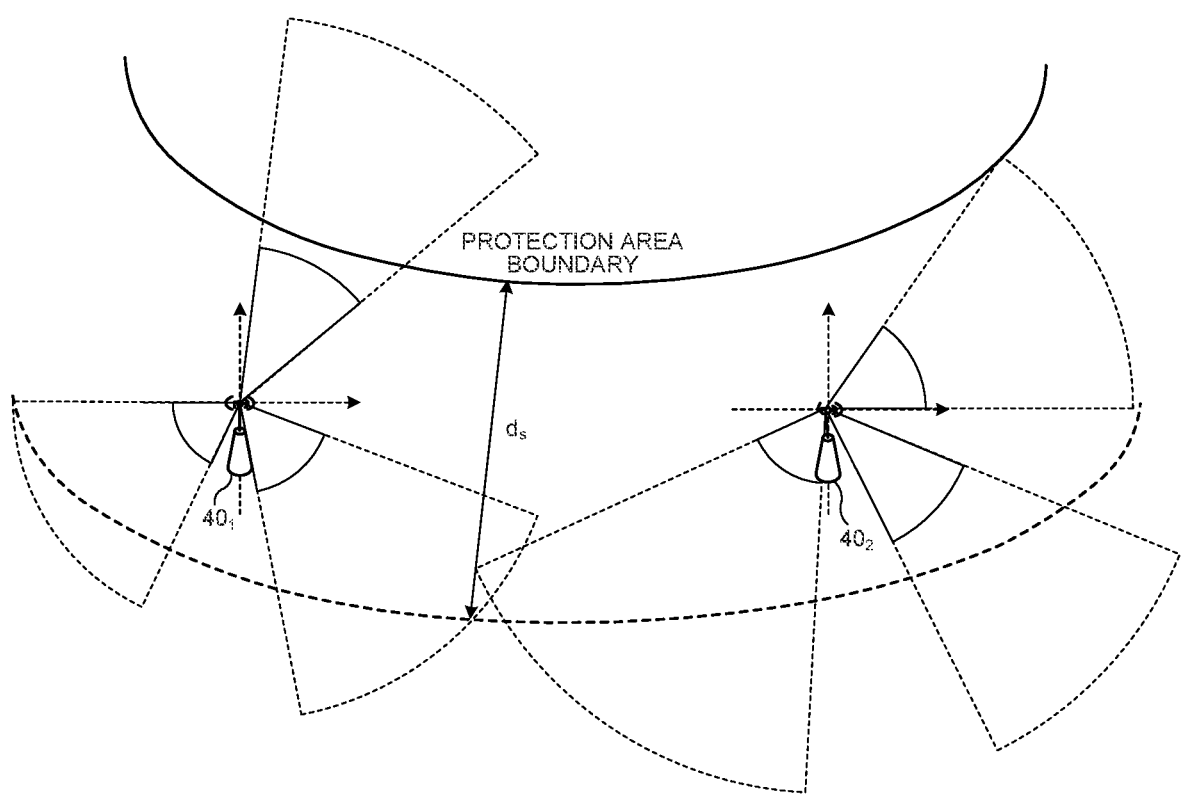
FIG. 32 is a diagram for specifying a potential interferer.

FIG. 32 is a diagram for specifying a potential interferer. For example, as illustrated in FIG. 32, the third specifying unit 644 forms, as indicated by broken lines, spotlight beams by expanding the fan-shaped beam patterns illustrated in FIG. 31. At this time, one of the beams of the base station device $40_1$ overlaps the protection area, while none of the beams of the base station device $40_2$ overlaps the protection area. In the example of FIG. 32, the third specifying unit 644 does not handle the base station device $40_2$ as a potential interferer, and handles the base station device $40_1$ as a potential interferer.

Note that the third specifying unit 644 may simply specify a communication device having the output direction of the beam specified by the beam capability information (for example, at least one piece of information out of an elevation, an azimuth, or a beamwidth of a beam) being oriented in the direction of the arrangement area of the plurality of interference calculation points (for example, in the direction of the protection area boundary), as the device to be subjected to the interference calculation.

(2) Criterion 2

Figure 33:
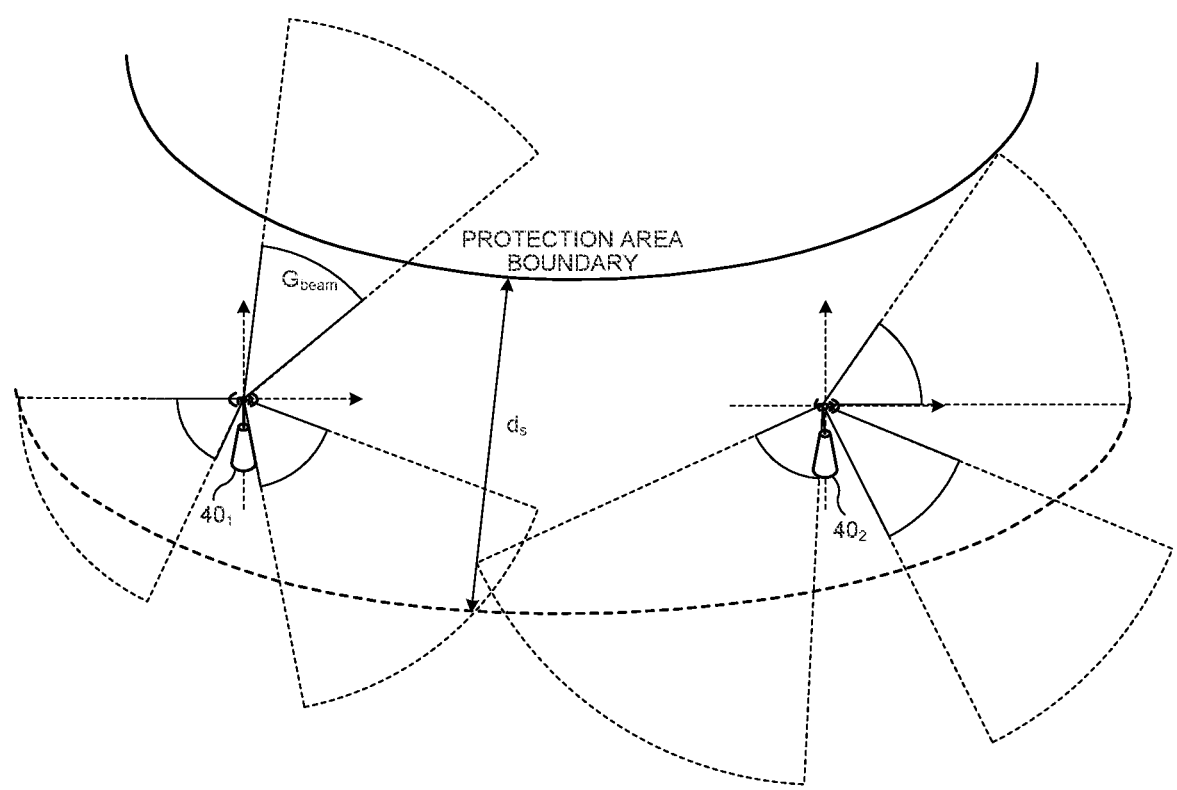
FIG. 33 is a diagram for specifying a potential interferer.

In a case where the gain of the beam in the direction of the protection area boundary of the communication device is a predetermined threshold or more, the third specifying unit 644 of the communication control device 60 handles the communication device as a potential interferer. FIG. 33 is a diagram for specifying a potential interferer. For example, as illustrated in FIG. 33, it is assumed that the gain of a beam in the protection area direction of the base station device $40_1$ is $G_{beam}$. At this time, when the gain $G_{beam}$ is a predetermined threshold $G_{Th}$ or more, the third specifying unit 644 handles the base station device $40_1$ as a potential interferer. Note that the EIRP value in the desired beam may be used instead of the gain $G_{beam}$. That is, when a desired EIRP value associated with the desired beam in the direction of the protection area is a threshold or more, the third specifying unit 644 handles the base station device $40_1$ as a potential interferer.

By using the method described in Criterion 1 or Criterion 2, the communication control device 60 can more effectively specify a potential interferer.

As a matter of course, in a case where a protection point (interference calculation point) such as a spatial protection point is set instead of the protection area, the third specifying unit 644 of the communication control device 60 can make a determination by whether the protection point is spotlighted, as further application.

In the above description, the separation distance is constant regardless of the direction of the beam. However, the separation distance, that is, the filtering distance for the potential interference may be changed depending on whether the beam is directed to the protection area. For example, the distance may be changed to 300 km (that is, long) when the beam is facing the protection area and may be changed to 1 km (short) when the beam is not facing the protection area. Hereinafter, the separation distance is assumed to be fixed, but the distance may naturally be changed as described above.

[Identification of Potential Interferer Using Available Beam Pattern Information]

In a case where the communication control device 60 attempts to achieve aggregate interference control while setting allowable communication parameters (for example, maximum allowable EIRP, available spectrum) at the installation position of the communication device, the third specifying unit 644 of the communication control device 60 can further specify a potential interferer using the available beam pattern information (capability) of the communication device.

This is a scenario assuming TV band white space (TVWS) operation, for example. In the TVWS of Europe, a Geolocation Database (GLDB) calculates a maximum allowable transmission power, and a White Space Device (WSD) can freely move to some extent within the range. According to the calculation formula of the ECC report 186, a margin value for alleviating the aggregate interference is added to the maximum allowable transmission power.

The capability information is, for example, beam pattern information of a communication device. At this time, the capability information may be information regarding the output direction of the beam. The following parameters can be assumed as beam pattern information available for specifying a potential interferer.

Figure 34:
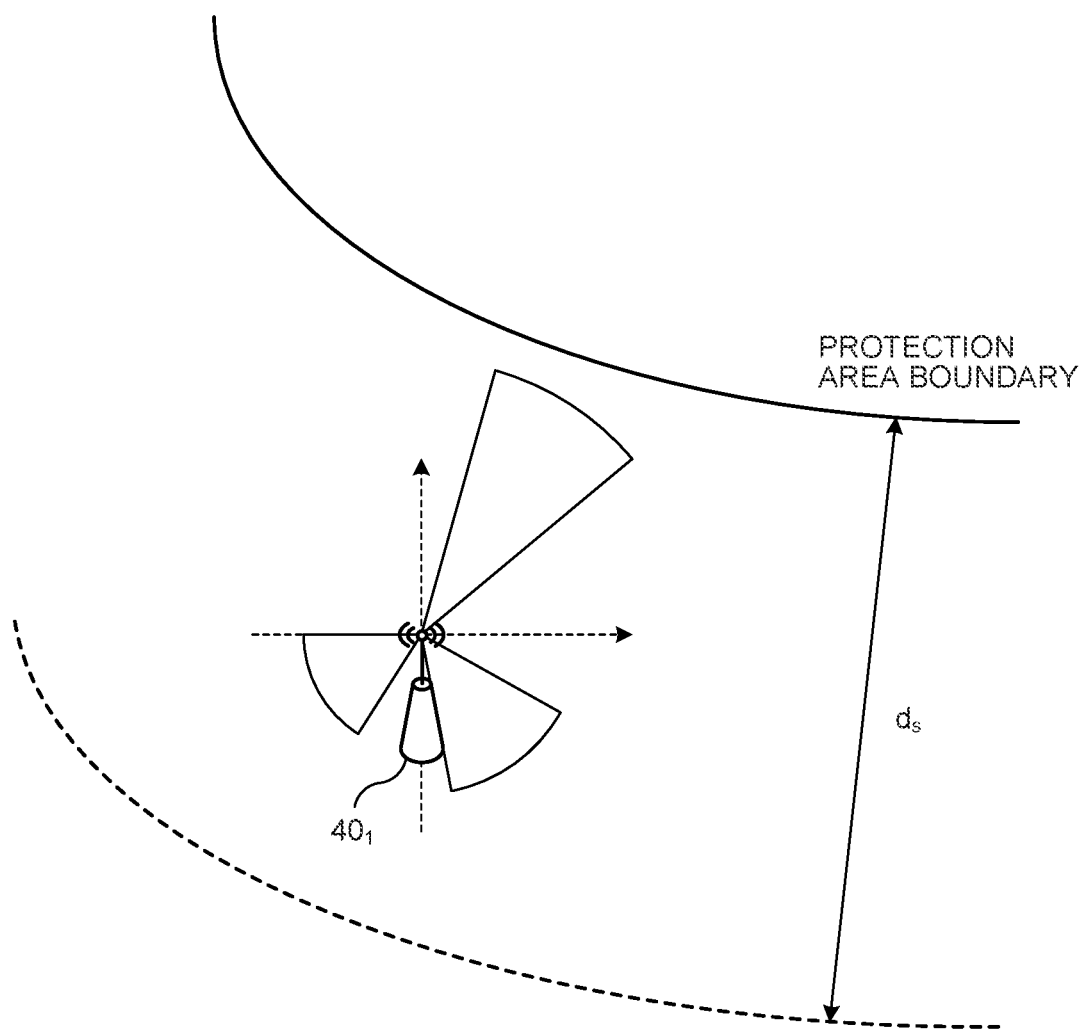
FIG. 34 is an enlarged view of a portion of a base station device 401 in FIG. 31.

(1) Precoding matrix, weight matrix, or steering vector
(2) Combination of antenna elevation, azimuth and beamwidth
(3) Movable range regarding elevation and azimuth of antenna Here, the fan-shaped region in FIG. 31 is considered as a movable range included in the available beam pattern information of a certain communication device (the base station device $40_1$ in the example of FIG. 31). FIG. 34 is an enlarged view of a portion of the base station device $40_1$ in FIG. 31.

In the example of FIG. 34, one of the three beams that can be output by the base station device $40_1$ is oriented in the protection area direction. Therefore, the third specifying unit 644 of the communication control device 60 can specify the base station device $40_1$ as a potential interferer.

The above-described method is a method of determining based on capability. However, once an available beam pattern is calculated in consideration of aggregate interference or the like, the determination may be performed in the same manner using the beam pattern. Note that a method of calculating the available beam pattern in consideration of aggregate interference and the like will be described in the following <7-2. Allocation of interference margin>.

7-2. Allocation of Interference Margin

The communication control device 60 performs interference calculation based on information on the specified potential interferer. Subsequently, the communication control device 60 allocates the interference margin to the potential interferer specified based on a result of the interference calculation and performs the aggregate interference control.

Here, for ease of understanding, it is assumed that there is one protection area. For generalization, the number of protection points is M, and the number of specified potential interferers is N. Note that there may be a plurality of protection areas for actual operation.

The communication control device 60 can allocate the interference margin to a plurality of communication devices that specify a desired beam pattern, based on the interfering power at the use of the beam pattern. For example, the communication control device 60 can allocate the interference margin based on a calculation method such as Iterative Allocation Process (IAP), DPA Move List, or FSS Purge List defined in WINNF-TS-0112.

When the communication control device 60 attempts to achieve aggregate interference control while setting allowable communication parameters (for example, maximum allowable EIRP, available spectrum) at the installation position of the communication device, the calculation unit 646 of the communication control device 60 may calculate an interference margin for all beam patterns usable within the beam pattern movable range (Capability) of the radio communication device.

Note that performing calculation for all patterns is not considered realistic in many cases due to reasons of calculation capability. Therefore, the communication control device 60 may improve the efficiency of calculation using the following method.

[First Step]

Figure 35:
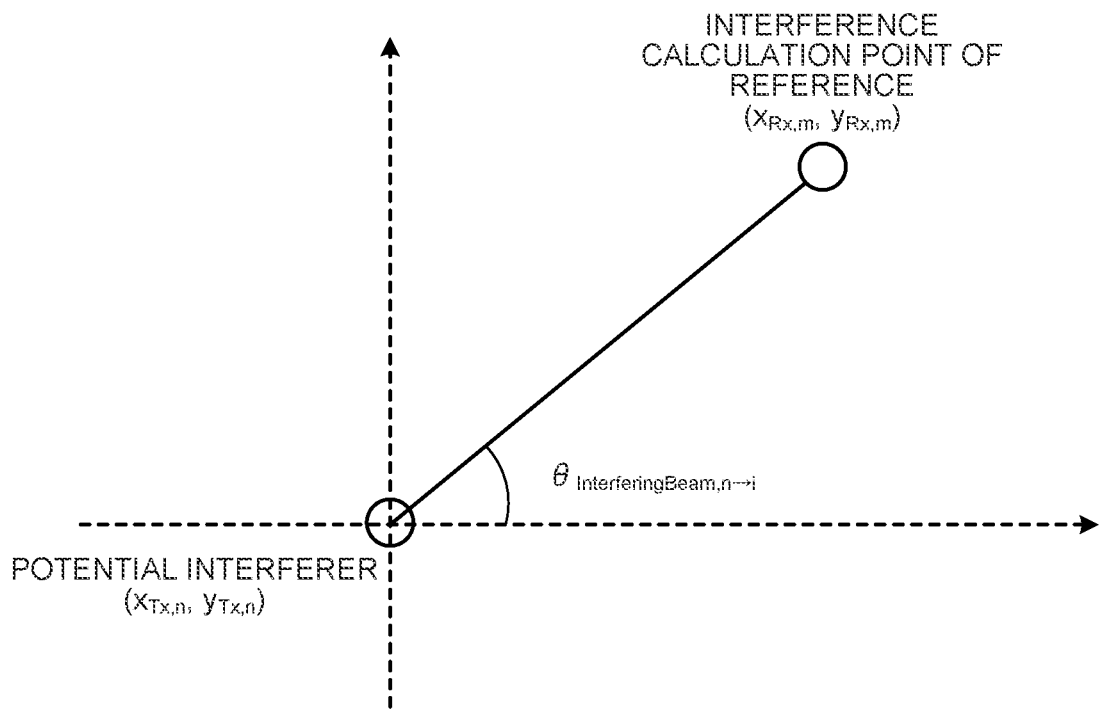
FIG. 35 is a diagram illustrating a back calculation method of a beam pattern of a device being a possible interferer.

First, the communication control device 60 back calculates the beam pattern of the device that can be the interferer based on the location information of the interference calculation point. The interference calculation point is a protection point. For example, the interference calculation point is the spatial protection point described above. For easy understanding, a Euclidean coordinate system is applied. FIG. 35 is a diagram illustrating a back calculation method of a beam pattern of a device being a possible interferer. Here, the position of the n-th potential interferer is $(x_{Tx,n}, y_{Tx,n})$, and the position of the m-th interference calculation point is $(x_{Rx,n}, y_{Rx,n})$. The x-axis direction is defined as a beam reference direction (0[rad]direction).

At this time, the direction of the beam of the communication control device 60 can be expressed as $\theta_{InterferingBeam,n \to m}$ as illustrated in FIG. 35. At this time, the communication control device 60 can calculate $\theta_{InterferingBeam,n \to m}$ by the following Formula (13).

$$\theta_{InterferingBeam,n \to i} = \tan^{-1}\left(\frac{y_{Rx,m} - y_{Tx,n}}{x_{Rx,m} - x_{Tx,n}}\right) \quad (13)$$

Figure 36:
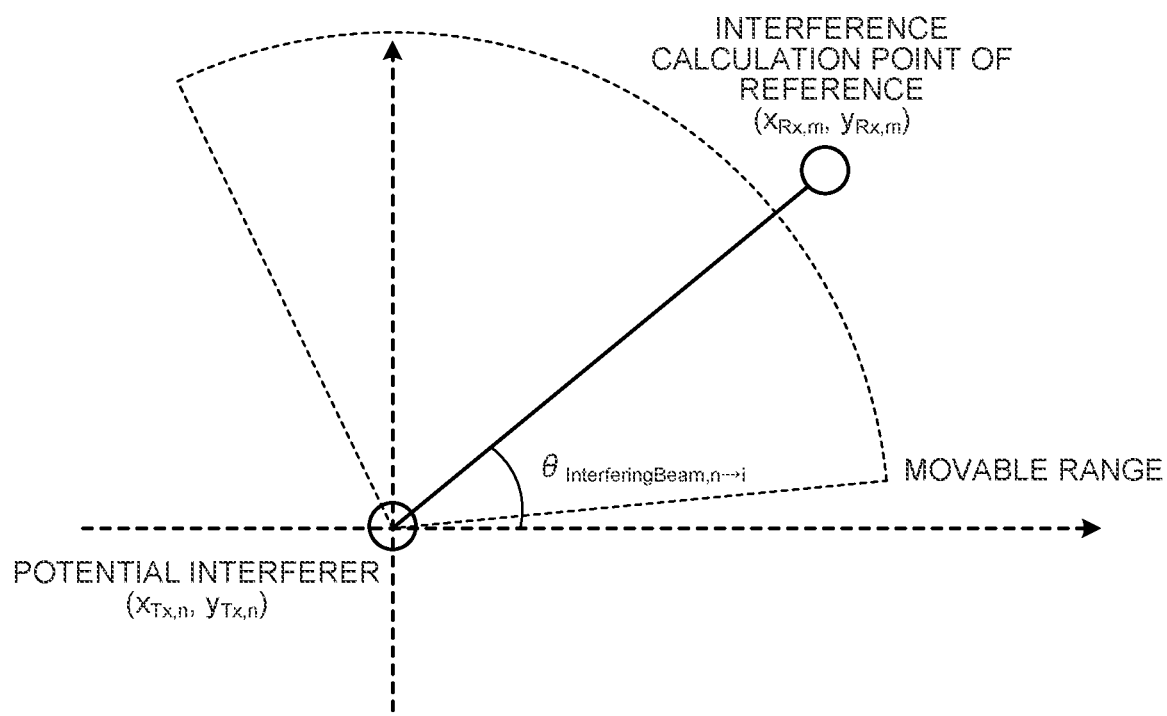
FIG. 36 is a diagram illustrating a case where a beam direction is included in a beam pattern movable range of a potential interferer.

In a case where $\theta_{InterferingBeam,n \to m}$ Obtained in this manner is included in the beam pattern movable range (Capability) of the potential interferer, the communication control device 60 proceeds to the next step (a second step to be described below). FIG. 36 is a diagram illustrating a case where a beam direction is included in a beam pattern movable range of a potential interferer.

Figure 37:
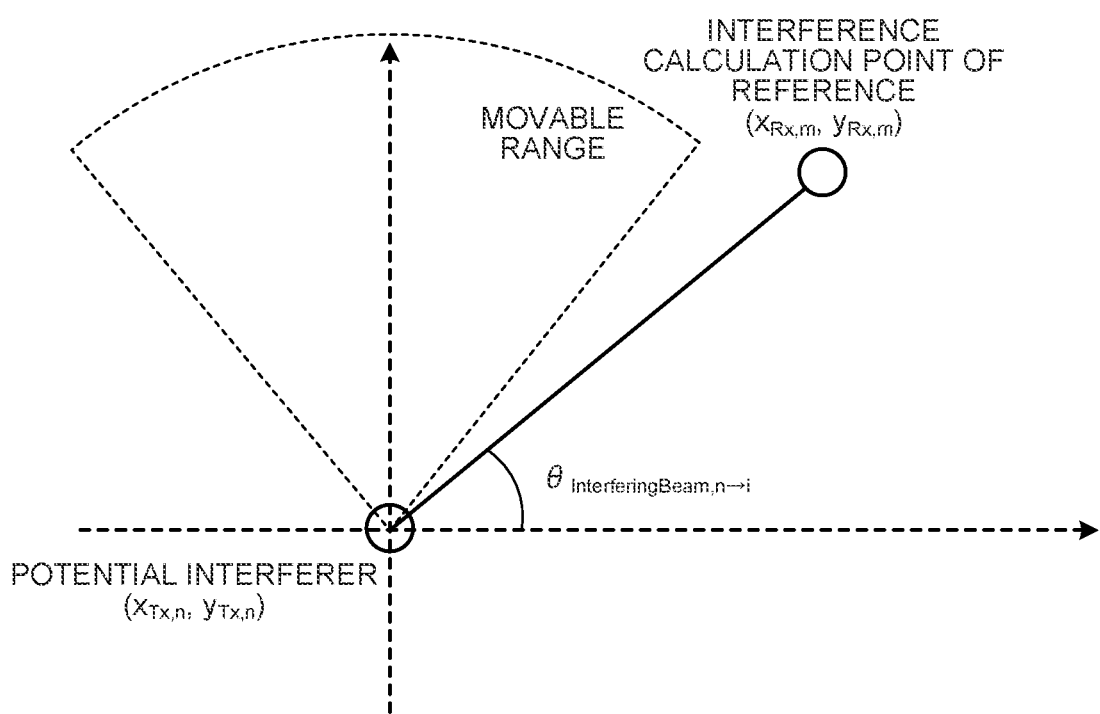
FIG. 37 is a diagram illustrating a case where a beam direction is not included in a beam pattern movable range of a potential interferer.

On the other hand, when $\theta_{InterferingBeam,n \to m}$ is not included in the beam pattern movable range of the potential interferer, the communication control device 60 excludes the potential interferer from the interferers for the interference calculation point. FIG. 37 is a diagram illustrating a case where a beam direction is not included in a beam pattern movable range of a potential interferer.

Note that, even if a potential interferer is excluded from the interferer for a certain interference calculation point, it is important that the same potential interferer might be an interferer for another interference calculation point. Furthermore, the communication control device 60 may further add a beam half width to the above-described method. That is, in the case of FIG. 37, the communication control device 60 may define a zone obtained by further adding an angular zone from the movable range to a beam half width, as the movable range. Then, when $\theta_{InterferingBeam,n \to m}$ is included in the movable range, the communication control device 60 may specify the potential interferer as an interferer. In the following description, a beam pattern of a device being as an interferer may be referred to as an interfering beam pattern.

[Second Step]

Next, the communication control device 60 calculates aggregate interference based on the interfering beam pattern and allocates an interference margin. In the process of the second step described below, the potential interferer means the interferer that has not been removed in the first step.

(Case having only one potential interferer) First, the communication control device 60 calculates the maximum conducted power of the n-th potential interferer capable of protecting the m-th interference calculation point by using the following Formula (14).

$$P_{MaxConducted,n,m} = I_{Threshold} + L(d_{n \to m}) - B_n(\theta_{InterferingBeam,n \to m}) - F - G_{Rx,m} \quad (14)$$

The meaning of each parameter is as follows.

$P_{Maxconducted,n \to m}$: maximum conducted power [dBm] of the n-th potential interferer capable of protecting the m-th interference calculation point $B_n(\theta)$: beam gain [dB] of the n-th potential interferer at an angle $\theta$ [rad]

$L(d)$: propagation loss [dB] at the distance d $d_{n \to m}$: distance between the n-th potential interferer and the m-th interference calculation point F: fading margin [dB]

$G_{Rx,m}$: reception antenna gain [dB] at the m-th interference calculation point The fading margin is not necessarily required. It depends on a propagation model used in propagation loss calculation. Alternatively, when a "statistical value" such as a 95% CDF value as in WINNF-TS-0112 is used, a fading margin is unnecessary. At this time, an expected value calculation E [ ] is input on the right side.

Therefore, the communication control device 60 can calculate the maximum allowable conducted power $P_{Maxconducted,n}$, at which the n-th potential interferer can achieve protection of all interference calculation points, the interference calculation point $m_{MostVictim}$ at which reception interference is most severe, and the beam gains $B_{n,Max}$ by using the following Formulas (15) to (17).

$$P_{MaxConducted,n} = \min_{0 \leq m \leq M-1}\{P_{MaxConducted,n,m}\} \quad (15)$$

$$m_{MostVictim} = \arg\min_{0 \leq m \leq M-1}\{P_{MaxConducted,n,m}\} \quad (16)$$

$$B_{n,Max} = B_n(\theta_{InterferingBeam,n \to m_{MostVictim}}) \quad (17)$$

When there is only one potential interferer, all interference calculation points can be protected even if the beam is freely moved within the beam movable range while the above calculation value is set to the upper limit value.

(Case Having a Plurality of Potential Interferers)

Now, a case having a plurality of potential interferers will be considered.

The communication control device 60 can calculate the aggregate interference at the m-th interference calculation point by the following Formula (18) using the above calculation value as the upper limit parameter value of the potential interferer.

$$I_{Rx,m} = 10 \log_{10} \sum_{n=0}^{N-1} 10^{\frac{P_{MaxConducted,n} + B_{n,Max} - L(d_{n \to m}) + F + G_{Rx,m}}{10}} \quad (18)$$

Here, the interference calculation point having most severe reception interference is expressed by the following Formula (19).

$$m_{MostVictim} = \arg \max_{0 \le m \le M-1} \{I_{Rx,m(mW)}\} \quad (19)$$

At this time, an interference margin $I_{Margin, mMostVictim}$ (mW) of $m_{MostVictim}$ is expressed by the following Formulas (20) to (21).

$$I_{Margin,m_{MostVictim}}(mW) = 10^{\frac{I_{Threshold(mW)} - I_{Rx,m_{MostVictim}}}{10}} \quad (20)$$

$$= 10^{\frac{I_{Threshold(mW)} - \sum_{n=0}^{N-1} 10^{\frac{P_{MaxConducted,n} + B_{n,Max} - L(d_{n \to m_{MostVictim}}) + F + G_{Rx,m_{MostVictim}}}{10}}}{10}} \quad (21)$$

If $I_{Margin, mMostVictim}(mW) = 0$, then, there is no room for allocation of the interference margin. At this time, the communication control device 60 determines not to allocate the interference margin, for example.

In contrast, when $I_{Margin, mMostVictim}(MW)$ is smaller than a predetermined value, in order to reduce the aggregate interference, the communication control device 60 applies a margin distribution method of the ECC report 186, for example, and calculates a reduction amount (for example, the amount of reduction from the requested margin amount of each base station device 40) of the interference margin to be allocated to each potential interferer. In addition, the communication control device 60 may perform application to the interference margin to be allocated to each potential interferer based on the calculation result.

Note that the fourth specifying unit 645 of the communication control device 60 may specify the available spectrum information of the communication device to be the secondary system based on the result of the interference calculation described above. At this time, the available spectrum information may include information regarding beams usable by the communication device (for example, information regarding the direction and the movable range of the beam that can be output by the secondary system). The notification unit 647 of the communication control device 60 may notify the available spectrum information regarding the beams usable by the communication device.

Furthermore, the notification unit 647 of the communication control device 60 notifies the communication parameter to be used by the communication device. When the communication device is the base station device 40, the acquisition unit 441 of the base station device 40 acquires the communication parameter from the communication control device 60. The communication control unit 443 of the base station device 40 executes radio transmission using the one or more spectrum resources based on the communication parameter.

As described above, the communication control device 60 specifies a potential interferer to be subjected to interference calculation from among a plurality of potential interferers based on the capability information. Furthermore, the communication control device 60 specifies an interference calculation point to be subjected to interference calculation from among a plurality of interference calculation points based on the capability information. Subsequently, the communication control device 60 performs interference calculation based on a potential interferer specified from among the plurality of potential interferers and an interference calculation point specified from among the plurality of interference calculation points. That is, the communication control device 60 limits the interferer to be subjected to the interference calculation in addition to limiting the interference calculation point by the method of the first exemplary embodiment. This makes it possible for the communication control device 60 to perform extremely efficient interference calculation, leading to achievement of efficient use of radio resources.

8. MODIFICATIONS

The above-described embodiment is an example, and various modifications and applications are possible.

8-1. Modification Related to Interference Calculation

For example, in the second exemplary embodiment described above, the communication control device 60 limits interferers to be subjected to interference calculation in addition to limiting the interference calculation points by the method in the first exemplary embodiment. Alternatively, however, the communication control device 60 may simply limit the interferer to be subjected to the interference calculation without limiting the interference calculation point.

The above-described method (for example, the methods described in the first and second exemplary embodiments) can also be applied to a purpose other than the purpose of protecting the incumbent system. As an example, the above-described method is also applicable to interference control between secondary systems. For example, the calculated interference range may be considered as "coverage". At this time, the communication control device 60 can perform channel allocation, transmission power control, beam control, and the like according to whether the "coverages" overlap between different communication devices.

8-2. Modification Regarding System Configuration

The communication control device 60 of the present embodiment is not limited to the device described in the above-described embodiment. For example, the communication control device 60 may be a device having a function other than controlling the base station device 40 that performs secondary use of a frequency band in which spectrum sharing is performed. For example, the function of the communication control device 60 of the present embodiment may be provided in a network manager. At this time, the network manager may be, for example, a centralized base band unit (C-BBU) having a network configuration referred to as a centralized radio access network (C-RAN) or a device including the C-BBU. Furthermore, the function of the network manager may be provided in a base station (including an access point). These devices (such as a network manager) can also be regarded as communication control devices.

Furthermore, in the above-described embodiment, the communication control device 60 is a device belonging to the communication system 2, but does not necessarily have to be a device belonging to the communication system 2. The communication control device 60 may be a device outside the communication system 2. The communication control device 60 may indirectly control the base station device 40 via a device constituting the communication system 2 rather than directly controlling the base station device 40. In addition, there may be a plurality of secondary systems (communication systems 2). At this time, the communication control device 60 may manage the plurality of secondary systems. In this case, each of the secondary systems can be regarded as the second radio system.

As general naming in spectrum sharing, an incumbent system using a target band is referred to as a primary system, and a secondary user is referred to as a secondary system. However, the primary system and the secondary system may be each replaced with different terms. A macro cell in a Heterogeneous Network (HetNET) may be defined as the primary system, and a small cell or a relay station may be defined as the secondary system. In addition, a base station may be defined as the primary system, and relay user equipment (Relay UE) or vehicle user equipment (Vehicle UE) that implements D2D or vehicle-to-everything (V2X) existing in the coverage may be defined as the secondary system. The base station is not limited to a fixed type, and may be a portable/mobile type.

Furthermore, the interface between the entities may be either wired or wireless. For example, the interface between the entities (communication device, communication control device, or terminal device) described in the present embodiment may be a wireless interface that does not depend on spectrum sharing. Examples of the wireless interface that does not depend on spectrum sharing include a wireless interface provided by a mobile network operator via a licensed band, wireless LAN communication using an incumbent unlicensed band, and the like.

8-3. Other Modifications

The control device that controls the radio wave utilization device 10, the management device 20, the terminal device 30, the base station device 40, the proxy device 50, or the communication control device 60 according to the present embodiment may be implemented by a dedicated computer system or a general-purpose computer system.

For example, a program for executing the above-described operations is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a device (for example, a personal computer) outside the radio wave utilization device 10, the management device 20, the terminal device 30, the base station device 40, the proxy device 50, or the communication control device 60. Furthermore, the control device may be a device (for example, the control unit 13, the control unit 23, the control unit 34, the control unit 44, the control unit 54, or the control unit 64) inside the radio wave utilization device 10, the management device 20, the terminal device 30, the base station device 40, the proxy device 50, or the communication control device 60.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processes described in the above embodiments, all or a part of the processes described as being performed automatically may be manually performed, or the processes described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of the components of each of the illustrated devices is provided as a functional and conceptional illustration and thus does not necessarily have to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the sequence diagram or the flowchart of the present embodiment can be changed as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. Therefore, a plurality of devices housed in separate housings and connected via a network or the like, and one device in which a plurality of modules are housed in one housing, are both systems.

Furthermore, for example, the present embodiment can adopt a configuration of cloud computing in which one function is cooperatively shared and processed by a plurality of devices via a network.

9. CONCLUSION

As described above, according to an embodiment of the present disclosure, the communication control device 60 receives first information regarding a primary use device that performs primary use of the predetermined frequency band, and sets information regarding the protection of the primary use device based on the first information. Additionally, the communication control device 60 calculates the communication parameters related to the radio transmission of a secondary use device that performs secondary use of the predetermined frequency band based on the set information related to the protection of the primary use device.

This makes it possible to protect, as a primary system, a communication system that has not been suitable for spectrum sharing due to high confidentiality or the like. That is, it is possible to expand the range of the system that can be used as the primary system. As a result, efficient use of radio resources can be realized.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and a modification as appropriate.

The effects described in individual embodiments of the present specification are merely examples, and thus, there may be other effects, not limited to the exemplified effects.

Note that the present technology can also have the following configurations.

(1)
An information processing device comprising:
an acquisition unit that acquires capability information regarding beamforming of a second radio system that wishes to use one or more spectrum resources included in part or all of a frequency band used by a first radio system;
a first specifying unit that specifies a plurality of interference calculation points for interference calculation regarding the first radio system;
a second specifying unit that specifies one or a plurality of interference calculation points to be subjected to the interference calculation from among the plurality of interference calculation points based on the capability information; and
a calculation unit that performs the interference calculation based on the specified one or the plurality of interference calculation points.

(2)
The information processing device according to (1), further comprising a third specifying unit that specifies one or a plurality of second radio systems to be subjected to the interference calculation from among the plurality of second radio systems based on the capability information,
wherein the calculation unit performs the interference calculation based on the specified one or the plurality of second radio systems and the specified one or the plurality of interference calculation points.

(3)
The information processing device according to (1) or (2), wherein the first specifying unit specifies the plurality of interference calculation points three-dimensionally arranged at positions corresponding to environment information indicating an environment around the first radio system, based on the environment information.

(4)
The information processing device according to any one of (1) to (3),
wherein the capability information includes information regarding an output direction of a beam that can be output by the second radio system, and
the second specifying unit specifies one or a plurality of interference calculation points to be subjected to the interference calculation based on the information regarding the output direction of the beam.

(5)
The information processing device according to (4),
wherein the capability information includes at least one piece of information out of an elevation, an azimuth, or a beamwidth of a beam output by the second radio system, as the information regarding the output direction of the beam.

(6)
The information processing device according to (5),
wherein the second specifying unit specifies one or a plurality of interference calculation points included in an output range of the beam specified by at least one piece of information, out of the elevation, the azimuth, and the beamwidth of the beam, as interference calculation points to be subjected to the interference calculation.

(7)
The information processing device according to (6),
wherein the second specifying unit specifies an interference calculation point belonging to a spatial zone included in a half width with respect to a peak gain direction regarding the beam, as the one or the plurality of interference calculation points to be subjected to the interference calculation.

(8)
The information processing device according to (4),
wherein the capability information includes movable range information regarding an elevation and an azimuth of a beam output by the second radio system, as the information regarding the output direction of the beam.

(9)
The information processing device according to (8),
wherein the second specifying unit specifies one or a plurality of interference calculation points included in a movable range of a beam specified by the movable range information regarding the elevation and the azimuth of the beam, as the interference calculation points to be subjected to the interference calculation.

(10)
The information processing device according to any one of (2) to (9),
wherein the capability information includes information regarding an output direction of a beam that can be output by the second radio system, and
the third specifying unit specifies one or a plurality of second radio systems to be subjected to the interference calculation based on the information regarding the output direction of the beam.

(11)
The information processing device according to (10),
wherein the capability information includes at least one piece of information out of an elevation, an azimuth, or a beamwidth of a beam output by the second radio system, as the information regarding the output direction of the beam.

(12)
The information processing device according to (11),
wherein the third specifying unit specifies a second radio system in which the output direction of the beam specified by at least one piece of information out of the elevation, the azimuth, and the beamwidth of the beam faces an arrangement area of the plurality of interference calculation points, as the second radio system to be subjected to the interference calculation.

(13)

The information processing device according to (10), wherein the capability information includes movable range information regarding an elevation and an azimuth of a beam output by the second radio system, as the information regarding the output direction of the beam.

(14)

The information processing device according to (13), wherein the third specifying unit specifies a second radio system in which at least one of movable directions in an output direction of a beam specified by the movable range information regarding the elevation and the azimuth of the beam faces an arrangement area of the plurality of interference calculation points, as the second radio system to be subjected to the interference calculation.

(15)

The information processing device according to any one of (2) to (9),
wherein the capability information includes information regarding a gain of a beam that can be output by the second radio system, and
the third specifying unit specifies one or a plurality of second radio systems to be subjected to the interference calculation based on the information regarding the gain of the beam.

(16)

The information processing device according to any one of (1) to (15),
further comprising a fourth specifying unit that specifies available spectrum information including information regarding beams available to the second radio system, based on a result of the interference calculation.

(17)

An information processing method comprising:
acquiring capability information regarding beamforming of a second radio system that wishes to use one or more spectrum resources included in part or all of a frequency band used by a first radio system;
specifying a plurality of interference calculation points for interference calculation regarding the first radio system;
specifying one or a plurality of interference calculation points to be subjected to the interference calculation from among the plurality of interference calculation points based on the capability information; and
performing the interference calculation based on the specified one or the plurality of interference calculation points.

(18)

An information processing program for causing a computer to function as:
an acquisition unit that acquires capability information regarding beamforming of a second radio system that wishes to use one or more spectrum resources included in part or all of a frequency band used by a first radio system;
a first specifying unit that specifies a plurality of interference calculation points for interference calculation regarding the first radio system;
a second specifying unit that specifies one or a plurality of interference calculation points to be subjected to the interference calculation from among the plurality of interference calculation points based on the capability information; and
a calculation unit that performs the interference calculation based on the specified one or the plurality of interference calculation points.

(19)

A communication device comprising:
an acquisition unit that acquires a communication parameter from an information processing device including an acquisition unit that acquires capability information regarding beams of a second radio system that wishes to use one or more spectrum resources included in part or all of a frequency band used by a first radio system, a first specifying unit that specifies a plurality of interference calculation points for interference calculation regarding the first radio system, a second specifying unit that specifies one or a plurality of interference calculation points to be subjected to the interference calculation from among the plurality of interference calculation points based on the capability information, and a calculation unit that performs the interference calculation based on the specified one or the plurality of interference calculation points; and
a communication control unit that executes radio transmission using the one or more spectrum resources based on the communication parameter.

(20)

A communication method including:
acquiring a communication parameter from an information processing device including an acquisition unit that acquires capability information regarding beams of a second radio system that wishes to use one or more spectrum resources included in part or all of a frequency band used by a first radio system, a first specifying unit that specifies a plurality of interference calculation points for interference calculation regarding the first radio system, a second specifying unit that specifies one or a plurality of interference calculation points to be subjected to the interference calculation from among the plurality of interference calculation points based on the capability information, and a calculation unit that performs the interference calculation based on the specified one or the plurality of interference calculation points; and
executing radio transmission using the one or more spectrum resources based on the communication parameter.

(21)

A communication program for causing a computer to function as units including:
an acquisition unit that acquires a communication parameter from an information processing device including an acquisition unit that acquires capability information regarding beams of a second radio system that wishes to use one or more spectrum resources included in part or all of a frequency band used by a first radio system, a first specifying unit that specifies a plurality of interference calculation points for interference calculation regarding the first radio system, a second specifying unit that specifies one or a plurality of interference calculation points to be subjected to the interference calculation from among the plurality of interference calculation points based on the capability information, and a calculation unit that performs the interference calculation based on the specified one or the plurality of interference calculation points; and a communication control unit that executes radio transmission using the one or more spectrum resources based on the communication parameter.

REFERENCE SIGNS LIST 1, 2, 1000 COMMUNICATION SYSTEM
10 RADIO WAVE UTILIZATION DEVICE
20 MANAGEMENT DEVICE
30 Terminal device
40 BASE STATION DEVICE
50 PROXY DEVICE
60 COMMUNICATION CONTROL DEVICE
11 PROCESSING UNIT
12, 22, 32, 42, 52, 62 STORAGE UNIT
13, 23, 34, 44, 54, 64 CONTROL UNIT
21 COMMUNICATION UNIT
31, 41, 51, 61 RADIO COMMUNICATION UNIT
33 INPUT/OUTPUT UNIT
43, 53, 63 NETWORK COMMUNICATION UNIT
311, 411 RECEPTION PROCESSING UNIT
312, 412 TRANSMISSION PROCESSING UNIT
313, 413 ANTENNA
441, 541, 641 ACQUISITION UNIT
442, 542 TRANSMISSION UNIT
443, 543 COMMUNICATION CONTROL UNIT
642 FIRST SPECIFYING UNIT
643 SECOND SPECIFYING UNIT
644 THIRD SPECIFYING UNIT
645 FOURTH SPECIFYING UNIT
646 CALCULATION UNIT
647 NOTIFICATION UNIT

The invention claimed is:

1. An information processing device, comprising:
circuitry configured to:
acquire capability information regarding beamforming of a second radio system configured to use at least one spectrum resource of a frequency band used by a first radio system;
specify a plurality of interference calculation points for interference calculation regarding the first radio system;
specify, based on the capability information, at least one interference calculation point for the interference calculation from among the plurality of interference calculation points;
specify, based on the capability information, one or a plurality of second radio systems for the interference calculation from among the plurality of second radio systems, wherein the plurality of second radio systems includes the second radio system; and
perform the interference calculation based on the specified one or the plurality of second radio systems and the specified at least one interference calculation point.

2. The information processing device according to claim 1, wherein
the circuitry is further configured to specify the plurality of interference calculation points three-dimensionally arranged at positions corresponding to environment information indicating an environment around the first radio system, and
the plurality of interference calculation points is specified based on the environment information.

3. The information processing device according to claim 1, wherein
the capability information includes information regarding an output direction of a beam output by the second radio system, and
the circuitry is further configured to specify the at least one interference calculation point for the interference calculation based on the information regarding the output direction of the beam.

4. The information processing device according to claim 3, wherein the capability information includes at least one piece of information out of an elevation, an azimuth, or a beamwidth of the beam output by the second radio system, as the information regarding the output direction of the beam.

5. The information processing device according to claim 4, wherein the circuitry is further configured to specify the at least one interference calculation point included in an output range of the beam specified by the at least one piece of information, out of the elevation, the azimuth, and the beamwidth of the beam, as interference calculation points for the interference calculation.

6. The information processing device according to claim 5, wherein the circuitry is further configured to specify an interference calculation point belonging to a spatial zone included in a half width with respect to a peak gain direction regarding the beam, as the at least one interference calculation point for the interference calculation.

7. The information processing device according to claim 3, wherein the capability information includes movable range information regarding an elevation and an azimuth of the beam output by the second radio system, as the information regarding the output direction of the beam.

8. The information processing device according to claim 7, wherein the circuitry is further configured to specify the at least one interference calculation point included in a movable range of the beam specified by the movable range information regarding the elevation and the azimuth of the beam, as interference calculation points for the interference calculation.

9. The information processing device according to claim 1, wherein
the capability information includes information regarding an output direction of a beam output by the second radio system, and
the circuitry is further configured to specify the one or the plurality of second radio systems for the interference calculation based on the information regarding the output direction of the beam.

10. The information processing device according to claim 9, wherein the capability information includes at least one piece of information out of an elevation, an azimuth, or a beamwidth of the beam output by the second radio system, as the information regarding the output direction of the beam.

11. The information processing device according to claim 10, wherein the circuitry is further configured to specify the second radio system in which the output direction of the beam specified by the at least one piece of information out of the elevation, the azimuth, and the beamwidth of the beam faces an arrangement area of the plurality of interference calculation points, as the second radio system for the interference calculation.

12. The information processing device according to claim 9, wherein the capability information includes movable range information regarding an elevation and an azimuth of the beam output by the second radio system, as the information regarding the output direction of the beam.

13. The information processing device according to claim 12, wherein the circuitry is further configured to specify the second radio system in which at least one movable direction in the output direction of the beam specified by the movable range information regarding the elevation and the azimuth of the beam faces an arrangement area of the plurality of interference calculation points, as the second radio system for the interference calculation.

14. The information processing device according to claim 1, wherein
the capability information includes information regarding a gain of a beam output by the second radio system, and
the circuitry is further configured to specify the one or the plurality of second radio systems for the interference calculation based on the information regarding the gain of the beam.

15. The information processing device according to claim 1, wherein the circuitry is further configured to specify available spectrum information including information regarding beams available to the second radio system, based on a result of the interference calculation.

16. An information processing method, comprising:
acquiring capability information regarding beamforming of a second radio system that configured to use at least one spectrum resource of a frequency band used by a first radio system;
specifying a plurality of interference calculation points for interference calculation regarding the first radio system;
specifying, based on the capability information, at least one interference calculation point for the interference calculation from among the plurality of interference calculation points;
specifying, based on the capability information, one or a plurality of second radio systems for the interference calculation from among the plurality of second radio systems, wherein the plurality of second radio systems includes the second radio system; and
performing the interference calculation based on the specified one or the plurality of second radio systems and the specified at least one interference calculation point.

17. A communication device, comprising:
circuitry configured to:
acquire a communication parameter from an information processing device configured to:
acquire capability information regarding beamforming of a second radio system configured to use at least one spectrum resource of a frequency band used by a first radio system;
specify a plurality of interference calculation points for interference calculation regarding the first radio system;
specify, based on the capability information, at least one interference calculation point for the interference calculation from among the plurality of interference calculation points;
specify, based on the capability information, one or a plurality of second radio systems for the interference calculation from among the plurality of second radio systems, wherein the plurality of second radio systems includes the second radio system; and
perform the interference calculation based on the specified one or the plurality of second radio systems and the specified at least one interference calculation point; and
execute radio transmission using the at least one spectrum resource based on the communication parameter.

* * * * *